United States Patent
Lee

(10) Patent No.: US 9,806,868 B2
(45) Date of Patent: Oct. 31, 2017

(54) FRAME TRANSMITTING METHOD

(71) Applicant: NEWRACOM, INC., Irvine, CA (US)

(72) Inventor: Ilgu Lee, Daejeon (KR)

(73) Assignee: NEWRACOM, INC., Irvine, CA (US)

(*) Notice: Subject to any disclaimer, the term of this patent is extended or adjusted under 35 U.S.C. 154(b) by 160 days.

(21) Appl. No.: 14/941,418

(22) Filed: Nov. 13, 2015

(65) Prior Publication Data

US 2016/0142980 A1    May 19, 2016

Related U.S. Application Data

(60) Provisional application No. 62/080,876, filed on Nov. 17, 2014, provisional application No. 62/095,688, filed on Dec. 22, 2014.

(51) Int. Cl.

| | | |
|---|---|---|
| *H04H 20/67* | (2008.01) | |
| *H04L 5/00* | (2006.01) | |
| *H04W 52/38* | (2009.01) | |
| *H04W 84/12* | (2009.01) | |
| *H04W 74/08* | (2009.01) | |

(52) U.S. Cl.

CPC ........... *H04L 5/0055* (2013.01); *H04W 52/38* (2013.01); *H04W 74/0816* (2013.01); *H04W 84/12* (2013.01)

(58) Field of Classification Search

CPC ........................................................ H04L 5/00
USPC .............................................................. 370/336
See application file for complete search history.

(56) References Cited

U.S. PATENT DOCUMENTS

2017/0070901 A1* 3/2017 Yoshizawa ............ H04W 16/14

OTHER PUBLICATIONS

"Part 11: Wireless LAN Medium Access Control (MAC) and Physical Layer (PHY) Specifications", IEEE Standards 802.11™—2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™—2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

*Primary Examiner* — Dang Ton

(57) ABSTRACT

A method of transmitting a frame is provided by a first device belonging to a first BSS in a wireless communication network. The first device determines whether an RTS frame or a CTS frame is received from a second BSS that is a neighbor BSS of the first BSS. When the RTS frame or the CTS frame is received from the second BSS, the first device transmits to a second device a transmission frame whose transmission power is changed from a normal power during a predetermined time within a data frame transmission time and an ACK frame transmission time of the second BSS.

20 Claims, 52 Drawing Sheets

FRAME TRANSMITTING METHOD

CROSS-REFERENCE TO RELATED APPLICATION

This application claims priority to and the benefit of U.S. Provisional Application Nos. 62/080,876 and 62/095,688, filed on Nov. 17, 2014 and Dec. 22, 2014 in the U.S. Patent and Trademark Office, the entire contents of which are incorporated herein by reference.

BACKGROUND (a) Field

The described technology relates to a frame transmitting method. More particularly, the described technology relates to a frame transmitting method in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."

After an original standard was published in 1999, new version standards are continuously published by amendments. The IEEE standard 802.11a (IEEE Std 802.11a-1999) supporting 5 GHz band and the IEEE standard 802.11b (IEEE Std 802.11b-1999) supporting 2.4 GHz band were published in 1999, and the IEEE standard 802.11g (IEEE Std 802.11g-2003) supporting 2.4 GHz band was published in 2003. These standards are called legacy. Subsequently, the IEEE standard 802.11n (IEEE Std 802.11n-2009) for enhancements for higher throughput (HT) was published in 2009, and the IEEE standard 802.11ac (IEEE 802.11ac-2013) for enhancements for very high throughput (VHT) was published in 2013.

Recently, scenarios where a lot of devices densely exist frequently occur in the WLAN, and the system throughput is deteriorated in the high density scenarios. Accordingly, a high efficiency (HE) WLAN for enhancing the system throughput in the high density scenarios is being developed by the IEEE 802.11 ax task group.

However, in the high density scenarios, a device may not transmit a frame due to an interference from a neighbor basic service set (BSS), or a frame transmitted by the device may be an interference to the neighbor BSS. Accordingly, the device cannot efficiently transmit frames.

SUMMARY

An embodiment provides a frame transmitting method for efficiently transmitting a frame.

According to an embodiment, a method of transmitting a frame is provided by a first device belonging to a first BSS in a wireless communication network. The method includes determining whether an RTS frame or a CTS frame is received from a second BSS that is a neighbor BSS of the first BSS, and transmitting to a second device a transmission frame whose transmission power is changed from a normal power during a predetermined time in a data frame transmission time and an ACK frame transmission time of the second BSS when the RTS frame or the CTS frame is received from the second BSS.

The changed transmission power of the transmission frame may be lower than the normal power.

When the CTS frame is received and the RTS frame is not received from the second BSS, the predetermined time may include the data frame transmission time.

In this case, the method may further include transmitting the transmission frame with the normal power during the ACK frame transmission time.

Further, the transmission frame may include, at a time when the transmission frame starts to be transmitted with the normal power, a delimiter notifying that the transmission power of the transmission frame is changed.

Alternatively, the transmission frame may include a midamble at a time when the transmission frame starts to be transmitted with the normal power, and the midamble may include a short training field for gain control.

When the RTS frame is received and the CTS frame is not received from the second BSS, the predetermined time may include the ACK frame transmission time.

In this case, the method may further include transmitting the transmission frame with the normal power during the data frame transmission time.

Further, the transmission frame may include, at a time when the transmission frame starts to be transmitted with the changed transmission power, a delimiter indicating that the transmission power of the transmission frame is changed.

Alternatively, the transmission frame may include a midamble at a time when the transmission frame starts to be transmitted with the changed transmission power, and the midamble may include a short training field for gain control.

When the RTS frame and the CTS frame are received from the second BSS, the predetermined time may include the data frame transmission time and the ACK frame transmission time.

The method may further include exchanging a request frame and a response frame for the request frame with the second device.

In this case, each of the request frame and the response frame may include information on the neighbor BSS, and the information on the neighbor BSS may include information on the RTS frame and information on the CTS frame.

The information on the RTS frame may include at least one of identification information of a device transmitting the RTS frame, identification information of the second BSS, information on whether the RTS frame has been received, a received signal strength of the RTS frame, and a transmission power level of the RTS frame. The information on the CTS frame may include at least one of identification information of a device transmitting the CTS frame, identification information of the second BSS, information on whether the CTS frame has been received, a received signal strength of the CTS frame, and a transmission power level of the CTS frame.

The request frame may have a same format as the RTS frame and the response frame may have a same format as the CTS frame. A transmitter address field of the request frame may include one of the information on the RTS frame and the information on the CTS frame, and a receiver address field of the request frame may include another one of the information on the RTS frame and the information on the CTS frame. A receiver address field of the response frame may include the information on the RTS frame and the information on the CTS frame.

The transmitter address field of the request frame may further include an address into which an address of a device transmitting the request frame among the first device and the second device is compressed. The receiver address field of the request frame may further include an address into which an address of a device receiving the request frame among the first device and the second device is compressed. The receiver address field of the response frame may further include an address into which an address of a device receiving the response frame among the first device and the second device is compressed.

Each of the request frame and the response frame may further include an indication indicating whether the information on the neighbor BSS is included.

The transmission frame whose transmission power is changed may further include a first preamble being compatible with a WLAN of a previous version, a second preamble supporting the wireless communication network, and a data field. A transmission power of the second preamble and the data field may be lower than the normal power.

The first preamble may include a short training field being compatible with the WLAN of the previous version, and a transmission power of the first preamble or a field excluding the short training field from the first preamble may be lower than the normal power.

The first preamble may include an indication indicating a gain difference between the first preamble and the second preamble.

According to another embodiment, an apparatus for transmitting a frame is provided by a first device belonging to a first BSS in a wireless communication network. The apparatus includes a processor and a transceiver. The processor determines whether an RTS frame or a CTS frame is received from a second BSS that is a neighbor BSS of the first BSS. When the RTS frame or the CTS frame is received from the second BSS, the transceiver transmits to a second device a transmission frame whose transmission power is changed from a normal power during a predetermined time in a data frame transmission time and an ACK frame transmission time of the second BSS.

DETAILED DESCRIPTION OF THE EMBODIMENTS

Figure 1:
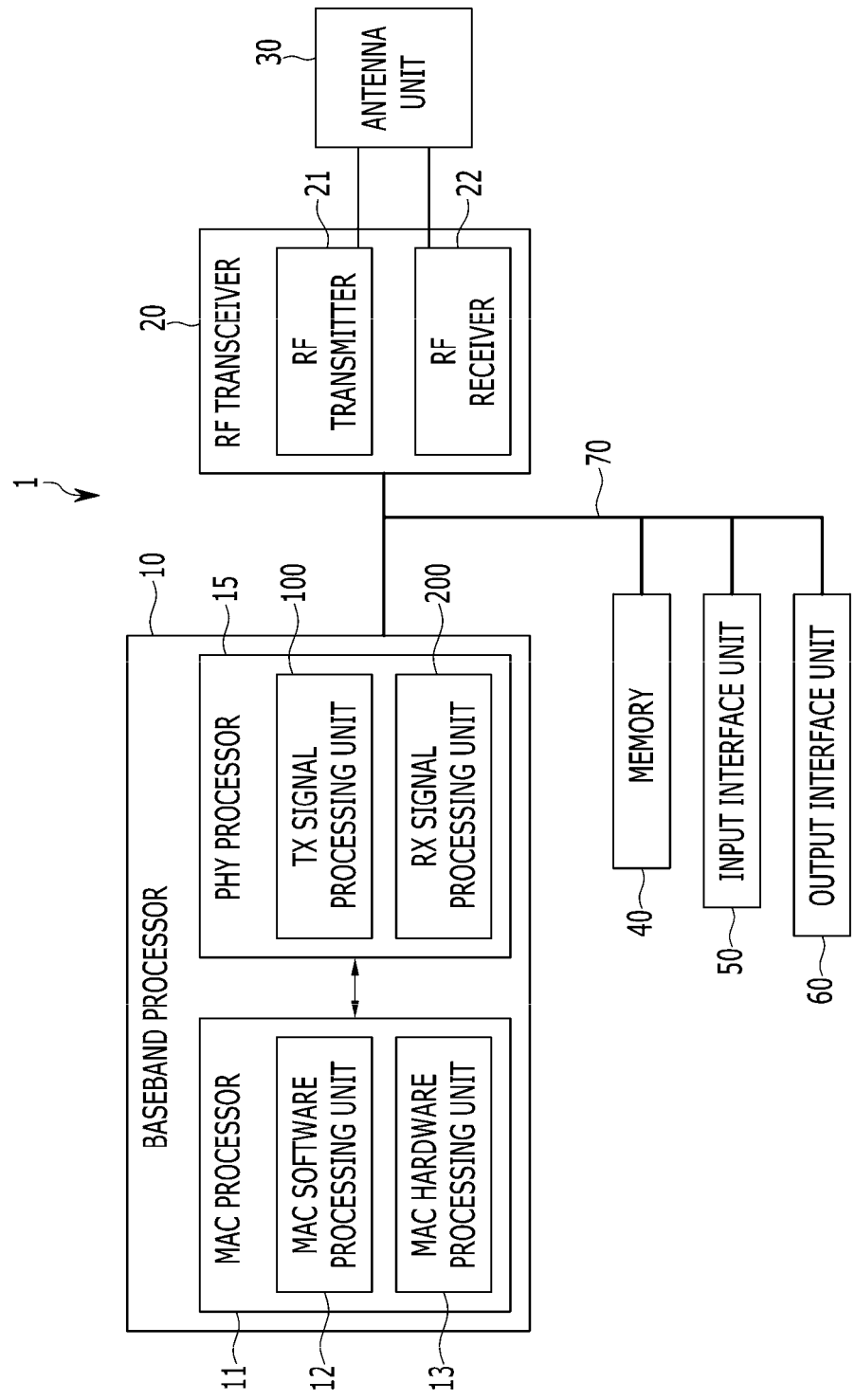
FIG. 1 is a schematic block diagram of a WLAN device according to an embodiment.

In the following detailed description, only certain embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. The plurality of WLAN devices may include a WLAN device that is an access point and the other WLAN devices that are non-AP stations (non-AP STAs). Alternatively, all of the plurality of WLAN devices may be non-AP STAs in ad-hoc networking. In general, the AP STA and the non-AP STA may be collectively called the STAs. However, for ease of description, herein, only the non-AP STA are referred to as the STAs.

FIG. 1 is a schematic block diagram exemplifying a WLAN device according to an embodiment.

Referring to FIG. 1, the WLAN device 1 includes a baseband processor 10, a radio frequency (RF) transceiver 20, an antenna unit 30, a memory 40 including non-transitory computer-readable media, an input interface unit 50, an output interface unit 60 and a bus 70.

The baseband processor 10 performs baseband signal processing and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer and the MAC hardware processing unit 13 may implement remaining functions of the MAC layer as hardware (hereinafter referred to "MAC hardware"). However, the MAC processor 11 is not limited to this.

The PHY processor 15 includes a transmitting (Tx) signal processing unit 100 and a receiving (Rx) signal processing unit 200.

The baseband processor 10, the memory 40, the input interface unit 50 and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
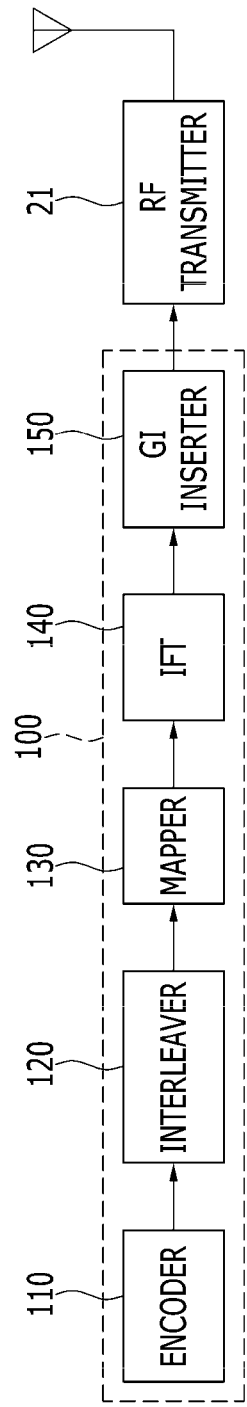
FIG. 2 is a schematic block diagram of a transmitting signal processor in an embodiment suitable for use in a WLAN.

FIG. 2 is a schematic block diagram of a transmitting signal processor 100 in an embodiment suitable for use in a WLAN.

Referring to FIG. 2, a transmitting signal processing unit 100 includes an encoder 110, an interleaver 120, a mapper 130, an inverse Fourier transformer (IFT) 140 and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams $N_{SS}$. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
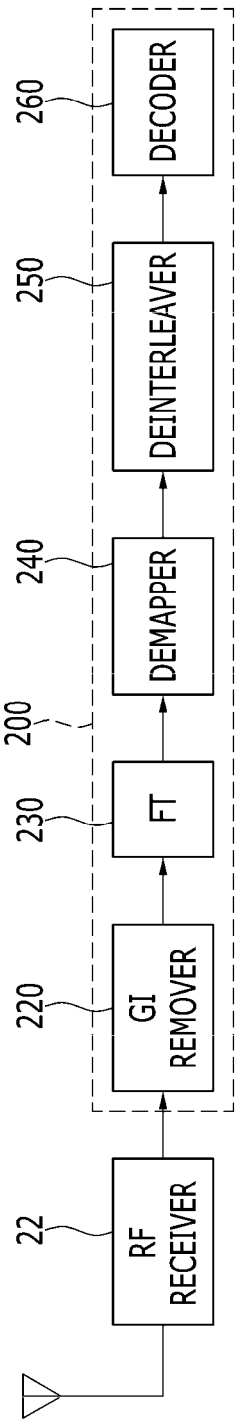
FIG. 3 is a schematic block diagram of a receiving signal processing unit in an embodiment suitable for use in the WLAN.

FIG. 3 is a schematic block diagram of a receiving signal processing unit according to an embodiment suitable for use in the WLAN.

Referring to FIG. 3, a receiving signal processing unit 200 includes a GI remover 220, a Fourier transformer (FT) 230, a demapper 240, a deinterleaver 250 and a decoder 260.

An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may include a spatial demapper for converting the Fourier transformed received symbols to constellation points of the space-time streams and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
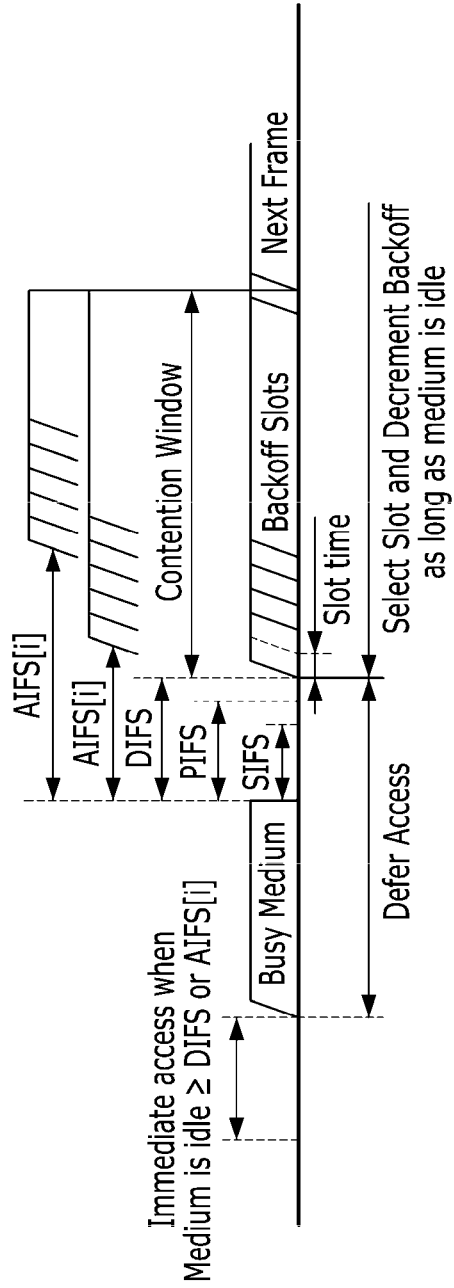
FIG. 4 shows Inter-Frame Space (IFS) relationships

FIG. 4 illustrates interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame and an authentication request/response frame. The control frame is used for controlling access to the medium. Subtype frames of the control frame include a request to send (RTS) frame, a clear to send (CTS) frame and an acknowledgement (ACK) frame. When the control frame is not a response frame of a previous frame, the WLAN device transmits the control frame after performing backoff when the DIFS has elapsed. When the control frame is the response frame of a previous frame, the WLAN device transmits the control frame without performing backoff when a short IFS (SIFS) has elapsed. The type and subtype of a frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC], has elapsed. In this case, the data frame, the management frame, or the control frame which is not the response frame may use the AIFS[AC].

Figure 5:
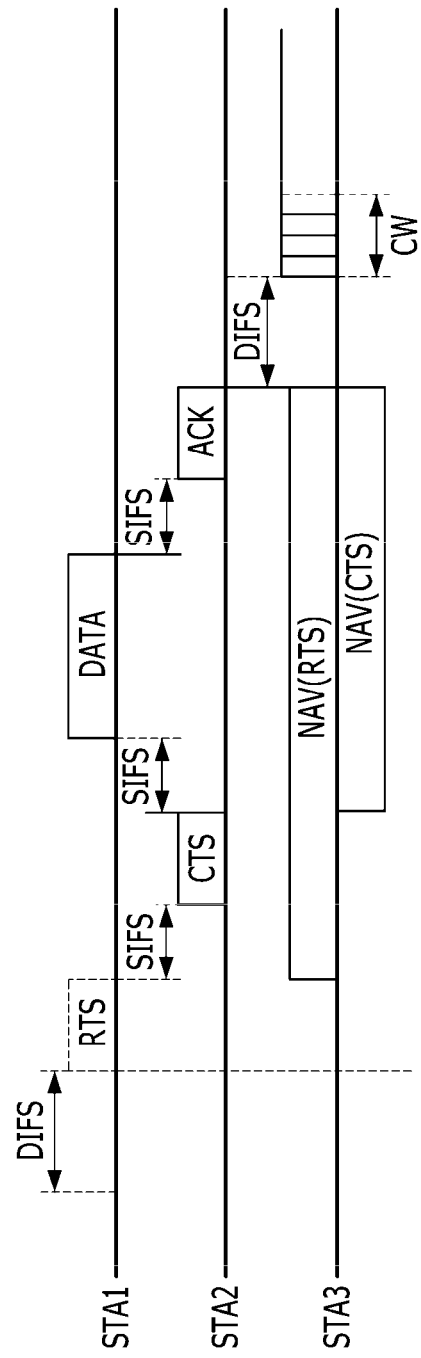
FIG. 5 is a schematic diagram showing a CSMA/CA based frame transmission procedure for avoiding collision between frames in a channel.

FIG. 5 is a schematic diagram illustrating a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data and STA3 is a third WLAN device which may be located at an area where a frame transmitted from the STA1 and/or a frame transmitted from the STA2 can be received by the third WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, that the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. For example, the NAV timer may be set for a duration of SIFS+CTS frame duration+SIFS+data frame duration+SIFS+ACK frame duration. When the STA3 receives the CTS frame, it may set the NAV timer for a transmission duration of subsequently transmitted frames (for example, a duration of SIFS+data frame duration+ SIFS+ACK frame duration) by using duration information included in the RTS CTS frame. For example, the NAV timer may be set for a duration of SIFS+data frame duration+SIFS+ACK frame duration. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff elapses.

Next, operations of an RTS frame and a CTS frame in a WLAN.

Figure 6:
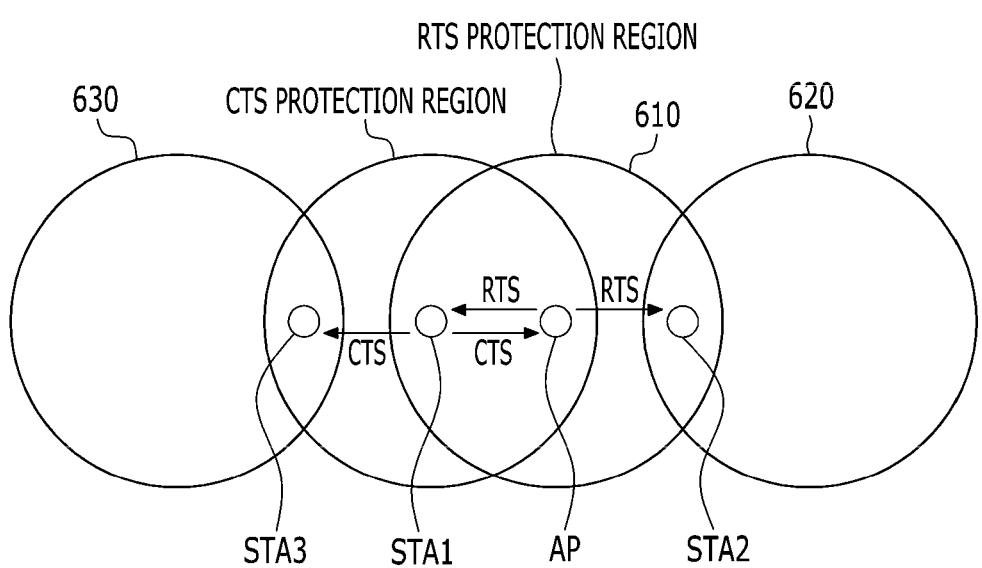
FIG. 6 and FIG. 7 show an example of downlink transmission in a WLAN.
Figure 7:
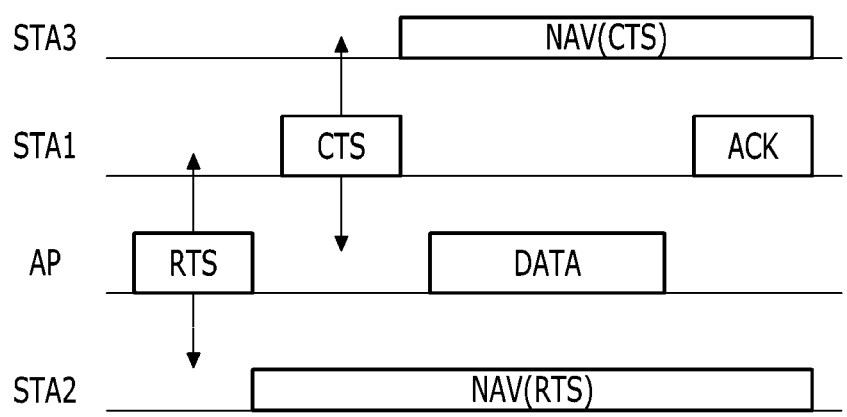
Figure 8:
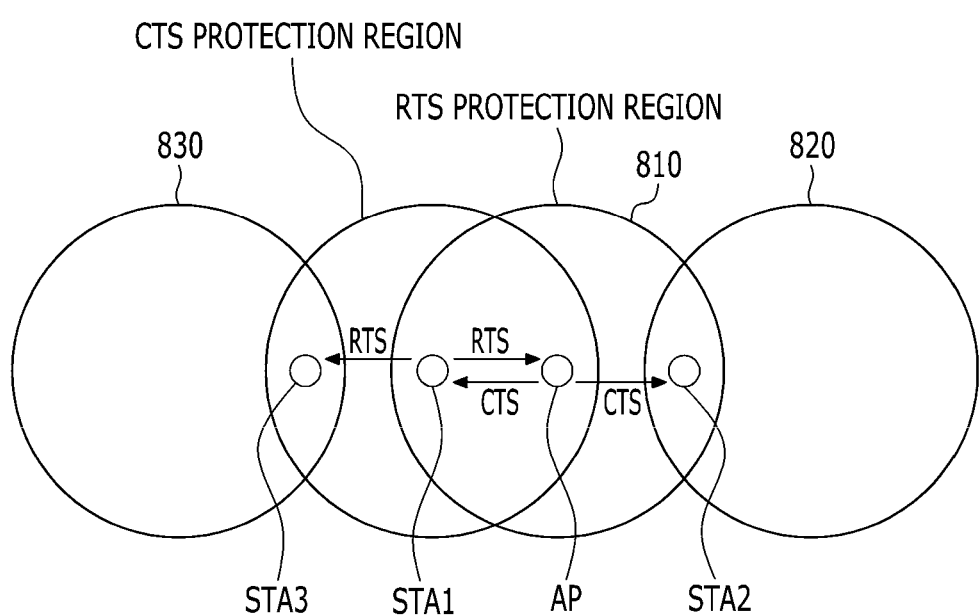
FIG. 8 and FIG. 9 show an example of uplink transmission in a WLAN.
Figure 9:
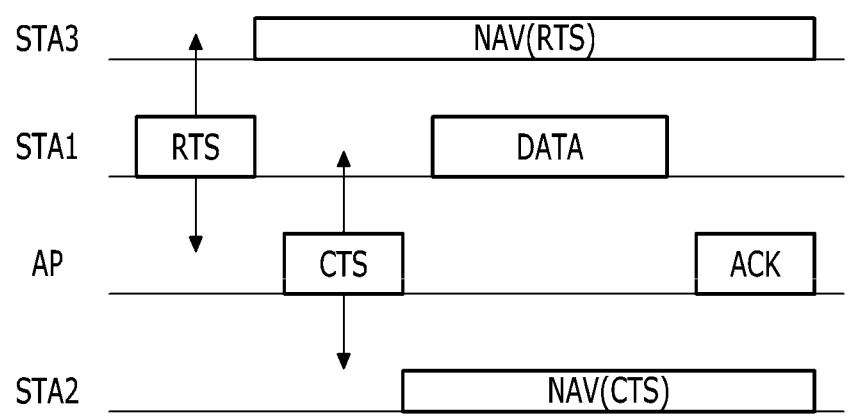
Figure 10:
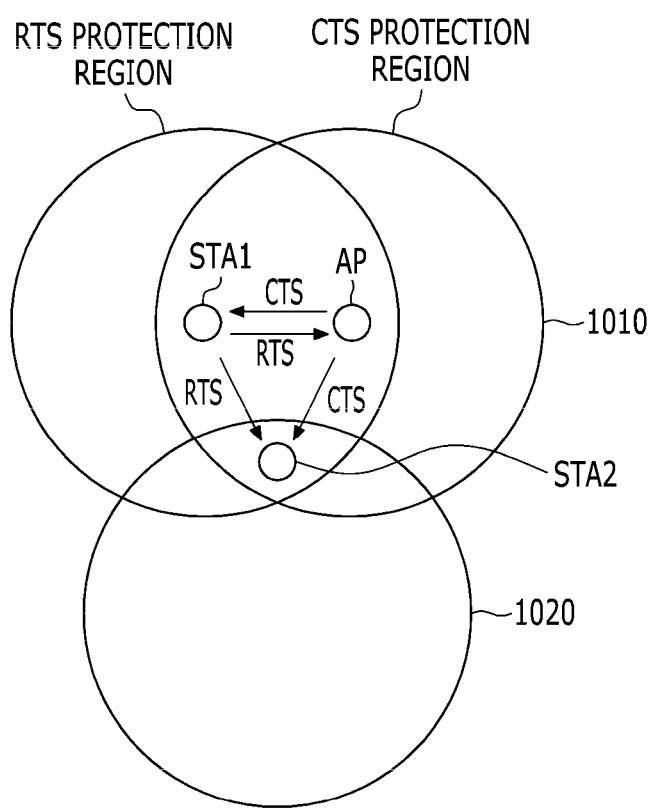
FIG. 10 and FIG. 11 show another example of uplink transmission in a WLAN.
Figure 11:
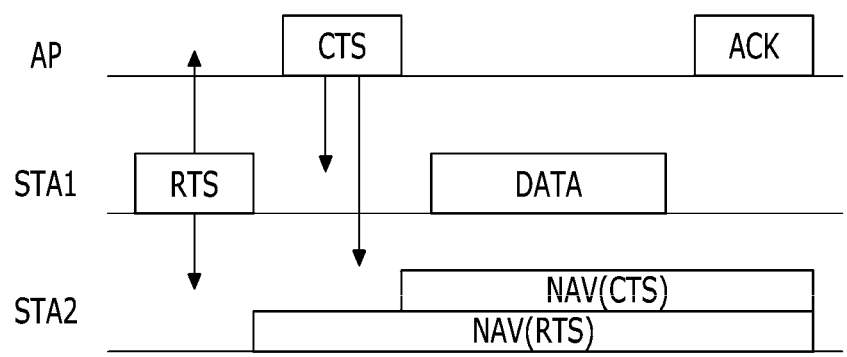

FIG. 6 and FIG. 7 show an example of downlink transmission in a WLAN, FIG. 8 and FIG. 9 show an example of uplink transmission in a WLAN, and FIG. 10 and FIG. 11 show another example of uplink transmission in a WLAN. It is assumed in FIG. 6 to FIG. 11 that a device AP is an access point and devices STA1, STA2, and STA3 are non-AP stations.

Referring to FIG. 6 and FIG. 7, when a transmitting device AP has downlink data to be transmitted to a receiving device STA1 in a BSS 610, the transmitting device AP transmits an RTS frame to notify this. A receiver address (RA) field of the RTS frame is set to an address of a receiving device STA1. The receiving device STA1 determines that its own address matches the RA field of the RTS frame. A device STA2 of a neighbor BSS 620 updates a NAV based on a duration field of the RTS frame because its own address does not match the RA field of the RTS frame. That is, devices included within an RTS protection region that is the coverage of the transmitting device AP can update the NAV based on the duration field of the RTS frame.

The receiving device STA1 determining that its own address matches the RA field of the RTS frame transmits a CTS frame after a SIFS interval in order to notify the transmitting device AP of available transmission. An RA field of the CTS frame is copied from the TA field of the RTS frame. The transmitting device AP determines that its own address matches the RA field of the CTS frame. A device STA3 of a neighbor BSS 630 updates a NAV based on a duration field of the CTS frame because its own address does not match the RA field of the CTS frame. That is, devices included within a CTS protection region that is the coverage of the receiving device STA1 can update the NAV based on the duration field of the CTS frame.

The transmitting device AP receiving the CTS frame transmits a data frame after the SIFS interval, and the receiving device STA1 receiving the data frame transmits an ACK frame after the SIFS interval.

As such, since the device STA2 cannot transmit a frame due to NAV protection set by the RTS frame of the neighbor BSS 610 and the device STA3 cannot transmit a frame due to NAV protection set by the CTS frame of the neighbor BSS 610, the network throughput can be deteriorated.

Referring to FIG. 8 and FIG. 9, when a transmitting device STA1 has uplink data to be transmitted to a receiving device AP in a BSS 810, the transmitting device STA1 transmits an RTS frame. An RA field of the RTS frame is set to an address of a receiving device AP. The receiving device AP determines that its own address matches the RA field of the RTS frame. A device STA3 of a neighbor BSS 830 updates a NAV based on a duration field of the RTS frame because its own address does not match the RA field of the RTS frame. That is, devices included within an RTS protection region that is the coverage of the transmitting device STA1 can update the NAV based on the duration field of the RTS frame.

The receiving device AP determining that its own address matches the RA field of the RTS frame transmits a CTS frame after a SIFS interval. An RA field of the CTS frame is copied from the TA field of the RTS frame. The transmitting device STA1 determines that its own address matches the RA field of the CTS frame. A device STA2 of a neighbor BSS 820 updates a NAV based on a duration field of the CTS frame because its own address does not match the RA field of the CTS frame. That is, devices included within a CTS protection region that is the coverage of the receiving device AP can update the NAV based on the duration field of the CTS frame.

The transmitting device STA1 receiving the CTS frame transmits a data frame after the SIFS interval, and the receiving device AP receiving the data frame transmits an ACK frame after the SIFS interval.

As such, since the device STA2 cannot transmit a frame due to NAV protection set by the CTS frame of the neighbor BSS 810 and the device STA3 cannot transmit a frame due to NAV set protection by the RTS frame of the neighbor BSS 810, the network throughput can be deteriorated.

Referring to FIG. 10 and FIG. 11, a transmitting device STA1 transmits an RTS frame to a receiving device AP in a BSS 1010, and the receiving device AP transmits a CTS frame to the transmitting device STA1. When a device STA2 of a neighbor BSS 1020 exists within an RTS protection region and a CTS protection region, the device STA2 updates a NAV based on the RTS frame and then updates the NAV based on the CTS frame.

As such, since the device STA2 cannot transmit a frame due to NAV protection set by the RTS frame and the CTS frame of the neighbor BSS 1010, the network throughput can be deteriorated.

Hereinafter, network conditions that may occur in accordance with interference relationship between two neighbor BSSs in a wireless communication network according to an embodiment are described. The wireless communication network according to an embodiment may be the WLAN described above. Particularly, the wireless communication network according to an embodiment may be a high efficiency (HE) WLAN developed by the IEEE 802.11ax task group among WLANs. Hereinafter, it is assumed for convenience that the wireless communication network according to an embodiment is a HE WLAN.

FIG. 12 to FIG. 27 show various examples of network conditions in a wireless communication network according to an embodiment.

Referring to FIG. 12 to FIG. 27, when a certain BSS attempts to transmit a frame, a neighbor BSS may be transmitting a frame. Such a neighbor BSS may be an overlapping basic service set (OBSS) operating on the same channel as the BSS attempting to transmit the frame and within (either partly or wholly) its basic service area (BSA). Hereinafter, the neighbor BSS is referred to as an "OBSS" and the BSS attempting to transmit the frame is referred to as a "MyBSS."

In the OBSS, a transmitting device OTX transmits an RTS frame to the receiving device ORX, and a receiving device ORX receiving the RTS frame transmits a CTS frame to the transmitting device OTX after a SIFS interval. Accordingly, the transmitting device OTX transmits a data frame to the receiving device ORX after the SIFS interval from the CTS frame, and the receiving device ORX receiving the data frame transmits an ACK frame on the data frame after the SIFS interval.

In this case, when a transmitting device MTX and a receiving device MRX attempt to exchange frames in a MyBSS, they may not transmit the frames because a NAV is set by the RTS frame or the CTS frame of the OBSS.

The transmitting device MTX and the receiving device MRX may be devices supporting a wireless communication network according to an embodiment. Hereinafter, such devices are referred to as HE devices. Further, in a case of downlink transmission, the transmitting device MTX may be an AP and the receiving device MRX may be a station. In uplink transmission, the transmitting device MTX may be a station and the receiving device MRX may be an AP.

Figure 12:
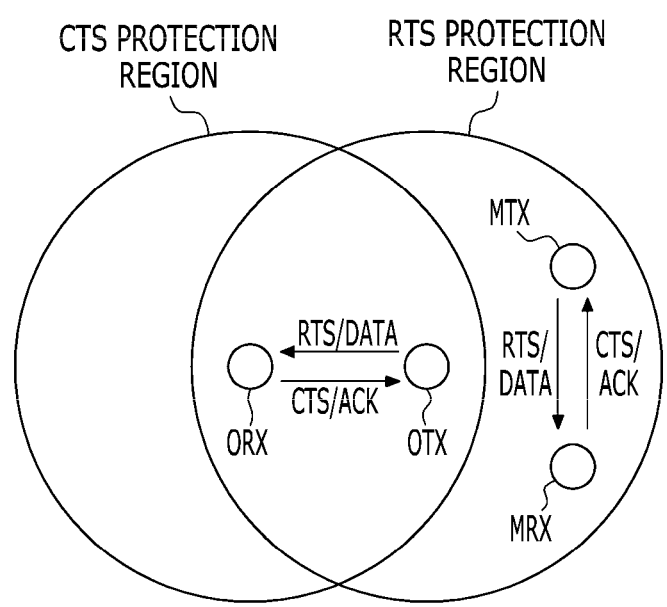
FIG. 12 shows an example of a network condition 1a in a wireless communication network according to an embodiment.

Referring to FIG. 12, the transmitting device MTX and the receiving device MRX of the MyBSS are included within an RTS protection range of an RTS frame transmitted by the transmitting device OTX of the OBSS but are not included within a CTS protection range of a CTS frame transmitted by the receiving device ORX of the OBSS.

In this case, the transmitting device MTX and the receiving device MRX of the MyBSS can receive the RTS frame of the OBSS but cannot receive the CTS frame of the OBSS. That is, NAVs can be set to the transmitting device MTX and the receiving device MRX by the RTS frame. Hereinafter, such a network condition is referred to as a "network condition 1a."

Figure 13:
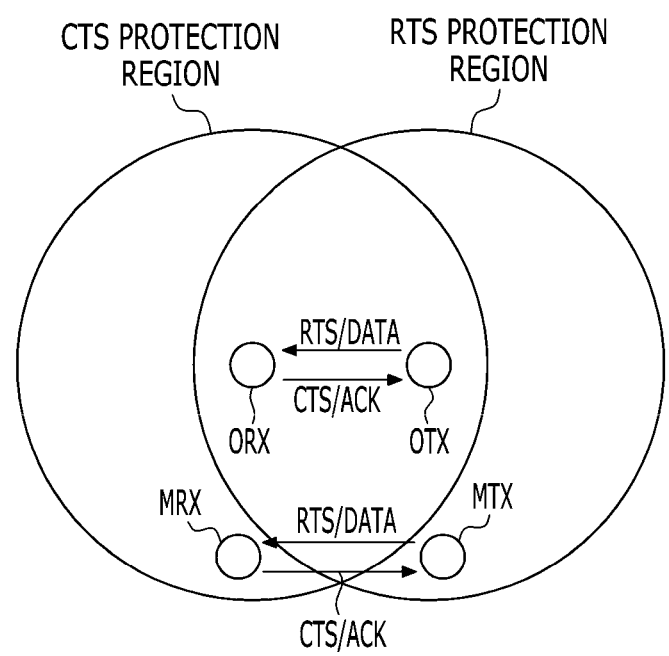
FIG. 13 shows an example of a network condition 1b in a wireless communication network according to an embodiment.

Referring to FIG. 13, the transmitting device MTX of the MyBSS is included within the RTS protection range of the OBSS but is not included within the CTS protection range of the OBSS. The receiving device MRX of the MyBSS is included within the CTS protection range of the OBSS but is not included within the RTS protection range of the OBSS.

In this case, the transmitting device MTX of the MyBSS can receive the RTS frame of the OBSS but cannot receive the CTS frame of the OBSS. The receiving device MRX of the MyBSS can receive the CTS frame of the OBSS but cannot receive the RTS frame of the OBSS. That is, the NAV can be set to the transmitting device MTX by the RTS frame, and the NAV can be set to the receiving device MRX by the CTS frame. Hereinafter, such a network condition is referred to as a "network condition 1b."

Figure 14:
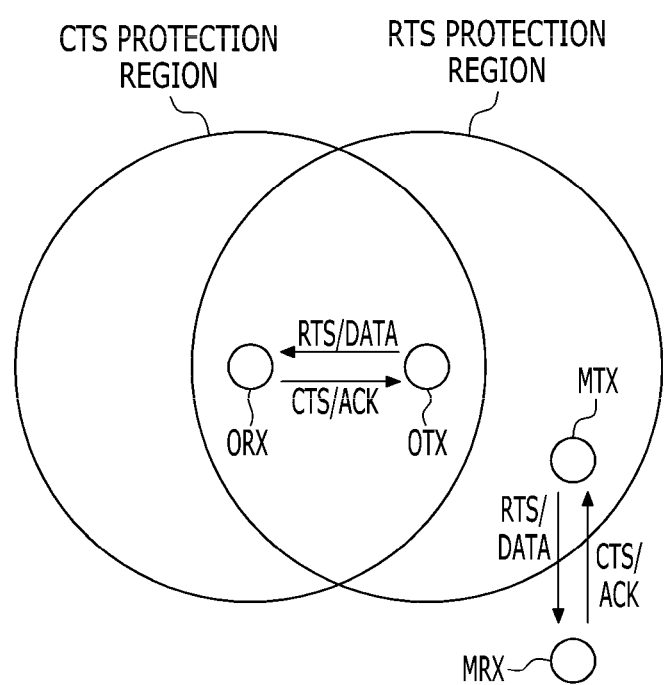
FIG. 14 shows an example of a network condition 1c in a wireless communication network according to an embodiment.

Referring to FIG. 14, the transmitting device MTX of the MyBSS is included within the RTS protection range of the OBSS but is not included within the CTS protection range of the OBSS. The receiving device MRX of the MyBSS is not included within the RTS and CTS protection ranges of the OBSS.

In this case, the transmitting device MTX of the MyBSS can receive the RTS frame of the OBSS but cannot receive the CTS frame of the OBSS. The receiving device MRX of the MyBSS cannot receive both the RTS frame and the CTS frame of the OBSS. That is, the NAV can be set to the transmitting device MTX by the RTS frame. Hereinafter, such a network condition is referred to as a "network condition 1c."

Figure 15:
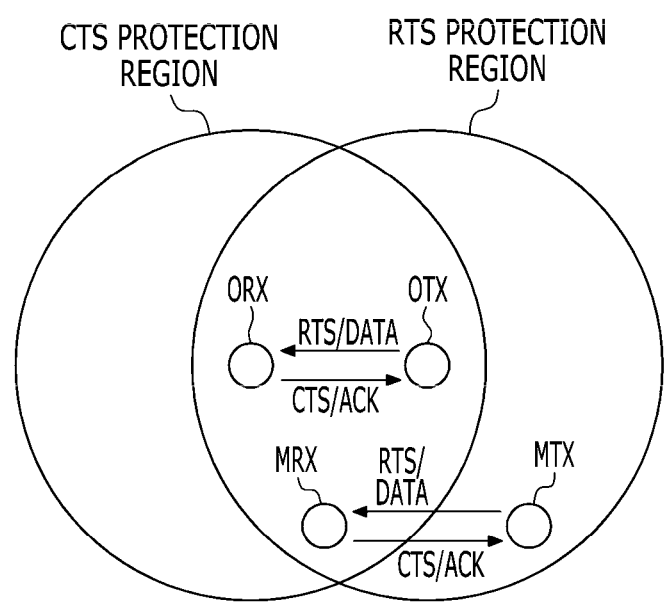
FIG. 15 shows an example of a network condition 1d in a wireless communication network according to an embodiment.

Referring to FIG. 15, the transmitting device MTX of the MyBSS is included within the RTS protection range of the OBSS but is not included within the CTS protection range of the OBSS. The receiving device MRX of the MyBSS is included within the RTS and CTS protection ranges of the OBSS.

In this case, the transmitting device MTX of the MyBSS can receive the RTS frame of the OBSS but cannot receive the CTS frame of the OBSS. The receiving device MRX of the MyBSS can receive both the RTS frame and the CTS frame of the OBSS. That is, the NAV can be set to the transmitting device MTX by RTS frame, and the NAVs can be set to the receiving device MRX by the RTS frame and the CTS frame. Hereinafter, such a network condition is referred to as a "network condition 1d."

Figure 16:
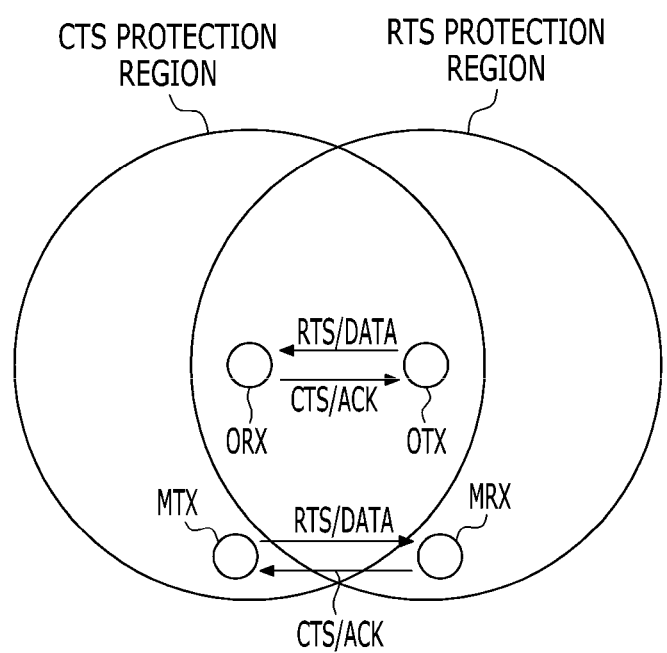
FIG. 16 shows an example of a network condition 2a in a wireless communication network according to an embodiment.

Referring to FIG. 16, the transmitting device MTX of the MyBSS is included within the CTS protection range of the OBSS but is not included within the RTS protection range of the OBSS. The receiving device MRX of the MyBSS is included within the RTS protection range of the OBSS but is not included within the CTS protection range of the OBSS.

In this case, the transmitting device MTX of the MyBSS can receive the CTS frame of the OBSS but cannot receive the RTS frame of the OBSS. The receiving device MRX of the MyBSS can receive the RTS frame of the OBSS cannot receive the CTS frame of the OBSS. That is, the NAV can be set to the transmitting device MTX by the CTS frame, and the NAV can be set to the receiving device MRX by the RTS frame. Hereinafter, such a network condition is referred to as a "network condition 2a."

Figure 17:
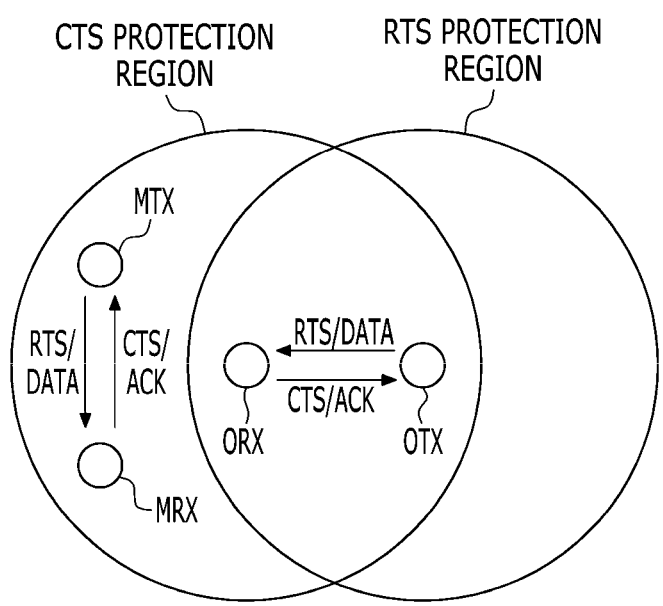
FIG. 17 shows an example of a network condition 2b in a wireless communication network according to an embodiment.

Referring to FIG. 17, the transmitting device MTX and the receiving device MRX of the MyBSS are not included within the RTS protection range of the OBSS but are included within the CTS protection range of the OBSS.

In this case, the transmitting device MTX and the receiving device MRX of the MyBSS can receive the CTS frame of the OBSS but cannot receive the RTS frame of the OBSS. That is, the NAVs can be set to the transmitting device MTX and the receiving device MRX by the CTS frame. Hereinafter, such a network condition is referred to as a "network condition 2b."

Figure 18:
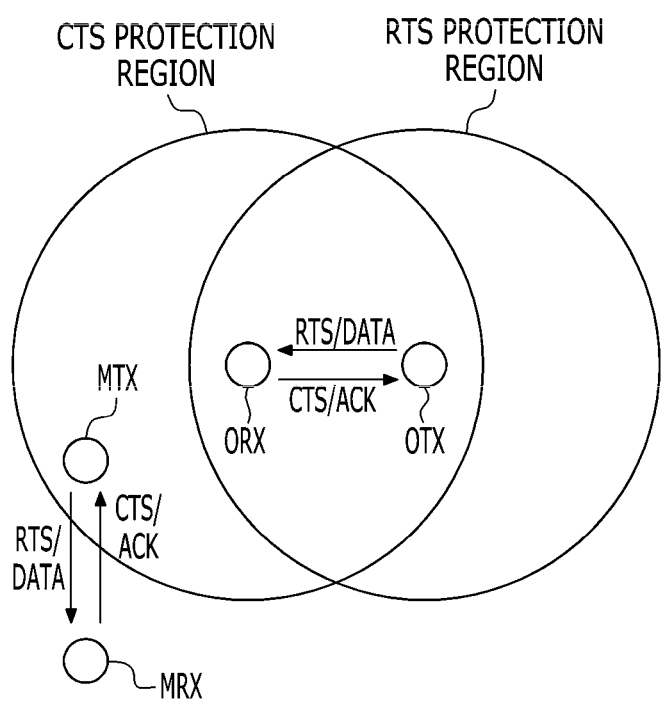
FIG. 18 shows an example of a network condition 2c in a wireless communication network according to an embodiment.

Referring to FIG. 18, the transmitting device MTX of the MyBSS is included within the CTS protection range of the OBSS but is not included within the RTS protection range of the OBSS. The receiving device MRX of the MyBSS is not included within the RTS and CTS protection ranges of the OBSS.

In this case, the transmitting device MTX of the MyBSS can receive the CTS frame of the OBSS but cannot receive the RTS frame of the OBSS. The receiving device MRX of the MyBSS cannot receive both the RTS frame and the CTS frame of the OBSS. That is, the NAV can be set to the transmitting device MTX by the CTS frame. Hereinafter, such a network condition is referred to as a "network condition 2c."

Figure 19:
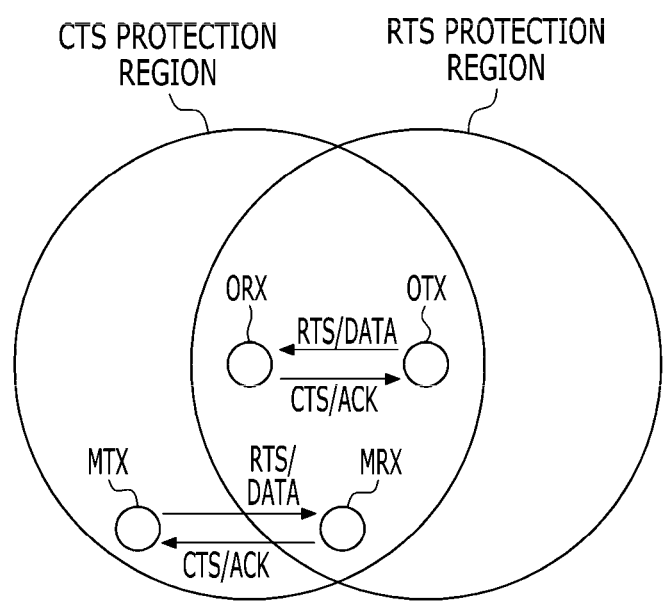
FIG. 19 shows an example of a network condition 2d in a wireless communication network according to an embodiment.

Referring to FIG. 19, the transmitting device MTX of the MyBSS is included within the CTS protection range of the OBSS but is not included within the RTS protection range of the OBSS. The receiving device MRX of the MyBSS is included within the RTS and CTS protection ranges of the OBSS.

In this case, the transmitting device MTX of the MyBSS can receive the CTS frame of the OBSS cannot receive the RTS frame of the OBSS. The receiving device MRX of the MyBSS can receive both the RTS frame and the CTS frame of the OBSS. That is, the NAV can be set to the transmitting device MTX by the CTS frame, the NAVs can be set to the receiving device MRX by the RTS frame and the CTS frame. Hereinafter, such a network condition is referred to as a "network condition 2d."

Figure 20:
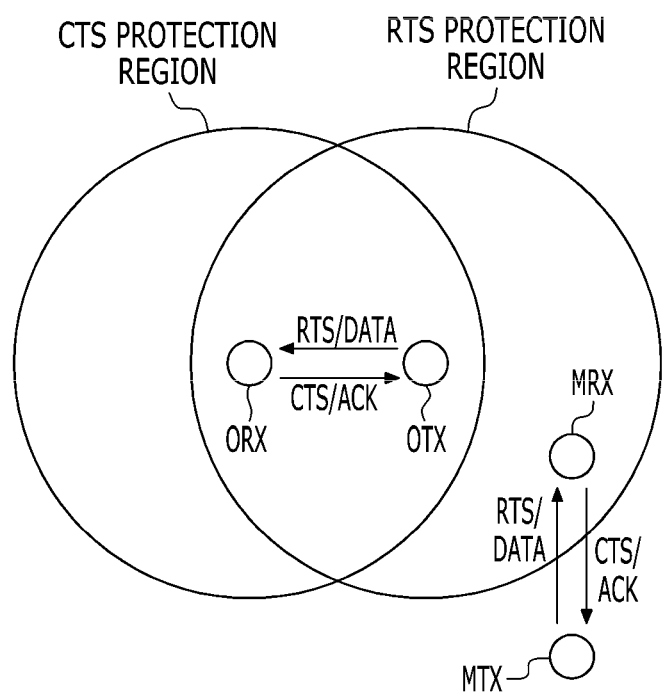
FIG. 20 shows an example of a network condition 3a in a wireless communication network according to an embodiment.

Referring FIG. 20, the transmitting device MTX of the MyBSS is not included within the RTS and CTS protection ranges of the OBSS. The receiving device MRX of the MyBSS is included within the RTS protection range of the OBSS but is not included within the CTS protection range of the OBSS.

In this case, the transmitting device MTX of the MyBSS cannot receive both the RTS frame and the CTS frame of the OBSS. The receiving device MRX of the MyBSS can receive the RTS frame of the OBSS but cannot receive the CTS frame of the OBSS. That is, the NAV can be set to the receiving device MRX by the RTS frame. Hereinafter, such a network condition is referred to as a "network condition 3a."

Figure 21:
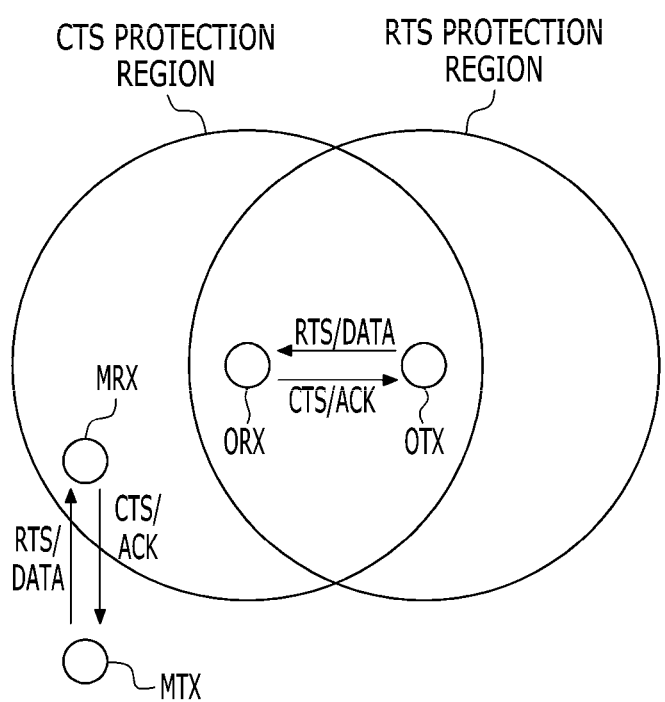
FIG. 21 shows an example of a network condition 3b in a wireless communication network according to an embodiment.

Referring to FIG. 21, the transmitting device MTX of the MyBSS is not included within the RTS and CTS protection ranges of the OBSS. The receiving device MRX of the MyBSS is included within the CTS protection range of the OBSS but is not included within the RTS protection range of the OBSS.

In this case, the transmitting device MTX of the MyBSS cannot receive both the RTS frame and the CTS frame of the OBSS. The receiving device MRX of the MyBSS can receive the CTS frame of the OBSS but cannot receive the RTS frame of the OBSS. That is, the NAV can be set to the receiving device MRX by the CTS frame. Hereinafter, such a network condition is referred to as a "network condition 3b."

Figure 22:
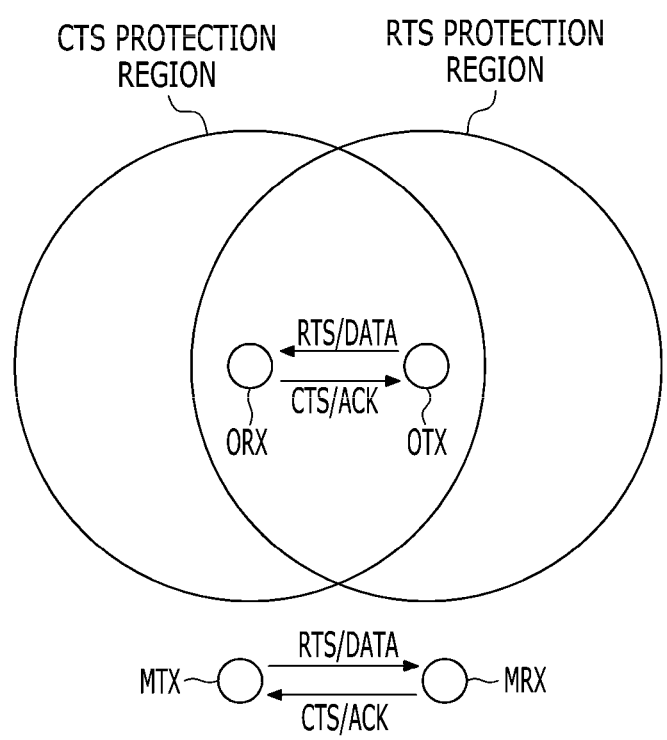
FIG. 22 shows an example of a network condition 3c in a wireless communication network according to an embodiment.

Referring to FIG. 22, the transmitting device MTX and the receiving device MRX of the MyBSS are not included within the RTS and CTS protection ranges of the OBSS.

In this case, the transmitting device MTX and the receiving device MRX of the MyBSS cannot receive both the RTS frame and the CTS frame of the OBSS. That is, no NAV is set to the transmitting device MTX and the receiving device MRX by the RTS frame and the CTS frame. Hereinafter, such a network condition is referred to as a "network condition 3c."

Figure 23:
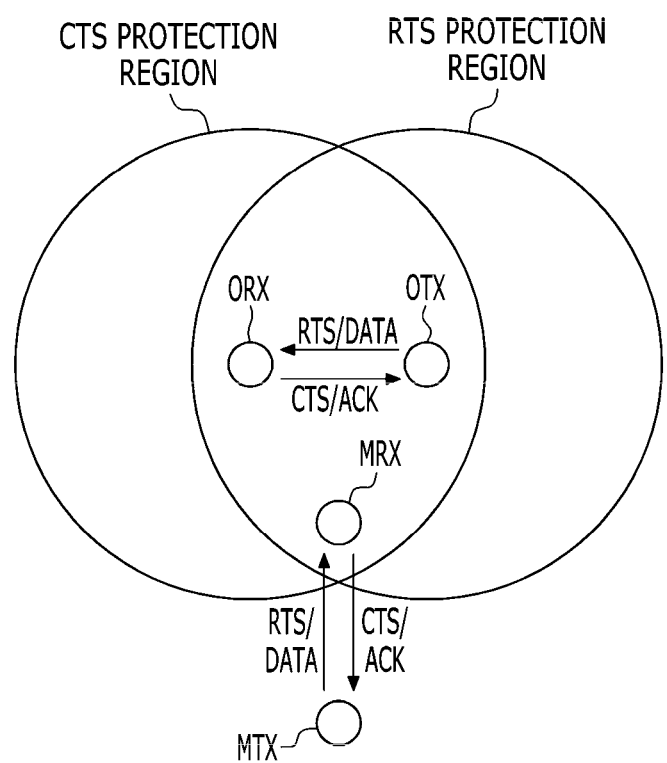
FIG. 23 shows an example of a network condition 3d in a wireless communication network according to an embodiment.

Referring to FIG. 23, the transmitting device MTX of the MyBSS is not included within the RTS and CTS protection ranges of the OBSS, and the receiving device MRX of the MyBSS is included within the RTS and CTS protection ranges of the OBSS.

In this case, the transmitting device MTX of the MyBSS cannot receive both the RTS frame and the CTS frame of the OBSS, and the receiving device MRX of the MyBSS can receive both the RTS frame and the CTS frame of the OBSS. That is, the NAVs can be set to the receiving device MRX by the RTS frame and the CTS frame. Hereinafter, such a network condition is referred to as a "network condition 3d."

Figure 24:
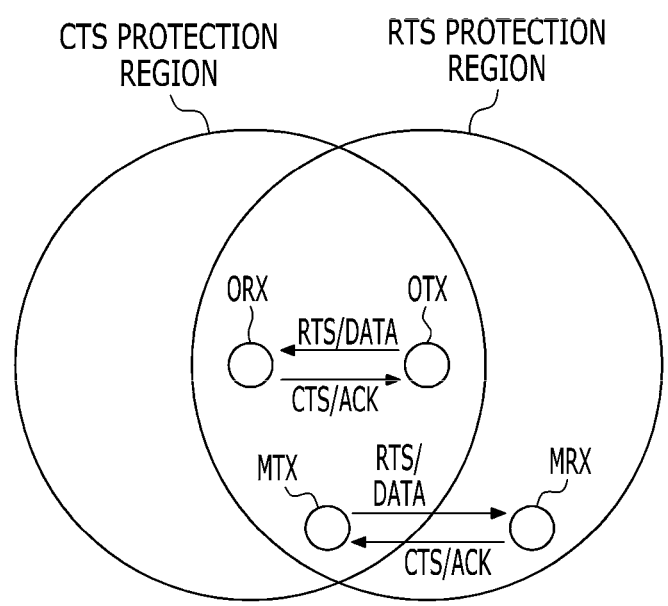
FIG. 24 shows an example of a network condition 4a in a wireless communication network according to an embodiment.

Referring to FIG. 24, the transmitting device MTX of the MyBSS is included within the RTS and CTS protection ranges of the OBSS. The receiving device MRX of the MyBSS is included within the RTS protection range of the OBSS but is not included within the CTS protection range of the OBSS.

In this case, the transmitting device MTX of the MyBSS can receive both the RTS frame and the CTS frame of the OBSS. The receiving device MRX of the MyBSS can receive the RTS frame of the OBSS but cannot receive the CTS frame of the OBSS. That is, the NAVs can be set to the transmitting device MTX by the RTS frame and the CTS frame, and the NAV can be set to the receiving device MRX by the RTS frame. Hereinafter, such a network condition is referred to as a "network condition 4a."

Figure 25:
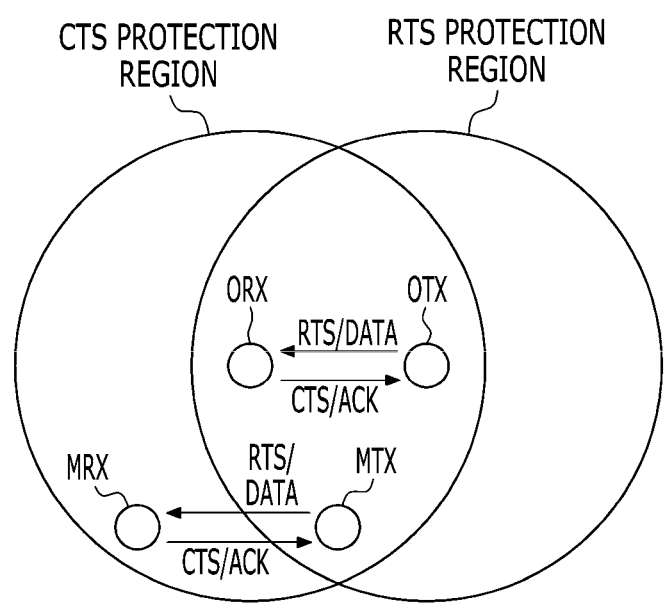
FIG. 25 shows an example of a network condition 4b in a wireless communication network according to an embodiment.

Referring to FIG. 25, the transmitting device MTX of the MyBSS is included within the RTS and CTS protection ranges of the OBSS. The receiving device MRX of the MyBSS is included within the CTS protection range of the OBSS but is not included within the RTS protection range of the OBSS.

In this case, the transmitting device MTX of the MyBSS can receive both the RTS frame and the CTS frame of the OBSS. The receiving device MRX of the MyBSS can receive the CTS frame of the OBSS but cannot receive the RTS frame of the OBSS. That is, the NAVs can be set to the transmitting device MTX by the RTS frame and the CTS frame, and the NAV can be set to the receiving device MRX by the CTS frame. Hereinafter, such a network condition is referred to as a "network condition 4b."

Figure 26:
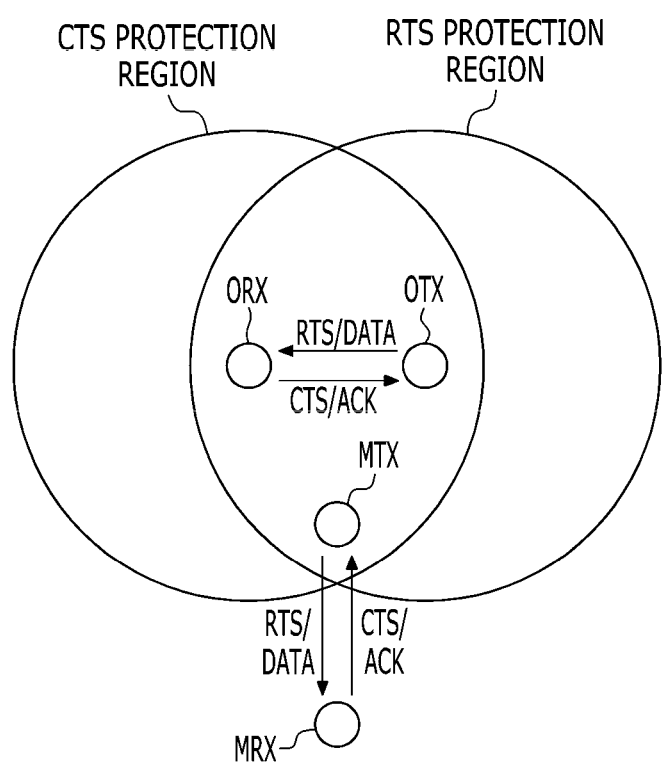
FIG. 26 shows an example of a network condition 4c in a wireless communication network according to an embodiment.

Referring to FIG. 26, the transmitting device MTX of the MyBSS is included within the RTS and CTS protection ranges of the OBSS, and the receiving device MRX of the MyBSS is not included within the RTS and CTS protection ranges of the OBSS.

In this case, the transmitting device MTX of the MyBSS can receive both the RTS frame and the CTS frame of the OBSS, and the receiving device MRX of the MyBSS cannot receive both the RTS frame and the CTS frame of the OBSS. That is, the NAVs can be set to the transmitting device MTX by the RTS frame and the CTS frame. Hereinafter, such a network condition is referred to as a "network condition 4c."

Figure 27:
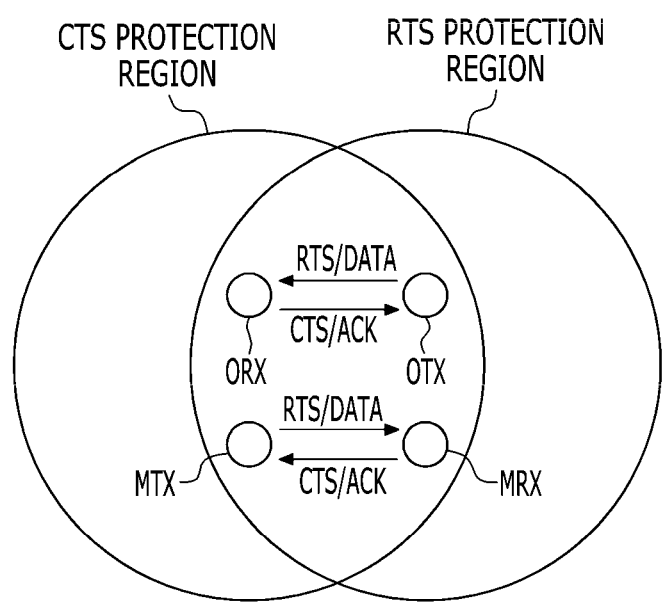
FIG. 27 shows an example of a network condition 4d in a wireless communication network according to an embodiment.

Referring to FIG. 27, the transmitting device MTX and the receiving device ORX of the MyBSS are included within the RTS and CTS protection ranges of the OBSS.

In this case, the transmitting device MTX and the receiving device MRX of the MyBSS can receive both the RTS frame and the CTS frame of the OBSS. That is, the NAVs can be set to the transmitting device MTX and the receiving device MRX by the RTS frame and the CTS frame. Hereinafter, such a network condition is referred to as a "network condition 4d."

The network conditions described with reference to FIG. 12 to FIG. 27 may be arranged as in Table 1.

Further, in a case that the transmitting device MTX of the MyBSS transmits the data frame during a time when the receiving device ORX of the OBSS transmits an ACK frame, the data frame of the MyBSS may act the interference on the transmitting device OTX that receives an ACK frame in the OBSS. Therefore, the transmitting device MTX of the MyBSS transmits the data frame with the lower power than the OBSS during an ACK frame transmission time of the OBSS. Since the data frame of the MyBSS has the lower power than the ACK frame of the OBSS, the transmitting device OTX of the OBSS can successfully receive the ACK frame from the receiving device ORX. Hereinafter, the data frame that is simultaneously transmitted in the MyBSS with the different power from an OBSS frame during the frame transmission time of the OBSS is referred to as a "transmission power control (TPC) ST data frame."

TABLE 1

|           |                                          | Rx device                                  |                                           |                                             |                                          |
|-----------|------------------------------------------|--------------------------------------------|-------------------------------------------|---------------------------------------------|------------------------------------------|
|           |                                          | RTS Rx possible/CTS Rx impossible          | RTS Rx impossible/CTS Rx possible         | RTS Rx impossible/CTS Rx impossible         | RTS Rx possible/CTS Rx possible          |
| Tx device | RTS Rx possible/ CTS Rx impossible       | Network condition 1a                       | Network condition 1b                      | Network condition 1c                        | Network condition 1d                     |
|           | RTS Rx impossible/ CTS Rx possible       | Network condition 2a                       | Network condition 2b                      | Network condition 2c                        | Network condition 2d                     |
|           | RTS Rx impossible/ CTS Rx impossible     | Network condition 3a                       | Network condition 3b                      | Network condition 3c                        | Network condition 3d                     |
|           | RTS Rx possible/ CTS Rx possible         | Network condition 4a                       | Network condition 4b                      | Network condition 4c                        | Network condition 4d                     |

Next, a frame transmitting method by a device under the network conditions is described.

FIG. 28 to FIG. 43 show various examples of a frame transmitting method under a network condition in a wireless communication network according to an embodiment.

Figure 28:
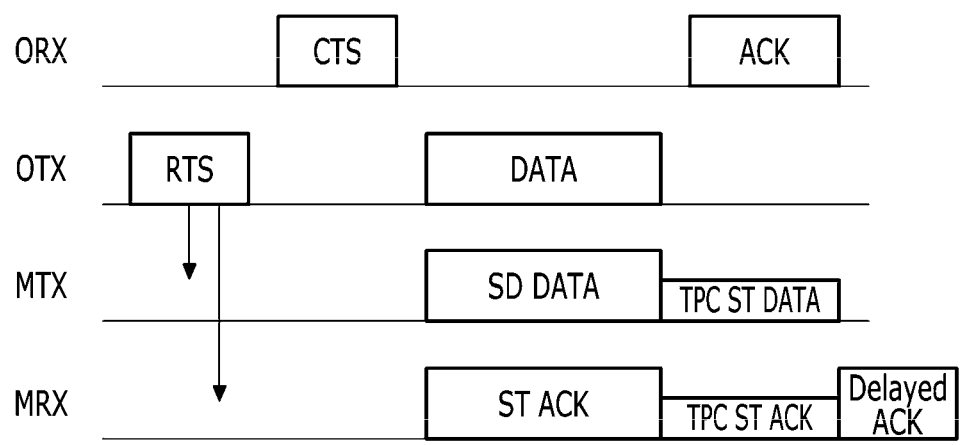
FIG. 28 shows an example of a frame transmitting method under a network condition 1a in a wireless communication network according to an embodiment.

Referring to FIG. 12 and FIG. 28, a transmitting device MTX and a receiving device MRX of a MyBSS can receive an RTS frame of an OBSS but cannot receive a CTS frame of the OBSS, in a network condition 1a. Therefore, when the transmitting device MTX and the receiving device MRX of the MyBSS transmit frames with substantially the same power as the OBSS, the frames transmitted by the transmitting device MTX and the receiving device MRX may act as interferences on the transmitting device OTX of the OBSS but may not act the interferences on the receiving device ORX of the OBSS.

Accordingly, the transmitting device MTX of the MyBSS may a data frame with substantially the same power as the data frame of the OBSS during a time when the transmitting device OTX of the OBSS transmits a data frame. Since the data frame of the MyBSS does not act the interference on the receiving device ORX of the OBSS, the receiving device ORX of the OBSS can successfully receive the data frame from the transmitting device OTX. Hereinafter, the data frame that is simultaneously transmitted in the MyBSS with substantially the same power during a frame transmission time of the OBSS is referred to as a "simultaneous transmitting (ST) data frame."

In some embodiments, the transmitting device MTX of the MyBSS may identify the data frame transmission time of the OBSS based on the RTS frame received from the OBSS. For example, the transmitting device MTX can determine, as a time when the transmission of the data frame ends, a value obtained by subtracting twice of a SIFS interval, a transmission time of the CTS frame, and a transmission time of an ACK frame from a NAV value set by the RTS frame of the OBSS. That is, since the NAV value is set to "SIFS+CTS frame+SIFS+data frame+SIFS+ACK frame" by the RTS frame, the transmission end time of the data frame may be set to "NAV by RTS frame−SIFS−CTS frame−SIFS−ACK frame."

Therefore, in a case that the transmitting device MTX transmits the data frame during the data frame transmission time and the ACK frame transmission time of the OBSS, the transmitting device MTX may decrease the power of the data frame after the data frame transmission time of the OBSS that is identified based on the RTS frame.

In a case that the MyBSS completes transmitting the data frame during the data frame transmission time of the OBSS or before the data frame transmission time of the OBSS, the receiving device MRX of the MyBSS may transmit an ACK frame with substantially the same power as the data frame of the OBSS. Since the ACK frame of the MyBSS does not act the interference on the receiving device ORX of the OBSS, the receiving device ORX of the OBSS can successfully receive the data frame from the transmitting device OTX.

Hereinafter, the ACK frame that is simultaneously transmitted in the MyBSS with substantially the same power during the frame transmission time of the OBSS is referred to as an "ST ACK frame."

Further, if the MyBSS does not complete transmitting the ACK frame during the data frame transmission time of the OBSS, the ACK frame of the MyBSS may be transmitted during the ACK frame transmission time of the OBSS. In this case, since the ACK frame of the MyBSS may act the interference on the transmitting device OTX that receives the ACK frame in the OBSS, the receiving device MRX of the MyBSS transmits the ACK frame with the lower power than the ACK frame of the OBSS. The transmitting device OTX of the OBSS can successfully receive the ACK frame from the receiving device ORX because the ACK frame of the MyBSS has the lower power than the ACK frame of the OBSS. Hereinafter, the ACK frame that is simultaneously transmitted in the MyBSS with the different power from the OBSS frame during the frame transmission time of the OBSS is referred to as a "TPC ST ACK frame."

In some embodiments, the receiving device MRX of the MyBSS may identify the data frame transmission time of the OBSS based on the RTS frame received from the OBSS. Therefore, in a case that the receiving device MRX transmits the ACK frame during the data frame transmission time and the ACK frame transmission time of the OBSS, the receiving device MRX may decrease the power of the ACK frame after the data frame transmission time of the OBSS that is identified based on the RTS frame.

In some embodiment, if the ACK frame is not transmitted in the MyBSS until the ACK frame of the OBSS is transmitted, the receiving device MRX may transmit a delayed ACK frame after the ACK frame transmission of the OBSS.

Figure 29:
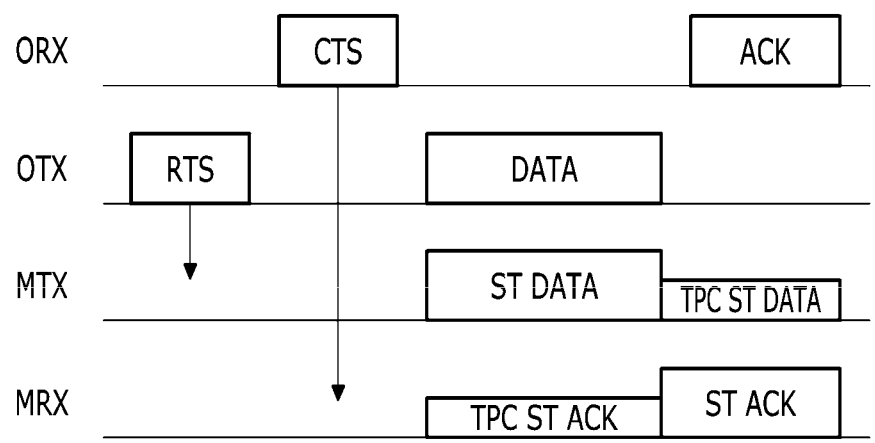
FIG. 29 shows an example of a frame transmitting method under a network condition 1b in a wireless communication network according to an embodiment.

Referring to FIG. 13 and FIG. 29, in a network condition 1b, the transmitting device MTX of the MyBSS can receive the RTS frame of the OBSS but cannot receive the CTS frame of the OBSS, and the receiving device MRX of the MyBSS can receive the CTS frame of the OBSS but cannot receive the RTS frame of the OBSS. Therefore, when the transmitting device MTX and the receiving device MRX of the MyBSS transmit frames with substantially the same power as the OBSS, the frame transmitted by the transmitting device MTX may act the interference on the transmitting device OTX of the OBSS but may not act the interference on the receiving device ORX of the OBSS, and the frame transmitted by the receiving device MRX may act the interference on the receiving device ORX of the OBSS but may not act the interference on the transmitting device OTX of the OBSS.

Accordingly, as described with reference to FIG. 28, the transmitting device MTX of the MyBSS may transmit the data frame (ST data frame) with substantially the same power as the OBSS during the data frame transmission time of the OBSS. The transmitting device MTX of the MyBSS may transmit the data frame (TPC ST data frame) with the lower power than the OBSS during the ACK frame transmission time of the OBSS.

Further, when the receiving device MRX of the MyBSS transmits the ACK frame during the data frame transmission time of the OBSS, the receiving device MRX may transmit the ACK frame (TPC ST ACK frame) with the lower power than the OBSS. Since the ACK frame of the MyBSS has the lower power than the data frame of the OBSS, the receiving device ORX of the OBSS can successfully receive the data frame from the transmitting device OTX. When the receiving device MRX of the MyBSS transmits the ACK frame during the ACK frame transmission time of the OBSS, the receiving device MRX may transmit the ACK frame (ST ACK frame) with substantially the same power as the OBSS. The transmitting device OTX of the OBSS can successfully receive the ACK frame from the receiving device ORX because the ACK frame of the MyBSS does not act the interference on the transmitting device OTX of the OBSS.

Figure 30:
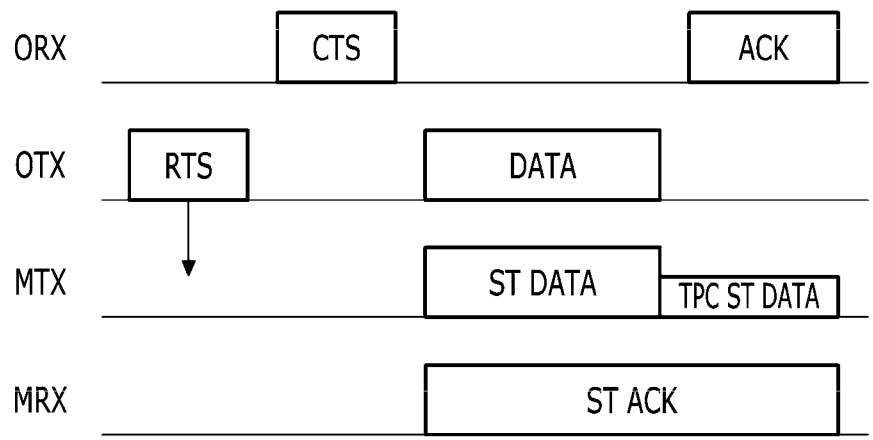
FIG. 30 shows an example of a frame transmitting method under a network condition 1c in a wireless communication network according to an embodiment.

Referring to FIG. 14 and FIG. 30, in a network condition 1c, the transmitting device MTX of the MyBSS can receive the RTS frame of the OBSS but cannot receive the CTS frame of the OBSS, and the receiving device MRX of the MyBSS cannot receive both the RTS frame and the CTS frame of the OBSS. Therefore, when the transmitting device MTX and the receiving device MRX of the MyBSS transmit frames with substantially the same power as the OBSS, the frame transmitted by the transmitting device MTX may act the interference on the transmitting device OTX of the OBSS but may not act the interference on the receiving device ORX of the OBSS, and the frame transmitted by the receiving device MRX may not act the interference on the transmitting device OTX and the receiving device ORX of the OBSS.

Accordingly, as described with reference to FIG. 28, the transmitting device MTX of the MyBSS may transmit the data frame (ST data frame) with substantially the same power as the OBSS during the data frame transmission time of the OBSS. The transmitting device MTX of the MyBSS may transmit the data frame (TPC ST data frame) with the lower power than the OBSS during the ACK frame transmission time of the OBSS.

Further, when the receiving device MRX of the MyBSS transmits the ACK frame during the data frame transmission time of the OBSS, the receiving device MRX may transmit the ACK frame (ST ACK frame) with substantially the same power as the OBSS. Since the ACK frame of the MyBSS does not act the interference on the transmitting device OTX of the OBSS, the transmitting device OTX of the OBSS can successfully receive the ACK frame from the receiving device ORX. When the receiving device MRX of the MyBSS transmits the ACK frame during the ACK frame transmission time of the OBSS, the receiving device MRX may transmit the ACK frame (ST ACK frame) with substantially the same power as the OBSS. The transmitting device OTX of the OBSS can successfully receive the ACK frame from the receiving device ORX because the ACK frame of the MyBSS does not act the interference on the transmitting device OTX of the OBSS.

Figure 31:
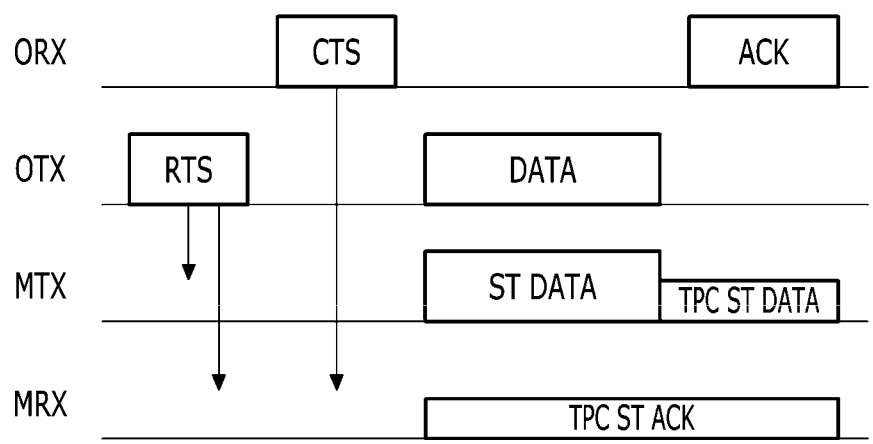
FIG. 31 shows an example of a frame transmitting method under a network condition 1d in a wireless communication network according to an embodiment.

Referring to FIG. 15 and FIG. 31, in a network condition 1d, the transmitting device MTX of the MyBSS can receive the RTS frame of the OBSS but cannot receive the CTS frame of the OBSS, and the receiving device MRX of the MyBSS can receive both the RTS frame and the CTS frame of the OBSS. Therefore, when the transmitting device MTX and the receiving device MRX of the MyBSS transmit frames with substantially the same power as the OBSS, the frame transmitted by the transmitting device MTX may act the interference on the transmitting device OTX of the OBSS but may not act the interference on the receiving device ORX of the OBSS, and the frame transmitted by the receiving device MRX may act the interference on the transmitting device OTX and the receiving device ORX of the OBSS.

Accordingly, as described with reference to FIG. 28, the transmitting device MTX of the MyBSS may transmit the data frame (ST data frame) with substantially the same power as the OBSS during the data frame transmission time of the OBSS. The transmitting device MTX of the MyBSS may transmit the data frame (TPC ST data frame) with the lower power than the OBSS during the ACK frame transmission time of the OBSS.

Further, when the receiving device MRX of the MyBSS transmits the ACK frame during the data frame transmission time of the OBSS, the receiving device MRX may transmit the ACK frame (TPC ST ACK frame) with the lower power than the OBSS. Since the ACK frame of the MyBSS has the lower power than the data frame of the OBSS, the receiving device ORX of the OBSS can successfully receive the data frame from the transmitting device OTX. When the receiving device MRX of the MyBSS transmits the ACK frame during the ACK frame transmission time of the OBSS, the receiving device MRX may transmit the ACK frame (TPC ST ACK frame) with the lower power than the OBSS. The transmitting device OTX of the OBSS can successfully receive the ACK frame from the receiving device ORX because the ACK frame of the MyBSS has the lower power than the ACK frame of the OBSS.

Figure 32:
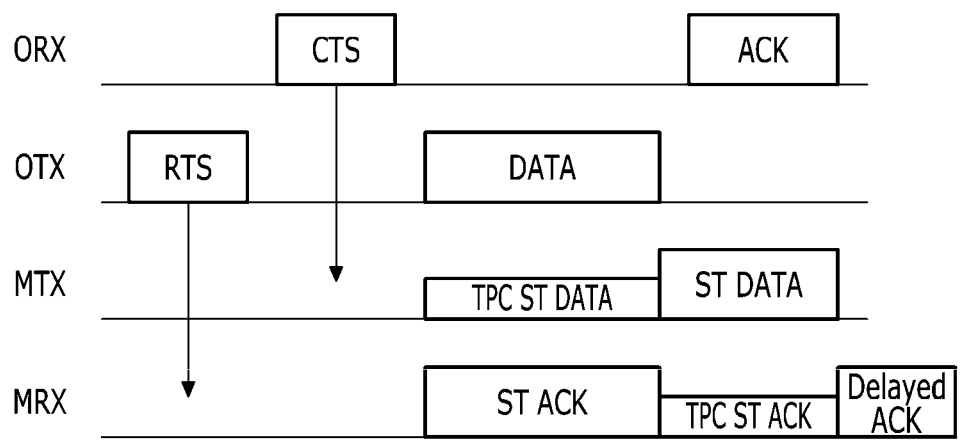
FIG. 32 shows an example of a frame transmitting method under a network condition 2a in a wireless communication network according to an embodiment.

Referring to FIG. 16 and FIG. 32, in a network condition 2a, the transmitting device MTX of the MyBSS can receive the CTS frame of the OBSS but cannot receive the RTS frame of the OBSS, and the receiving device MRX of the MyBSS can receive the RTS frame of the OBSS but cannot receive the CTS frame of the OBSS. Therefore, when the transmitting device MTX and the receiving device MRX of the MyBSS transmit frames with substantially the same power as the OBSS, the frame transmitted by the transmitting device MTX may not act the interference on the transmitting device OTX of the OBSS but may act the interference on the receiving device ORX of the OBSS, and the frame transmitted by the receiving device MRX may not act the interference on the receiving device ORX of the OBSS but may act the interference on the transmitting device OTX of the OBSS.

Accordingly, the transmitting device MTX of the MyBSS transmits the data frame (TPC ST data frame) with the lower power than the OBSS during a time when the transmitting device OTX of the OBSS transmits the data frame. Since the data frame of the MyBSS has the lower power than the data frame of the OBSS, the receiving device ORX of the OBSS can successfully receive the data frame from the transmitting device OTX.

The transmitting device MTX may transmit the data frame during a time when the receiving device ORX of the OBSS transmits the ACK frame. In this case, the transmitting device MTX of the MyBSS may transmit the data frame (ST data frame) with substantially the same power as the OBSS because the data frame of the MyBSS does not act the interference on the transmitting device OTX that receives the ACK frame in the OBSS.

In some embodiments, the transmitting device MTX of the MyBSS may identify a transmission time of the data frame of the OBSS based on the CTS frame received from the OBSS. For example, the transmitting device MTX can determine, as a time when the transmission of the data frame ends, a value obtained by subtracting the SIFS interval and the ACK frame transmission time from a NAV value set by the CTS frame of the OBSS. That is, since the NAV value is set to "SIFS+data frame+SIFS+ACK frame" by the CTS frame, the transmission end time of the data frame may be set to "NAV by CTS frame−SIFS−ACK frame."

Therefore, in a case that the transmitting device MTX transmits the data frame during the data frame transmission time and the ACK frame transmission time of the OBSS, the transmitting device MTX may increase the power of the data frame after the data frame transmission time of the OBSS that is identified based on the CTS frame.

Further, the receiving device MRX of the MyBSS may transmit the ACK frame (ST ACK frame) with substantially the same power as the data frame of the OBSS during the data frame transmission time of the OBSS Since the ACK frame of the MyBSS does not act the interference on the receiving device ORX of the OBSS, the receiving device ORX of the OBSS can successfully receive the data frame from the transmitting device OTX.

If the MyBSS does not complete transmitting the ACK frame during the data frame transmission time of the OBSS, the ACK frame of the MyBSS may be transmitted during the ACK frame transmission time of the OBSS. In this case, since the ACK frame of the MyBSS may act the interference on the transmitting device OTX that receives the ACK frame in the OBSS, the receiving device MRX of the MyBSS transmits the ACK frame (TPC ST ACK frame) with the lower power than the OBSS. The transmitting device OTX of the OBSS can successfully receive the ACK frame from the receiving device ORX because the ACK frame of the MyBSS has the lower power than the ACK frame of the OBSS.

In some embodiments, the receiving device MRX of the MyBSS may identify the data frame transmission time of the OBSS based on the RTS frame received from the OBSS. Therefore, in a case that the receiving device MRX transmits the ACK frame during the data frame transmission time and the ACK frame transmission time of the OBSS, the receiving device MRX may decrease the power of the ACK frame after the data frame transmission time of the OBSS that is identified based on the RTS frame.

In some embodiment, if the ACK frame is not transmitted in the MyBSS until the ACK frame of the OBSS is transmitted, the receiving device MRX may transmit a delayed ACK frame after the ACK frame transmission of the OBSS.

Figure 33:
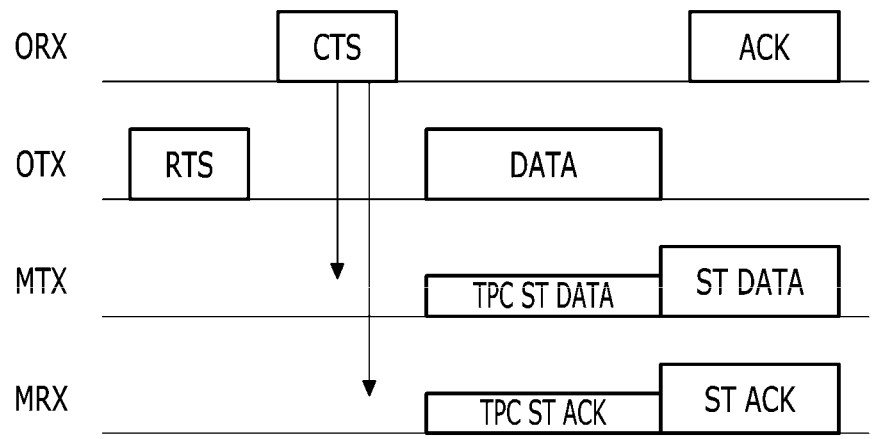
FIG. 33 shows an example of a frame transmitting method under a network condition 2b in a wireless communication network according to an embodiment.

Referring to FIG. 17 and FIG. 33, in a network condition 2b, the transmitting device MTX and the receiving device MRX of the MyBSS can receive the CTS frame of the OBSS but cannot receive the RTS frame of the OBSS. Therefore, when the transmitting device MTX and the receiving device MRX of the MyBSS transmit frames with substantially the same power as the OBSS, the frames transmitted by the transmitting device MTX and the receiving device MRX may not act the interference on the transmitting device OTX of the OBSS but may act interference on the receiving device ORX of the OBSS.

Accordingly, as described with reference to FIG. 32, the transmitting device MTX of the MyBSS may transmit the data frame (TPC ST data frame) with the lower power than the OBSS during the data frame transmission time of the OBSS. The transmitting device MTX of the MyBSS may transmit the data frame (ST data frame) with substantially the same power as the OBSS during the ACK frame transmission time of the OBSS.

Further, when the receiving device MRX of the MyBSS transmits the ACK frame during the data frame transmission time of the OBSS, the receiving device MRX may transmit the ACK frame (TPC ST ACK frame) with the lower power than the OBSS. Since the ACK frame of the MyBSS has the lower power than the data frame of the OBSS, the receiving device ORX of the OBSS can successfully receive the data frame from the transmitting device OTX. When the receiving device MRX of the MyBSS transmits the ACK frame during the ACK frame transmission time of the OBSS, the receiving device MRX may transmit the ACK frame (ST ACK frame) with substantially the same power as the OBSS.

The transmitting device OTX of the OBSS can successfully receive the ACK frame from the receiving device ORX because the ACK frame of the MyBSS does not act the interference on the transmitting device OTX of the OBSS.

In some embodiments, the receiving device MRX of the MyBSS may identify the data frame transmission time of the OBSS based on the CTS frame received from the OBSS. Therefore, in a case that the receiving device MRX transmits the ACK frame during the data frame transmission time and the ACK frame transmission time of the OBSS, the receiving device MRX may increase the power of the ACK frame after the data frame transmission time of the OBSS that is identified based on the CTS frame.

Figure 34:
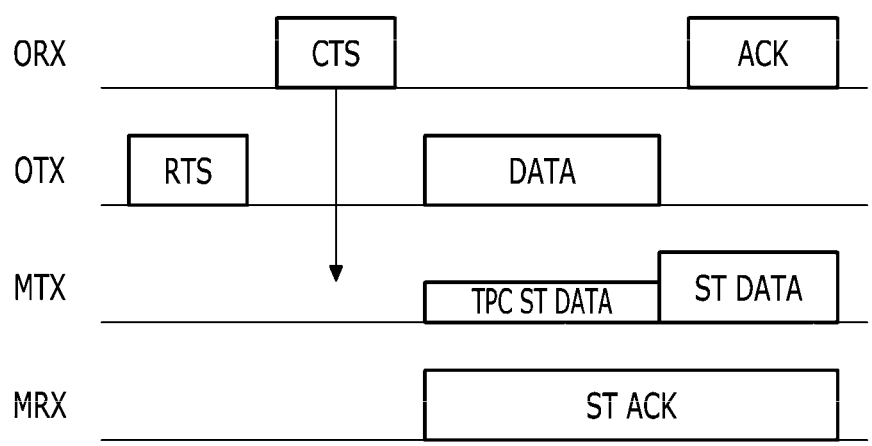
FIG. 34 shows an example of a frame transmitting method under a network condition 2c in a wireless communication network according to an embodiment.

Referring to FIG. 18 and FIG. 34, in a network condition 2c, the transmitting device MTX of the MyBSS can receive the CTS frame of the OBSS but cannot receive the RTS frame of the OBSS, and the receiving device MRX of the MyBSS cannot receive both the RTS frame and the CTS frame of the OBSS. Therefore, when the transmitting device MTX and the receiving device MRX of the MyBSS transmit frames with substantially the same power as the OBSS, the frame transmitted by the transmitting device MTX may not act the interference on the transmitting device OTX of the OBSS but may act the interference on the receiving device ORX of the OBSS, and the frame transmitted by the receiving device MRX may not act the interference on the transmitting device OTX and the receiving device ORX of the OBSS.

Accordingly, as described with reference to FIG. 32, the transmitting device MTX of the MyBSS may transmit the data frame (TPC ST data frame) with the lower power than the OBSS during the data frame transmission time of the OBSS. The transmitting device MTX of the MyBSS may transmit the data frame (ST data frame) with substantially the same power as the OBSS during the ACK frame transmission time of the OBSS.

Further, when the receiving device MRX of the MyBSS transmits the ACK frame during the data frame transmission time of the OBSS, the receiving device MRX may transmit the ACK frame (ST ACK frame) with substantially the same power as the OBSS. Since the ACK frame of the MyBSS does not act the interference on the transmitting device OTX of the OBSS, the transmitting device OTX of the OBSS can successfully receive the ACK frame from the receiving device ORX. When the receiving device MRX of the MyBSS transmits the ACK frame during the ACK frame transmission time of the OBSS, the receiving device MRX may transmit the ACK frame (ST ACK frame) with substantially the same power as the OBSS. The transmitting device OTX of the OBSS can successfully receive the ACK frame from the receiving device ORX because the ACK frame of the MyBSS does not act the interference on the transmitting device OTX of the OBSS.

Figure 35:
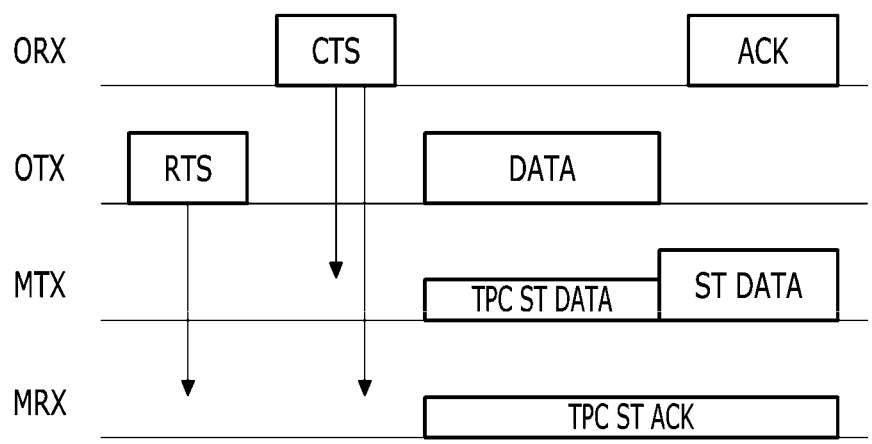
FIG. 35 shows an example of a frame transmitting method under a network condition 2d in a wireless communication network according to an embodiment.

Referring to FIG. 19 and FIG. 35, in a network condition 2d, the transmitting device MTX of the MyBSS can receive the CTS frame of the OBSS but cannot receive the RTS frame of the OBSS, and the receiving device MRX of the MyBSS can receive both the RTS frame and the CTS frame of the OBSS. Therefore, when the transmitting device MTX and the receiving device MRX of the MyBSS transmit frames with substantially the same power as the OBSS, the frame transmitted by the transmitting device MTX may not act the interference on the transmitting device OTX of the OBSS but may act the interference on the receiving device ORX of the OBSS, and the frame transmitted by the receiving device MRX may act the interference on the transmitting device OTX and the receiving device ORX of the OBSS.

Accordingly, as described with reference to FIG. 32, the transmitting device MTX of the MyBSS may transmit the data frame (TPC ST data frame) with the lower power than the OBSS during the data frame transmission time of the OBSS. The transmitting device MTX of the MyBSS may transmit the data frame (ST data frame) with substantially the same power as the OBSS during the ACK frame transmission time of the OBSS.

Further, when the receiving device MRX of the MyBSS transmits the ACK frame during the data frame transmission time of the OBSS, the receiving device MRX may transmit the ACK frame (TPC ST ACK frame) with the lower power than the OBSS. Since the ACK frame of the MyBSS has the lower power than the data frame of the OBSS, the receiving device ORX of the OBSS can successfully receive the data frame from the transmitting device OTX. When the receiving device MRX of the MyBSS transmits the ACK frame during the ACK frame transmission time of the OBSS, the receiving device MRX may transmit the ACK frame (TPC ST ACK frame) with the lower power than the OBSS. The transmitting device OTX of the OBSS can successfully receive the ACK frame from the receiving device ORX because the ACK frame of the MyBSS has the lower power than the ACK frame of the OBSS.

Figure 36:
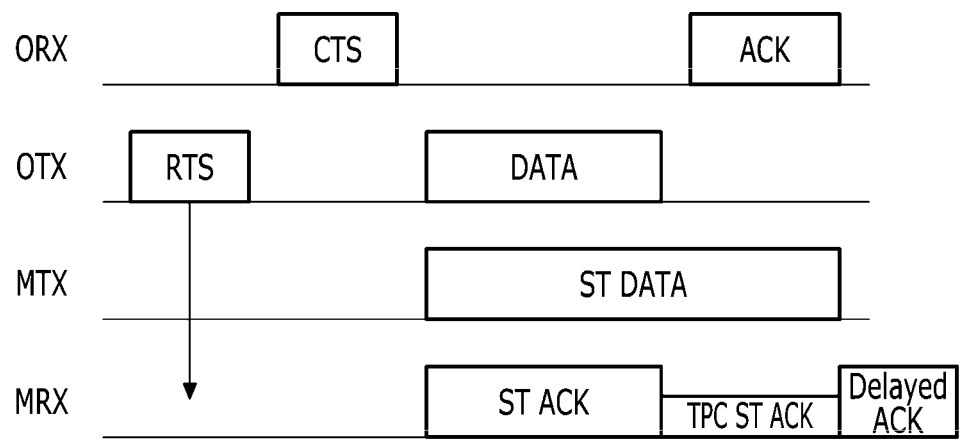
FIG. 36 shows an example of a frame transmitting method under a network condition 3a in a wireless communication network according to an embodiment.

Referring to FIG. 20 and FIG. 36, in a network condition 3a, the transmitting device MTX of the MyBSS cannot receive the RTS frame and the CTS frame of the OBSS, and the receiving device MRX of the MyBSS can receive the RTS frame of the OBSS but cannot receive the CTS frame of the OBSS. Therefore, when the transmitting device MTX and the receiving device MRX of the MyBSS transmit frames with substantially the same power as the OBSS, the frame transmitted by the transmitting device MTX may not act the interference on the transmitting device OTX and the receiving device ORX of the OBSS, and the frame transmitted by the receiving device MRX may not act the interference on the receiving device ORX of the OBSS but may act the interference on the transmitting device OTX of the OBSS.

The transmitting device MTX of the MyBSS may transmit the data frame (ST data frame) with substantially the same power as the OBSS during a time when the transmitting device OTX of the OBSS transmits the data frame. Since the data frame of the MyBSS does not act the interference on the receiving device ORX that receives the data frame in the OBSS, the receiving device ORX of the OBSS can successfully receiver the data frame from the transmitting device OTX.

The transmitting device MTX may transmit the data frame during a time when the receiving device ORX of the OBSS transmits the ACK frame. In this case, the transmitting device MTX of the MyBSS may transmit the data frame (ST data frame) with substantially the same power as the OBSS because the data frame of the MyBSS does not act the interference on the transmitting device OTX that receives the ACK frame in the OBSS.

Further, the receiving device MRX of the MyBSS may transmit the ACK frame (ST ACK frame) with substantially the same power as the data frame of the OBSS during the data frame transmission time of the OBSS Since the ACK frame of the MyBSS does not act the interference on the receiving device ORX of the OBSS, the receiving device ORX of the OBSS can successfully receive the data frame from the transmitting device OTX.

If the MyBSS does not complete transmitting the ACK frame during the data frame transmission time of the OBSS, the ACK frame of the MyBSS may be transmitted during the ACK frame transmission time of the OBSS. In this case, since the ACK frame of the MyBSS may act the interference on the transmitting device OTX that receives the ACK frame in the OBSS, the receiving device MRX of the MyBSS transmits the ACK frame (TPC ST ACK frame) with the lower power than the OBSS. The transmitting device OTX of the OBSS can successfully receive the ACK frame from the receiving device ORX because the ACK frame of the MyBSS has the lower power than the ACK frame of the OBSS.

In some embodiments, the receiving device MRX of the MyBSS may identify the data frame transmission time of the OBSS based on the RTS frame received from the OBSS. Therefore, in a case that the receiving device MRX transmits the ACK frame during the data frame transmission time and the ACK frame transmission time of the OBSS, the receiving device MRX may decrease the power of the ACK frame after the data frame transmission time of the OBSS that is identified based on the RTS frame.

In some embodiment, if the ACK frame is not transmitted in the MyBSS until the ACK frame of the OBSS is transmitted, the receiving device MRX may transmit a delayed ACK frame after the ACK frame transmission of the OBSS.

Figure 37:
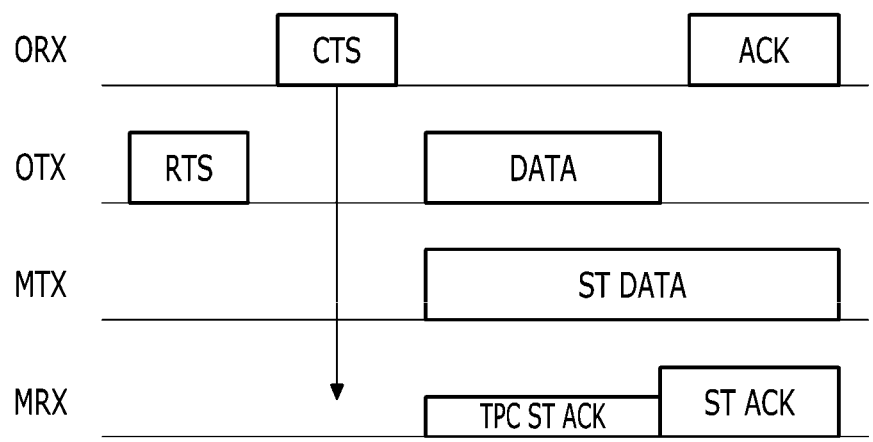
FIG. 37 shows an example of a frame transmitting method under a network condition 3b in a wireless communication network according to an embodiment.

Referring to FIG. 21 and FIG. 37, in a network condition 3b, the transmitting device MTX of the MyBSS cannot receive the RTS frame and CTS frame of the OBSS, and the receiving device MRX of the MyBSS cannot receive the RTS frame of the OBSS but can receive the CTS frame of the OBSS. Therefore, when the transmitting device MTX and the receiving device MRX of the MyBSS transmit frames with substantially the same power as the OBSS, the frame transmitted by the transmitting device MTX may not act the interference on the transmitting device OTX and the receiving device ORX of the OBSS, and the frame transmitted by the receiving device MRX may not act the interference on the transmitting device OTX of the OBSS but may act the interference on the receiving device ORX of the OBSS.

Accordingly, as described with reference to FIG. 36, the transmitting device MTX of the MyBSS may transmit the data frame (ST data frame) with substantially the same power as the OBSS during the data frame transmission time of the OBSS. The transmitting device MTX of the MyBSS may transmit the data frame (ST data frame) with substantially the same power as the OBSS during the ACK frame transmission time of the OBSS.

Further, when the receiving device MRX of the MyBSS transmits the ACK frame during the data frame transmission time of the OBSS, the receiving device MRX may transmit the ACK frame (TPC ST ACK frame) with the lower power than the OBSS. Since the ACK frame of the MyBSS has the lower power than the data frame of the OBSS, the receiving device ORX of the OBSS can successfully receive the data frame from the transmitting device OTX. When the receiving device MRX of the MyBSS transmits the ACK frame during the ACK frame transmission time of the OBSS, the receiving device MRX may transmit the ACK frame (ST ACK frame) with substantially the same power as the OBSS. The transmitting device OTX of the OBSS can successfully receive the ACK frame from the receiving device ORX because the ACK frame of the MyBSS does not act the interference on the transmitting device OTX of the OBSS.

In some embodiments, the receiving device MRX of the MyBSS may identify the data frame transmission time of the OBSS based on the CTS frame received from the OBSS. Therefore, in a case that the receiving device MRX transmits the ACK frame during the data frame transmission time and the ACK frame transmission time of the OBSS, the receiving device MRX may increase the power of the ACK frame after the data frame transmission time of the OBSS that is identified based on the CTS frame.

Figure 38:
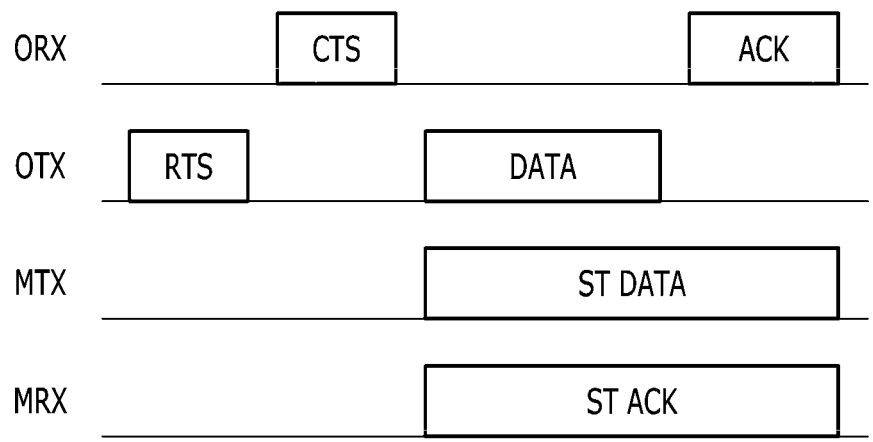
FIG. 38 shows an example of a frame transmitting method under a network condition 3c in a wireless communication network according to an embodiment.

Referring to FIG. 22 and FIG. 38, in a network condition 3c, the transmitting device MTX and the receiving device MRX of the MyBSS cannot receive both the RTS frame and the CTS frame of the OBSS. Therefore, when the transmitting device MTX and the receiving device MRX of the MyBSS transmit frames with substantially the same power as the OBSS, the frames transmitted by the transmitting device MTX and the receiving device MRX may not act the interference on the transmitting device OTX and the receiving device ORX of the OBSS.

Accordingly, as described with reference to FIG. 36, the transmitting device MTX of the MyBSS may transmit the data frame (ST data frame) with substantially the same power as the OBSS during the data frame transmission time of the OBSS. The transmitting device MTX of the MyBSS may transmit the data frame (ST data frame) with substantially the same power as the OBSS during the ACK frame transmission time of the OBSS.

Further, when the receiving device MRX of the MyBSS transmits the ACK frame during the data frame transmission time of the OBSS, the receiving device MRX may transmit the ACK frame (ST ACK frame) with substantially the same power as the OBSS. Since the ACK frame of the MyBSS does not act the interference on the transmitting device OTX of the OBSS, the transmitting device OTX of the OBSS can successfully receive the ACK frame from the receiving device ORX. When the receiving device MRX of the MyBSS transmits the ACK frame during the ACK frame transmission time of the OBSS, the receiving device MRX may transmit the ACK frame (ST ACK frame) with substantially the same power as the OBSS. The transmitting device OTX of the OBSS can successfully receive the ACK frame from the receiving device ORX because the ACK frame of the MyBSS does not act the interference on the transmitting device OTX of the OBSS.

Figure 39:
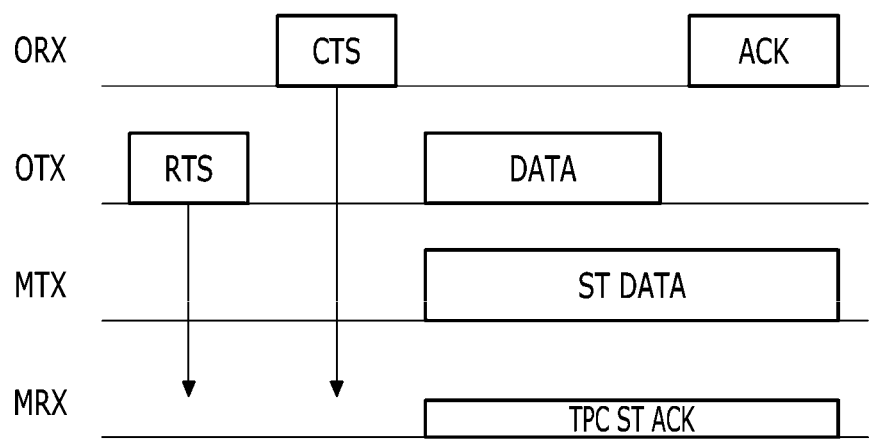
FIG. 39 shows an example of a frame transmitting method under a network condition 3d in a wireless communication network according to an embodiment.

Referring to FIG. 23 and FIG. 39, in a network condition 3d, the transmitting device MTX of the MyBSS cannot receive both the RTS frame and the CTS frame of the OBSS, and the receiving device MRX of the MyBSS can receive both the RTS frame and the CTS frame of the OBSS. Therefore, when the transmitting device MTX and the receiving device MRX of the MyBSS transmit frames with substantially the same power as the OBSS, the frame transmitted by the transmitting device MTX may not act the interference on the transmitting device OTX and the receiving device ORX of the OBSS, and the frame transmitted by the receiving device MRX may act the interference on the transmitting device OTX and the receiving device ORX of the OBSS.

Accordingly, as described with reference to FIG. 36, the transmitting device MTX of the MyBSS may transmit the data frame (ST data frame) with substantially the same power as the OBSS during the data frame transmission time of the OBSS. The transmitting device MTX of the MyBSS may transmit the data frame (ST data frame) with substantially the same power as the OBSS during the ACK frame transmission time of the OBSS.

Further, when the receiving device MRX of the MyBSS transmits the ACK frame during the data frame transmission time of the OBSS, the receiving device MRX may transmit the ACK frame (TPC ST ACK frame) with the lower power than the OBSS. Since the ACK frame of the MyBSS has the lower power than the data frame of the OBSS, the receiving device ORX of the OBSS can successfully receive the data frame from the transmitting device OTX. When the receiving device MRX of the MyBSS transmits the ACK frame during the ACK frame transmission time of the OBSS, the receiving device MRX may transmit the ACK frame (TPC ST ACK frame) with the lower power than the OBSS. The transmitting device OTX of the OBSS can successfully receive the ACK frame from the receiving device ORX because the ACK frame of the MyBSS has the lower power than the ACK frame of the OBSS.

Figure 40:
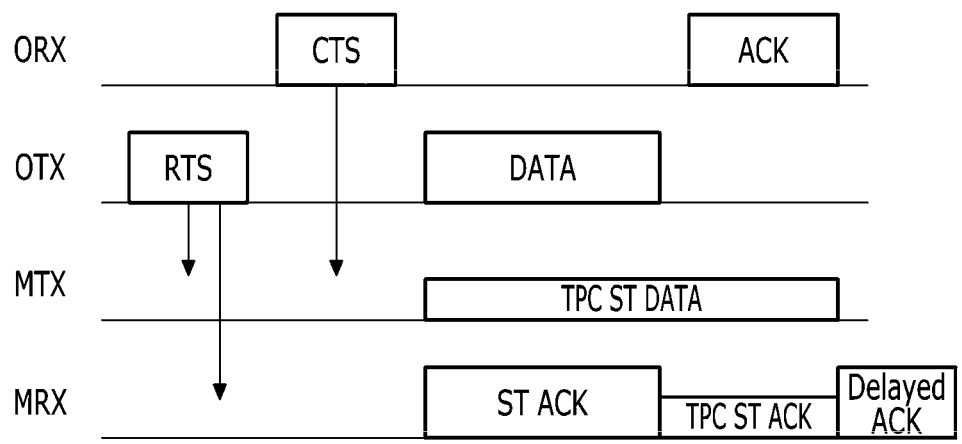
FIG. 40 shows an example of a frame transmitting method under a network condition 4a in a wireless communication network according to an embodiment.

Referring to FIG. 24 and FIG. 40, in a network condition 4a, the transmitting device MTX of the MyBSS can receive the RTS frame and the CTS frame of the OBSS, and the receiving device MRX of the MyBSS can receive the RTS frame of the OBSS but cannot receive the CTS frame of the OBSS. Therefore, when the transmitting device MTX and the receiving device MRX of the MyBSS transmit frames with substantially the same power as the OBSS, the frame transmitted by the transmitting device MTX may act the interference on the transmitting device OTX and the receiving device ORX of the OBSS, and the frame transmitted by the receiving device MRX may not act the interference on the receiving device ORX of the OBSS but may act the interference on the transmitting device OTX of the OBSS.

Accordingly, the transmitting device MTX of the MyBSS may transmit the data frame (TPC ST data frame) with the lower power than the OBSS during a time when the transmitting device OTX of the OBSS transmits the data frame. Since the data frame of the MyBSS has the lower power than the data frame of the OBSS, the receiving device ORX of the OBSS can successfully receive the data frame from the transmitting device OTX.

The transmitting device MTX may transmit the data frame during a time when the receiving device ORX of the OBSS transmits the ACK frame. In this case, the transmitting device MTX of the MyBSS may transmit the data frame (TPC ST data frame) with the lower power than the OBSS because the data frame of the MyBSS acts the interference on the transmitting device OTX that receives the ACK frame in the OBSS. Since the data frame of the MyBSS has the lower power than the ACK frame of the OBSS, the transmitting device OTX of the OBSS can successfully receive the ACK frame from the receiving device ORX.

Further, the receiving device MRX of the MyBSS may transmit the ACK frame (ST ACK frame) with substantially the same power as the data frame of the OBSS during the data frame transmission time of the OBSS The receiving device ORX of the OBSS can successfully receive the data frame from the transmitting device OTX because the ACK frame of the MyBSS does not act the interference on the receiving device ORX of the OBSS.

If the MyBSS does not complete transmitting the ACK frame during the data frame transmission time of the OBSS, the ACK frame of the MyBSS may be transmitted during the ACK frame transmission time of the OBSS. In this case, since the ACK frame of the MyBSS may act the interference on the transmitting device OTX that receives the ACK frame in the OBSS, the receiving device MRX of the MyBSS transmits the ACK frame (TPC ST ACK frame) with the lower power than the OBSS. The transmitting device OTX of the OBSS can successfully receive the ACK frame from the receiving device ORX because the ACK frame of the MyBSS has the lower power than the ACK frame of the OBSS.

In some embodiments, the receiving device MRX of the MyBSS may identify the data frame transmission time of the OBSS based on the RTS frame received from the OBSS. Therefore, in a case that the receiving device MRX transmits the ACK frame during the data frame transmission time and the ACK frame transmission time of the OBSS, the receiving device MRX may reduce the power of the ACK frame after the data frame transmission time of the OBSS that is identified based on the RTS frame.

In some embodiment, if the ACK frame is not transmitted in the MyBSS until the ACK frame of the OBSS is transmitted, the receiving device MRX may transmit a delayed ACK frame after the ACK frame transmission of the OBSS.

Figure 41:
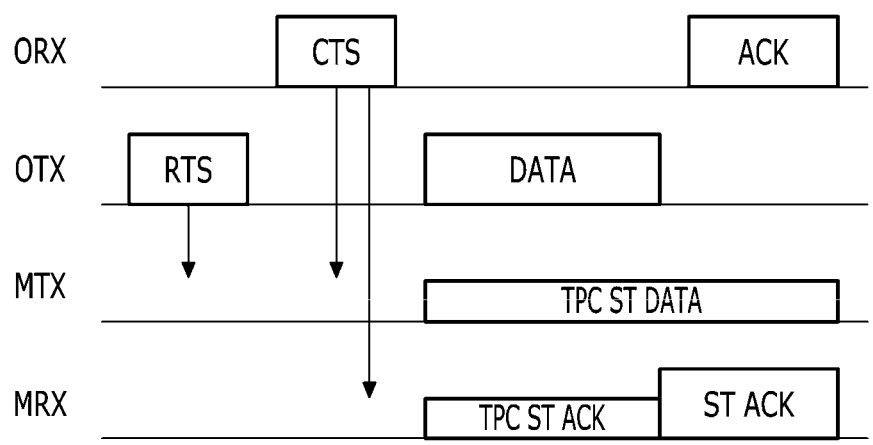
FIG. 41 shows an example of a frame transmitting method under a network condition 4b in a wireless communication network according to an embodiment.

Referring to FIG. 25 and FIG. 41, in a network condition 4b, the transmitting device MTX of the MyBSS can receive the RTS frame and CTS frame of the OBSS, and the receiving device MRX of the MyBSS cannot receive the RTS frame of the OBSS but can receive the CTS frame of the OBSS. Therefore, when the transmitting device MTX and the receiving device MRX of the MyBSS transmit frames with substantially the same power as the OBSS, the frame transmitted by the transmitting device MTX may act the interference on the transmitting device OTX and the receiving device ORX of the OBSS, and the frame transmitted by the receiving device MRX may not act the interference on the transmitting device OTX of the OBSS but may act the interference on the receiving device ORX of the OBSS.

Accordingly, as described with reference to FIG. 40, the transmitting device MTX of the MyBSS may transmit the data frame (TPC ST data frame) with the lower power than the OBSS during the data frame transmission time of the OBSS. The transmitting device MTX of the MyBSS may transmit the data frame (TPC ST data frame) with the lower power than the OBSS during the ACK frame transmission time of the OBSS.

Further, when the receiving device MRX of the MyBSS transmits the ACK frame during the data frame transmission time of the OBSS, the receiving device MRX may transmit the ACK frame (TPC ST ACK frame) with the lower power than the OBSS. Since the ACK frame of the MyBSS has the lower power than the data frame of the OBSS, the receiving device ORX of the OBSS can successfully receive the data frame from the transmitting device OTX. When the receiving device MRX of the MyBSS transmits the ACK frame during the ACK frame transmission time of the OBSS, the receiving device MRX may transmit the ACK frame (ST ACK frame) with substantially the same power as the OBSS. The transmitting device OTX of the OBSS can successfully receive the ACK frame from the receiving device ORX because the ACK frame of the MyBSS does not act the interference on the transmitting device OTX of the OBSS.

In some embodiments, the receiving device MRX of the MyBSS may identify the data frame transmission time of the OBSS based on the CTS frame received from the OBSS. Therefore, in a case that the receiving device MRX transmits the ACK frame during the data frame transmission time and the ACK frame transmission time of the OBSS, the receiving device MRX may increase the power of the ACK frame after the data frame transmission time of the OBSS that is identified based on the CTS frame.

Figure 42:
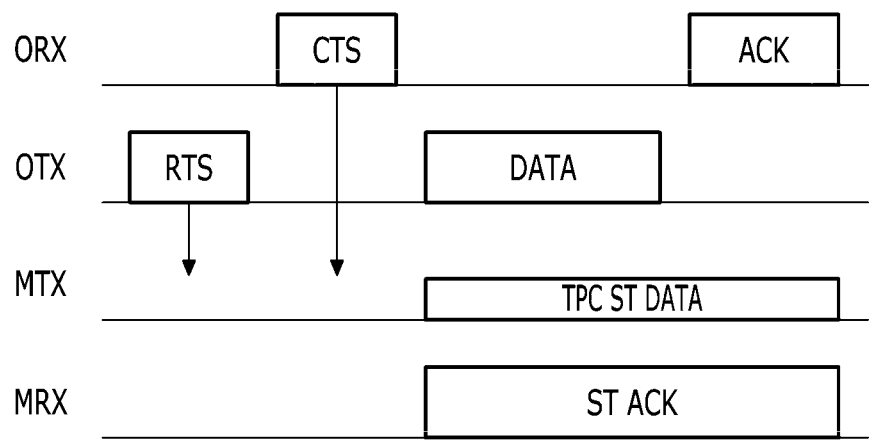
FIG. 42 shows an example of a frame transmitting method under a network condition 4c in a wireless communication network according to an embodiment.

Referring to FIG. 26 and FIG. 42, in a network condition 4c, the transmitting device MTX of the MyBSS can receive both the RTS frame and the CTS frame of the OBSS, and the receiving device MRX of the MyBSS cannot receive both the RTS frame and the CTS frame of the OBSS. Therefore, when the transmitting device MTX and the receiving device MRX of the MyBSS transmit frames with substantially the same power as the OBSS, the frame transmitted by the transmitting device MTX may act the interference on the transmitting device OTX and the receiving device ORX of the OBSS, and the frame transmitted by the receiving device MRX may not act the interference on the transmitting device OTX and the receiving device ORX of the OBSS.

Accordingly, as described with reference to FIG. 40, the transmitting device MTX of the MyBSS may transmit the data frame (TPC ST data frame) with the lower power than the OBSS during the data frame transmission time of the OBSS. The transmitting device MTX of the MyBSS may transmit the data frame (TPC ST data frame) with the lower power than the OBSS during the ACK frame transmission time of the OBSS.

Further, when the receiving device MRX of the MyBSS transmits the ACK frame during the data frame transmission time of the OBSS, the receiving device MRX may transmit the ACK frame (ST ACK frame) with substantially the same power as the OBSS. Since the ACK frame of the MyBSS does not act the interference on the transmitting device OTX of the OBSS, the transmitting device OTX of the OBSS can successfully receive the ACK frame from the receiving device ORX. When the receiving device MRX of the MyBSS transmits the ACK frame during the ACK frame transmission time of the OBSS, the receiving device MRX may transmit the ACK frame (ST ACK frame) with substantially the same power as the OBSS. The transmitting device OTX of the OBSS can successfully receive the ACK frame from the receiving device ORX because the ACK frame of the MyBSS does not act the interference on the transmitting device OTX of the OBSS.

Figure 43:
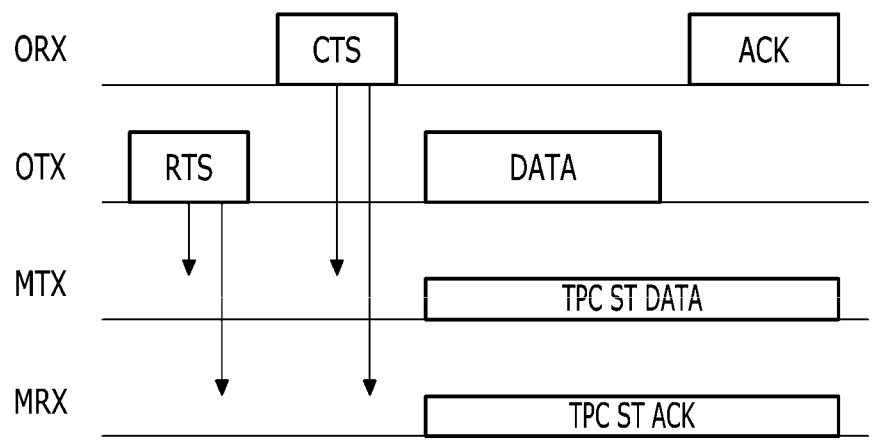
FIG. 43 shows an example of a frame transmitting method under a network condition 4d in a wireless communication network according to an embodiment.

Referring to FIG. 27 and FIG. 43, in a network condition 4*d*, the transmitting device MTX and the receiving device MRX of the MyBSS can receive both the RTS frame and the CTS frame of the OBSS. Therefore, when the transmitting device MTX and the receiving device MRX of the MyBSS transmit frames with substantially the same power as the OBSS, the frames transmitted by the transmitting device MTX and the receiving device MRX may act the interference on the transmitting device OTX and the receiving device ORX of the OBSS.

Accordingly, as described with reference to FIG. 40, the transmitting device MTX of the MyBSS may transmit the data frame (TPC ST data frame) with the lower power than the OBSS during the data frame transmission time of the OBSS. The transmitting device MTX of the MyBSS may transmit the data frame (TPC ST data frame) with the lower power than the OBSS during the ACK frame transmission time of the OBSS.

Further, when the receiving device MRX of the MyBSS transmits the ACK frame during the data frame transmission time of the OBSS, the receiving device MRX may transmit the ACK frame (TPC ST ACK frame) with the lower power than the OBSS. Since the ACK frame of the MyBSS has the lower power than the data frame of the OBSS, the receiving device ORX of the OBSS can successfully receive the data frame from the transmitting device OTX. When the receiving device MRX of the MyBSS transmits the ACK frame during the ACK frame transmission time of the OBSS, the receiving device MRX may transmit the ACK frame (TPC ST ACK frame) with the lower power than the OBSS. The transmitting device OTX of the OBSS can successfully receive the ACK frame from the receiving device ORX because the ACK frame of the MyBSS has the lower power than the ACK frame of the OBSS.

On the other hand, while the data frame and the ACK frame of the MyBSS have been shown at the same timing in FIG. 28 to FIG. 43 in order to represent the powers of the data frame and the ACK frame that are transmitted during the data frame transmission time and the ACK frame transmission time of the OBSS, the ACK frame is actually transmitted after the data frame of the MyBSS is transmitted and then a predetermined IFS interval has elapsed. In some embodiments, the predetermined IFS interval may be a SIFS interval.

The frame transmitting methods described with reference to FIG. 28 to FIG. 43 may be arranged as in Table 2.

TABLE 2

| Network condition | BSS data transmission | | BSS ACK transmission | |
|---|---|---|---|---|
| | OBSS data Tx time | OBSS ACK Tx time | OBSS data Tx time | OBSS ACK Tx time |
| R | ST | TPC | ST | TPC |
| C | TPC | ST | TPC | ST |
| N | ST | ST | ST | ST |
| RC | TPC | TPC | TPC | TPC |

In Table 2, "R" denotes a condition that a device can receive the RTS frame of the OBSS, "C" denotes a condition that the device can receive the CTS frame of the OBSS, "N" denotes that the device cannot receive both the RTS frame and the CTS frame of the OBSS, and "RC" denotes that the device can receive both the RTS frame and the CTS frame of the OBSS.

According to the above embodiments, the MyBSS can transmit the frames at the same time as the frame transmitted by the OBSS under the conditions where the interferences with the OBSS exist, and the frame transmitted by the MyBSS cannot act the inferences on the OBSS.

In some embodiments, when the frames are transmitted by the OBSS, the transmitting device MTX of the MyBSS may perform a link setup with the receiving device MRX such that the transmitting device MTX can transmit the data frame to the receiving device MRX. For this, the transmitting device MTX may transmit a request frame to the receiving device MRX and the receiving device MRX may transmit a response frame to the transmitting device MTX in response to the request frame.

In one embodiment, the request frame may be a simultaneous transmission RTS frame (hereinafter referred to as an "STRTS frame") that performs similar functions to the RTS frame and is transmitted while the frame of the OBSS is being transmitted, and the response frame may be a simultaneous transmission CTS frame (hereinafter referred to as an "STCTS frame") that performs similar functions to the CTS frame and is transmitted while the frame of the OBSS is being transmitted.

Figure 44:
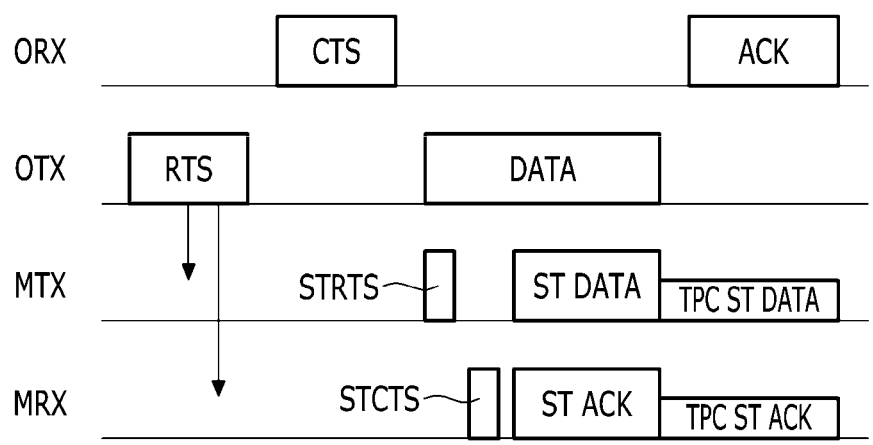
FIG. 44 shows an example of a frame transmission method using a request frame and a response frame in a wireless communication network according to an embodiment.

FIG. 44 shows an example of a frame transmission method using a request frame and a response frame in a wireless communication network according to an embodiment.

Referring to FIG. 44, while a frame is being transmitted in an OBSS, a transmitting device MTX of a MyBSS transmits an STRTS frame to a receiving device MRX of the MyBSS, and the receiving device MRX receiving the STRTS frame transmits the STCTS frame to the transmitting device MTX.

It is shown in FIG. 44 for convenience that the STRTS frame and the STCTS frame are transmitted during a data frame transmission time of the OBSS. Alternatively, the STRTS frame and the STCTS frame may be transmitted during an ACK frame transmission time of the OBSS, or the STRTS frame may be transmitted during the data frame transmission time of the OBSS and the STCTS frame may be transmitted during the ACK frame transmission time of the OBSS.

Further, while it has been shown in FIG. 44 for convenience that the STRTS frame and the STCTS frame are transmitted in a network condition 1a, the STRTS frame and the STCTS frame may be transmitted in the same way at other network conditions.

After the transmitting device MTX and the receiving device MRX of the MyBSS perform the link setup by exchanging the STRTS frame and the STCTS frame, the transmitting device MTX may transmit the data frame (ST data frame or TPC ST data frame) and then the receiving device MRX may transmit an ACK frame (ST ACK frame or TPC ST ACK frame).

In some embodiments, other HE devices receiving the STRTS frame and the STCTS frame may set NAVs. Accordingly, the transmission between the transmitting device MTX and the receiving device MRX can be protected.

In some embodiments, the STRTS frame and the STCTS frame may be transmitted with substantially the same power as the frame of the OBSS. In another embodiment, when the STRTS frame and STCTS frame are transmitted during the data frame transmission time of the OBSS, a power of the STRTS frame may be set to equal to a transmission power of a frame transmitted by the transmitting device MTX during the data frame transmission time of the OBSS, and a power of the STCTS frame may be set to equal to a transmission power of a frame transmitted by the receiving device MRX during the data frame transmission time of the OBSS. In yet another embodiment, when the STRTS frame and STCTS frame are transmitted during the ACK frame transmission time of the OBSS, a power of the STRTS frame may be set to equal to a transmission power of a frame transmitted by the transmitting device MTX during the ACK frame transmission time of the OBSS, and a power of the STCTS frame may be set to equal to a transmission power of a frame transmitted by the receiving device MRX during the ACK frame transmission time of the OBSS.

In some embodiments, when the transmitting device MTX of the MyBSS is located outside RTS and CTS protection ranges of the OBSS (for example, in a case of a network condition 3a shown in FIG. 36, a network condition 3b shown in FIG. 37, a network condition 3c shown in FIG. 38, or a network condition 3d shown in FIG. 39), the transmitting device MTX may transmit instead of the STRTS frame an RTS frame that can be decoded by a WLAN device of a previous version (for example, the IEEE standard 802.11a, the IEEE standard 802.11b, the IEEE standard 802.11g, the IEEE standard 802.11n, or the IEEE standard 802.11ac), in order to set the RTS protection region. When the receiving device MRX of the MyBSS is located outside the RTS and CTS protection ranges of the OBSS (for example, in a case of a network condition 1c shown in FIG. 30, a network condition 2c shown in FIG. 34, a network condition 3c shown in FIG. 38, or a network condition 4c shown in FIG. 42), the receiving device MRX may transmit instead of the STCTS frame a CTS frame that can be decoded by the previous version WLAN device, in order to set the CTS protection region.

Next, structures of the STRTS frame and the STCTS frame in a wireless communication network according to an embodiment are described.

Figure 45:
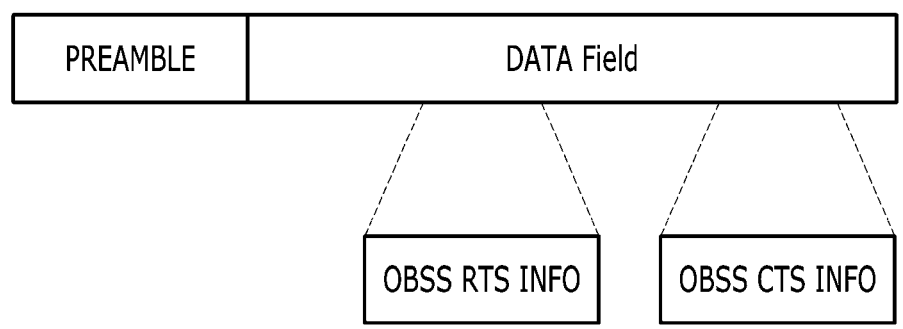
FIG. 45 schematically shows a structure of an STRTS frame and an STCTS frame in a wireless communication network according to an embodiment.

FIG. 45 schematically shows a structure of an STRTS frame and an STCTS frame in a wireless communication network according to an embodiment.

Referring to FIG. 45, an STRTS frame and an STCTS frame each include a preamble and a data field.

The preamble may be used for channel estimation and signaling information delivery. In some embodiments, the preamble may be a legacy preamble supporting the IEEE standard 802.11a, the IEEE standard 802.11b, or the IEEE standard 802.11g. In this case, the preamble includes a legacy short training field (L-STF), a legacy long training field (L-LTF), and a legacy signal field (L-SIG). The L-STF may be used for automatic gain control and includes two symbols. The L-LTF may be used for channel estimation and includes two symbols. The L-SIG may include rate and length information and includes one symbol The data field includes an OBSS RTS information field and an OBSS CTS information field. The OBSS RTS information field carries information (OBSS RTS information) on an RTS frame of an OBSS, and the OBSS CTS information field carries information (OBSS CTS information) on a CTS frame of the OBSS. Accordingly, the transmitting device MTX and the receiving device MRX of the MyBSS may determine a current network condition based on the OBSS RTS information and the OBSS CTS information of the STRTS frame and the STCTS frame, and may determine transmitting methods of a data frame and an ACK frame according to the current network condition.

The OBSS RTS information may include at least one information among identification information of an OBSS transmitter, identification information of the OBSS, information on whether an OBSS RTS frame has been received, a received signal strength indication (RSSI) of the OBSS RTS frame, and a transmission power level of the OBSS RTS frame. The identification information of the OBSS transmitter is identification information of a transmitting device that transmits the RTS frame in the OBSS and may be, for example, an address of the transmitting device or a partial association identifier (PAID) of the transmitting device. The PAID may be generated by a combination of some bits of association identifier (ID) and an ID (BSSID) of a BSS. The identification information of the OBSS is identification information of the OBSS that has transmitted the RTS frame and may be, for example, a BSSID of the OBSS or a BSS color ID of the OBSS. The BSS color ID is an ID used for distinguishing neighbor BSSs and may have, for example, 3 bits.

The OBSS CTS information may include at least one information among identification information of an OBSS transmitter, identification information of the OBSS, information on whether an OBSS CTS frame has been received, an RSSI of the OBSS CTS frame, and a transmission power level of the OBSS CTS frame. The identification information of the OBSS transmitter is identification information of a receiving device that transmits the CTS frame in the OBSS and may be, for example, an address of the receiving device or PAID of the receiving device. The identification information of the OBSS is identification information of the OBSS that has transmitted the CTS frame and may be, for example, a BSSID of the OBSS or a BSS color ID of the OBSS.

Next, various embodiments of the STRTS frame and the STCTS frame are described.

Figure 46:
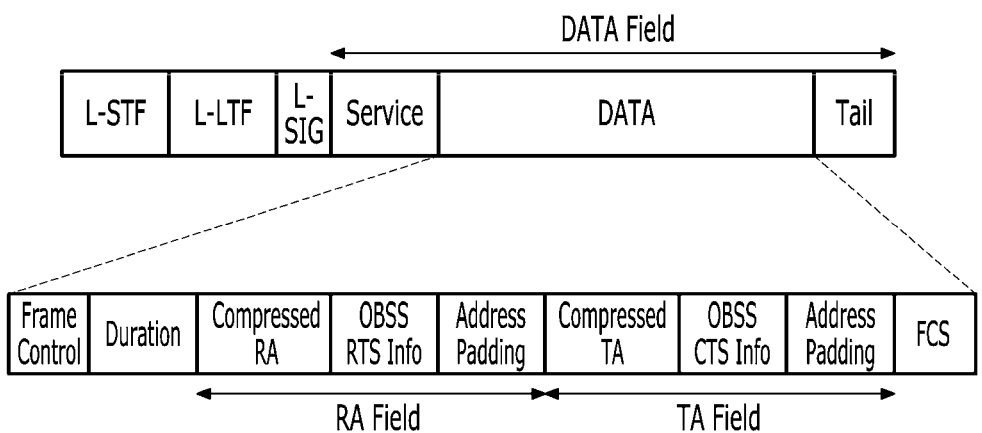
FIG. 46, FIG. 48, FIG. 50, and FIG. 52 show various examples of an STRTS frame structure in a wireless communication network according to an embodiment.
Figure 47:
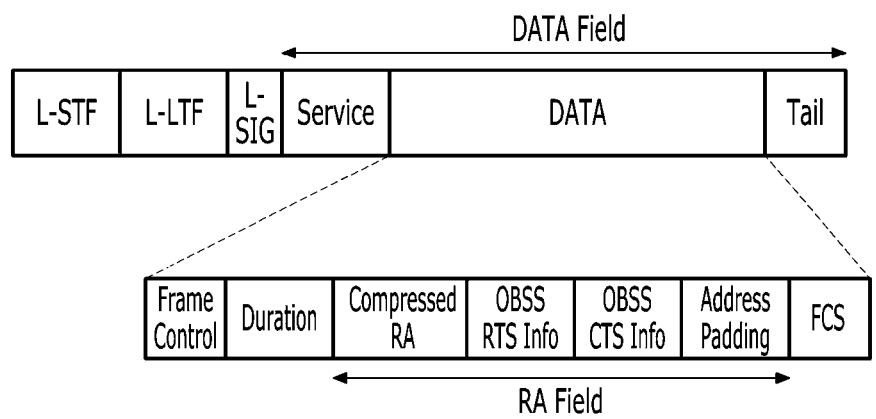
FIG. 47, FIG. 49, FIG. 51, and FIG. 53 show various examples of an STCTS frame structure in a wireless communication network according to an embodiment.

FIG. 46 shows an example of an STRTS frame structure in a wireless communication network according to an embodiment, and FIG. 47 shows an example of an STCTS frame structure in a wireless communication network according to an embodiment.

Referring to FIG. 46, a data field of an STRTS frame includes a service field, a MAC frame part, and tail bits, and further includes pad bits if necessary. The MAC frame part includes a frame control field, a duration field, an address field, and a frame check sequence (FCS) field, and the address field may include a receiver address (RA) field and a transmitter address (TA) field like an RTS frame. Accordingly, the STRTS frame may have the same format as the RTS frame.

The frame control field carries information related to frame control.

The duration field indicates duration necessary for NAV setting. For example, a duration value is the time, in microseconds, required to transmit a pending data frame, plus one STCTS frame, plus one ACK frame, plus three SIFS intervals.

The RA field includes a compressed RA field, an OBSS RTS information field, and an address padding field.

The compressed RA field carries a compressed RA, and the compressed RA is an address into which an RA that is an address of a receiving device destined to receive the STRTS frame is compressed. For example, when the RA field uses 6 bytes, the RA may be compressed into the compressed RA of N bytes and the remaining (6-N) bytes may be used for the OBSS RTS information field and the address padding field. The OBSS RTS information field carries OBSS RTS information.

The address padding field includes pad bits that are padded to set a value of the RA field as a unique address. In a case that the STRTS frame has the same format as the RTS frame, if the value of the RA field that is set by the compressed RA, the OBSS RTS information, and the address padding equals to an address of a previous version WLAN device, the previous version WLAN device may interpret the STRTS frame as the RTS frame that is destined to it. Accordingly, if the value of the RA field is set to the unique address by the address padding, the previous version WLAN device does not interpret the STRTS frame because the value of the RA field in the STRTS frame is always different from its address.

On the other hand, a HE device can determine whether it is a recipient of the STRTS frame based on the compressed RA of the RA field. The HE device receiving the STRTS frame determines a network condition based on the OBSS RTS information and the OBSS CTS information if it is the recipient. The HE device receiving the STRTS frame may set the NAV based on the duration field of the STRTS frame if it is not the recipient. The previous version WLAN device may set the NAV based on the duration field of the STRTS frame because the value of the RA field is different from its address.

The TA field includes a compressed TA field, an OBSS CTS information field, and an address padding field.

The compressed TA field carries a compressed TA, and the compressed TA is an address into which a TA that is an address of a transmitting device transmitting the STRTS frame is compressed. For example, when the TA field uses 6 bytes, the TA may be compressed into the compressed TA of N bytes and the remaining (6-N) bytes may be used for the OBSS CTS information field and the address padding field. The OBSS CTS information field carries the OBSS CTS information. The address padding field includes pad bits that are padded to set a value of the TA field as a unique address.

The FCS field is located at an end of the STRTS frame and includes a cyclic redundancy check (CRC), for example a 32-bit CRC.

In another embodiment, the RA field may include the OBSS CTS information field and the TA field may include the OBSS RTS information field.

Referring to FIG. 47, a data field of an STCTS frame includes a service field, a MAC frame part, and tails bits, and further includes pad bits if necessary. The MAC frame part includes a frame control field, a duration field, an address field, and an FCS field, and the address field may include an RA field like a CTS frame. Accordingly, the STCTS frame may have the same format as the CTS frame.

The frame control field carries information related to a frame control.

The duration field indicates duration necessary for NAV setting. For example, a duration value is a value obtained from a duration field of an immediately previous STRTS frame, minus the time, in microseconds, required to transmit the STCTS frame and its SIFS interval.

The RA field includes a compressed RA field, an OBSS RTS information field, an OBSS CTS information field, and an address padding field.

The compressed RA field carries a compressed RA, and the compressed RA is an address into which an RA that is an address of a receiving device destined to receive the STRTS frame is compressed. The compressed RA may be copied from the compressed TA field of the STRTS frame. For example, when the RA field uses 6 bytes, the RA may be compressed into the compressed RA of N bytes and the remaining (6-N) bytes may be used for the OBSS RTS information field, the OBSS CTS information field, and the address padding field. The OBSS RTS information field carries OBSS RTS information and the OBSS CTS information field carries OBSS CTS information. The address padding field includes pad bits that are padded to set a value of the RA field as a unique address.

A HE device may determine whether it is a recipient of the STCTS frame based on the compressed RA of the RA field. The HE device receiving the STCTS frame determines a network condition based on the OBSS RTS information and the OBSS CTS information if it is the recipient. The HE device receiving the STCTS frame may set the NAV based on the duration field of the STCTS frame if it is not the recipient. The previous version WLAN device may set the NAV based on the duration field of the STCTS frame because the value of the RA field is different from its address.

Figure 48:
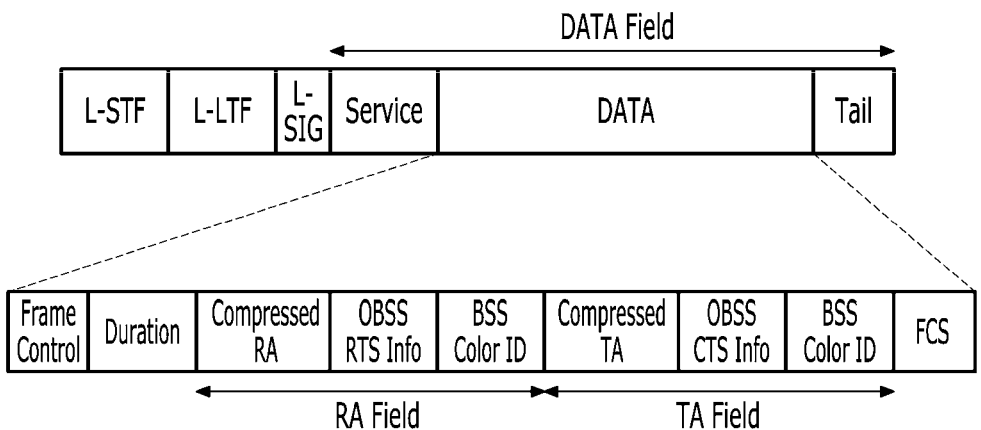
Figure 49:
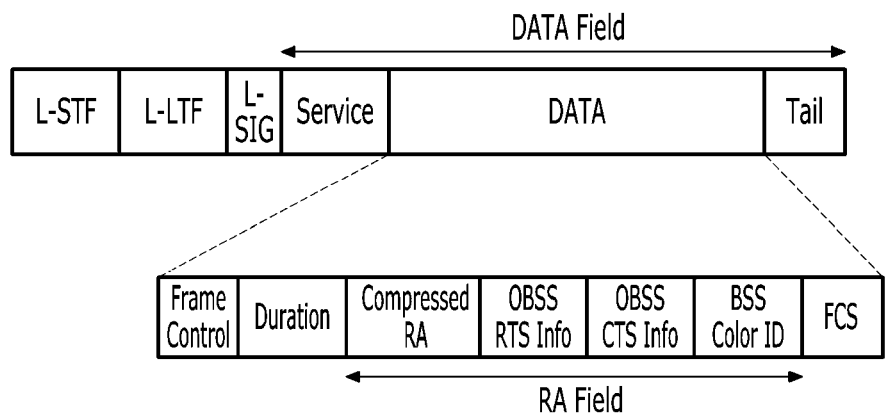

FIG. 48 shows another example of an STRTS frame structure in a wireless communication network according to an embodiment, and FIG. 49 shows another example of an STCTS frame structure in a wireless communication network according to an embodiment.

Referring to FIG. 48, a data field of an STRTS frame includes a service field, a MAC frame part, and tail bits, and further includes pad bits if necessary. The MAC frame part includes a frame control field, a duration field, an address field, and an FCS field, and the address field may include an RA field and a TA field like an RTS frame. Accordingly, the STRTS frame may have the same format as the RTS frame.

The RA field includes a compressed RA field, an OBSS RTS information field, and a BSS color field.

The compressed RA field carries a compressed RA, and the compressed RA is an address into which an RA that is an address of a receiving device destined to receive the STRTS frame is compressed. The OBSS RTS information field carries OBSS RTS information.

The BSS color field carries a BSS color ID of a BSS to which a device, i.e., a transmitting device, transmitting the STRTS frame belongs. Accordingly, a HE device receiving the STRTS frame may determine whether the received STRTS frame is transmitted by its BSS or by an OBSS based on the BSS color ID. Therefore, a HE device in a neighbor BSS of the BSS may determine, based on the BSS color ID of the received STRTS frame, whether a current network condition is a network condition where the HE device can receive the STRTS frame (i.e., the RTS frame).

In some embodiments, the BSS color ID may be used as address padding bits for setting a value of the RA field as a unique address.

The TA field includes a compressed TA field, an OBSS CTS information field, and a BSS color field.

The compressed TA field carries a compressed TA, and the compressed TA is an address into which a TA that is an address of a transmitting device transmitting the STRTS frame is compressed. The OBSS CTS information field carries the OBSS CTS information. The BSS color field carries a BSS color ID of a BSS to which a device, i.e., a transmitting device, transmitting the STRTS frame belongs. In some embodiments, the BSS color ID may be used as address padding bits for setting a value of the TA field as a unique address.

Referring to FIG. 49, a data field of an STCTS frame includes a service field, a MAC frame part, and tails bits, and further includes pad bits if necessary. The MAC frame part includes a frame control field, a duration field, an address field, and an FCS field, and the address field may include an RA field like a CTS frame. Accordingly, the STCTS frame may have the same format as the CTS frame.

The RA field includes a compressed RA field, an OBSS RTS information field, an OBSS CTS information field, and a BSS color field.

The compressed RA field carries a compressed RA, and the compressed RA is an address into which an RA that is an address of a receiving device destined to receive the STRTS frame is compressed. The compressed RA may be copied from the compressed TA field of the STRTS frame. The OBSS RTS information field carries OBSS RTS information and the OBSS CTS information field carries OBSS CTS information. The BSS color field carries a BSS color ID of a BSS to which a device, i.e., a receiving device, transmitting the STCTS frame belongs. In some embodiments, the BSS color ID may be used as address padding bits for setting a value of the RA field as a unique address.

A HE device can determine whether it is a recipient of the STCTS frame based on the compressed RA of the RA field. The HE device receiving the STCTS frame determines a network condition based on the OBSS RTS information and the OBSS CTS information if it is the recipient. The HE device receiving the STCTS frame may set the NAV based on the duration field of the STCTS frame if it is not the recipient. The previous version WLAN device may set the NAV based on the duration field of the STCTS frame because the value of the RA field is different from its address. The HE device receiving the STCTS frame may determine, based on the BSS color ID, whether the STCTS frame has been transmitted from its BSS or the OBSS.

Figure 50:
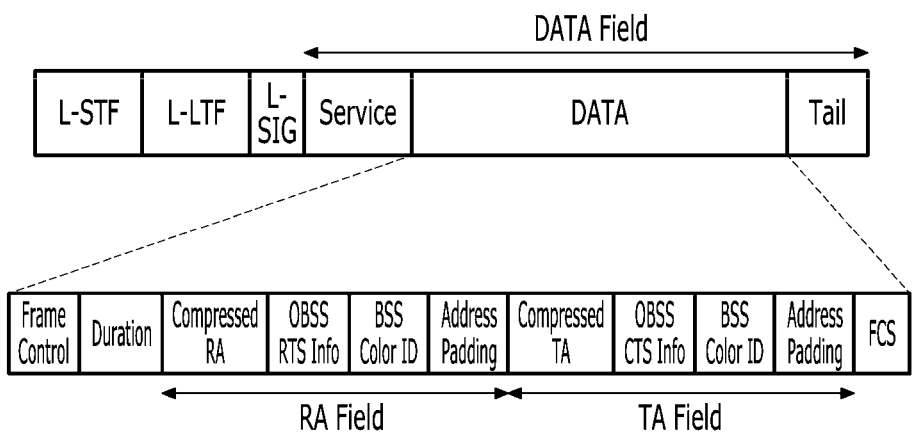
Figure 51:
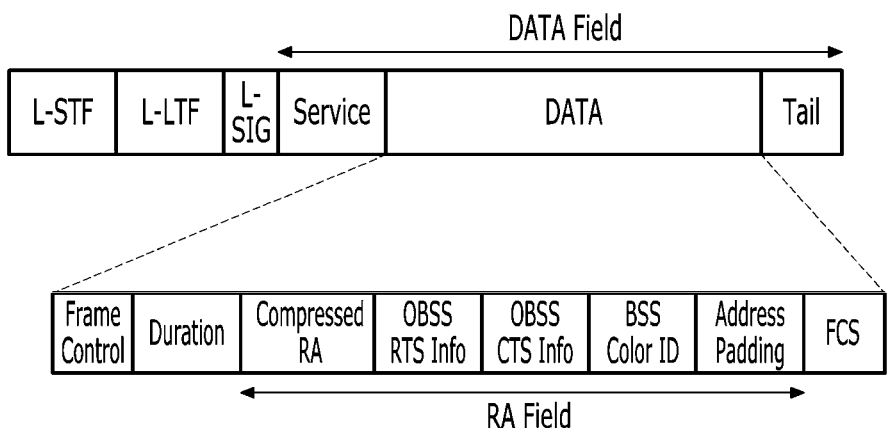

FIG. 50 shows yet another example of an STRTS frame structure in a wireless communication network according to an embodiment, and FIG. 51 shows yet another example of an STCTS frame structure in a wireless communication network according to an embodiment.

Referring to FIG. 50, a data field of an STRTS frame includes a service field, a MAC frame part, and tail bits, and further includes pad bits if necessary. The MAC frame part includes a frame control field, a duration field, an address field, and an FCS field, and the address field may include an RA field and a TA field like an RTS frame. Accordingly, the STRTS frame may have the same format as the RTS frame.

The RA field includes a compressed RA field, an OBSS RTS information field, a BSS color field, and an address padding field.

The compressed RA field carries a compressed RA, and the compressed RA is an address into which an RA that is an address of a receiving device destined to receive the STRTS frame is compressed. The OBSS RTS information field carries OBSS RTS information. The BSS color field carries a BSS color ID of a BSS to which a device, i.e., a transmitting device, transmitting the STRTS frame belongs. The address padding field includes address padding bits that are padded to set a value of the RA field as a unique address.

The TA field includes a compressed TA field, an OBSS CTS information field, a BSS color field, and an address padding field.

The compressed TA field carries a compressed TA, and the compressed TA is an address into which a TA that is an address of a transmitting device transmitting the STRTS frame is compressed. The OBSS CTS information field carries the OBSS CTS information. The BSS color field carries a BSS color ID of a BSS to which a device, i.e., a transmitting device, transmitting the STRTS frame belongs. The address padding field includes address padding bits that are padded to set a value of the TA field as a unique address.

Referring to FIG. 51, a data field of an STCTS frame includes a service field, a MAC frame part, and tails bits, and further includes pad bits if necessary. The MAC frame part includes a frame control field, a duration field, an address field, and an FCS field, and the address field may include an RA field like a CTS frame. Accordingly, the STCTS frame may have the same format as the CTS frame.

The RA field includes a compressed RA field, an OBSS RTS information field, an OBSS CTS information field, a BSS color field, and an address padding field.

The compressed RA field carries a compressed RA, and the compressed RA is an address into which an RA that is an address of a receiving device destined to receive the STRTS frame is compressed. The compressed RA may be copied from the compressed TA field of the STRTS frame. The OBSS RTS information field carries OBSS RTS information and the OBSS CTS information field carries OBSS CTS information. The BSS color field carries a BSS color ID of a BSS to which a device, i.e., a receiving device, transmitting the STCTS frame belongs. The address padding field includes address padding bits that are padded to set a value of the RA field as a unique address.

Figure 52:
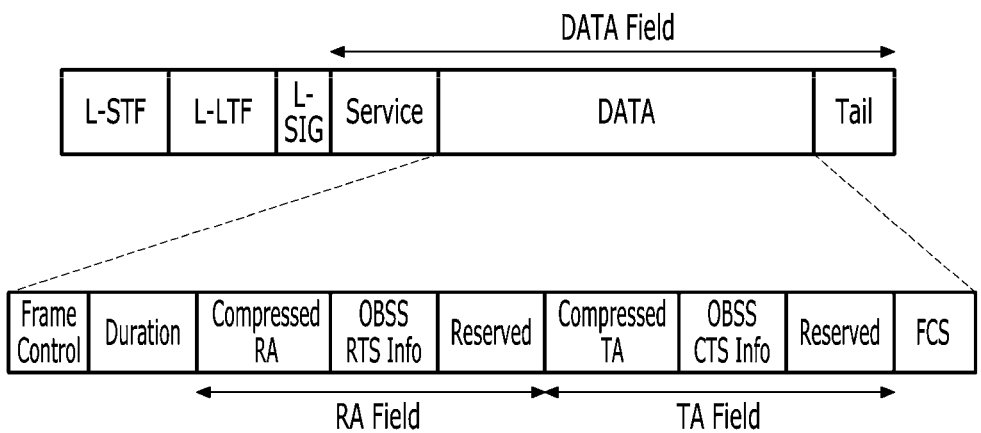
Figure 53:
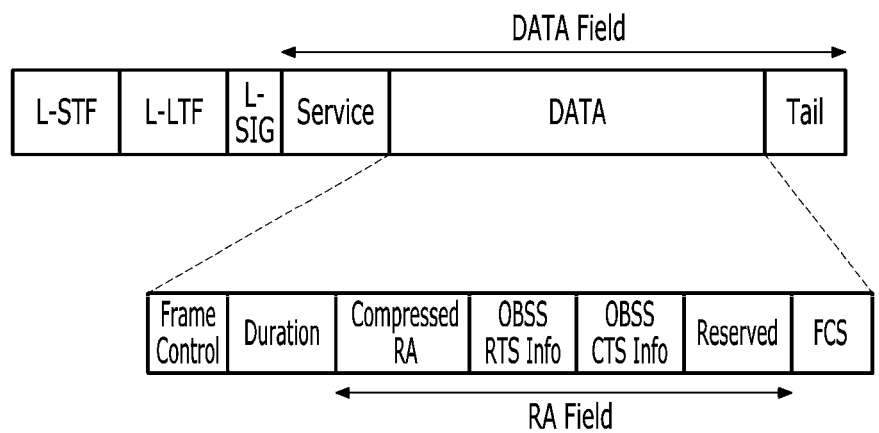

FIG. 52 shows yet another example of an STRTS frame structure in a wireless communication network according to an embodiment, and FIG. 53 shows yet another example of an STCTS frame structure in a wireless communication network according to an embodiment.

Referring to FIG. 52, a data field of an STRTS frame includes a service field, a MAC frame part, and tail bits, and further includes pad bits if necessary. The MAC frame part includes a frame control field, a duration field, an address field, and an FCS field, and the address field may include an RA field and a TA field like an RTS frame. Accordingly, the STRTS frame may have the same format as the RTS frame.

The RA field includes a compressed RA field and an OBSS RTS information field. The compressed RA field carries a compressed RA, and the compressed RA is an address into which an RA that is an address of a receiving device destined to receive the STRTS frame is compressed. The OBSS RTS information field carries OBSS RTS information. The RA field does not include a BSS color field and an address padding field, and remaining bits are used for a reserved field.

The TA field includes a compressed TA field and an OBSS CTS information field. The compressed TA field carries a compressed TA, and the compressed TA is an address into which a TA that is an address of a transmitting device transmitting the STRTS frame is compressed. The TA field does not include a BSS color field and an address padding field, and remaining bits are used for a reserved field.

Referring to FIG. 53, a data field of an STCTS frame includes a service field, a MAC frame part, and tails bits, and further includes pad bits if necessary. The MAC frame part includes a frame control field, a duration field, an address field, and an FCS field, and the address field may include an RA field like a CTS frame. Accordingly, the STCTS frame may have the same format as the CTS frame.

The RA field includes a compressed RA field, an OBSS RTS information field, and an OBSS CTS information field. The compressed RA field carries a compressed RA, and the compressed RA is an address into which an RA that is an address of a receiving device destined to receive the STRTS frame is compressed. The compressed RA may be copied from the compressed TA field of the STRTS frame. The OBSS RTS information field carries OBSS RTS information and the OBSS CTS information field carries OBSS CTS information. The RA field does not include a BSS color field and an address padding field, and remaining bits are used for a reserved field.

As described above, since the RA field and the TA field use a compressed address (compressed RA or compressed TA), the OBSS RTS information and the OBSS CTS information can be transmitted through the remaining bits of the RA field and the TA field. On the other hand, since the number of devices within the BSS is generally limited and $2^{8*N}$ devices can be identified even if N bytes are used in the address of 6 bytes, the compressed address cannot have an influence on network performance.

Next, an example of a method for generating a compressed address from an address of a device is described.

In an embodiment, a compressed address may be generated by operating an address of a device using a transfer function as in Equation 1.

$$y=f(x) \qquad \text{Equation 1}$$

In Equation 1, y is the compressed address, f( ) is the transfer function, and x is the address of the device.

In one example, the transfer function f(x) may be a hash function. The hash function is an algorithm for mapping input data x to data of a fixed size, and a values y returned by the hash function is called a hash value. A hash procedure of the hash function is deterministic. That is, if two hash values are different, two original data of the two hash values are also different.

One example of the hash function f(x) may be an x %8 function. This hash function is used to compress the input data into 3 bits. Since eight hash values can be output depending on the input data, this hash function can classify eighth IDs, i.e., addresses.

For example, assuming that devices whose original addresses are 36, 18, 72, 43, and 6 are present, the original address can be compressed into 3 bits through the x %8 function. Address 36 is compressed into 4 (=36%8), address 18 into 2 (=18%8), address 72 into 0 (=72%8), address 43 into 3 (=43%8), and address 6 into 6 (=6%8).

Another example of the hash function f(x) may be an exclusive OR (XOR) function. The XOR function is an algorithm for performing an XOR operation of adjacent bits in n bits. For example, when two adjacent bits are output to one bit through the XOR operation, an address of 48 bits can be compressed into the compressed address of 24 bits.

As such, according to various embodiments, the frames can be transmitted after the link setup is performed under a condition where interferences from the OBSS exist. The request frame and the response frame for the link setup may use frames with the same formats as the RTS frame and the CTS frame used in the previous WLAN. Even if additional information is transferred through the frame with the previous format, the transmitted device and the receiving device can be identified by using the compressed addresses.

In some embodiments, each of the STRTS frame and the STCTS frame may include an OBSS information indication for indicating whether the corresponding frame is a frame transferring the OBSS information, i.e., the OBSS RTS information and the OBSS CTS information.

FIG. 54, FIG. 55, FIG. 56, and FIG. 57 show various examples of a method for transferring an OBSS information indication in a wireless communication network according to an embodiment.

Figure 54:
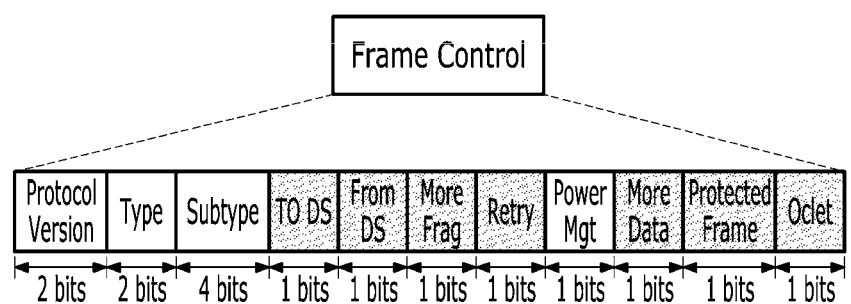
FIG. 54, FIG. 55, FIG. 56, and FIG. 57 show various examples of a method for transferring an OBSS information indication in a wireless communication network according to an embodiment.

Referring to FIG. 54, in an embodiment, a frame control field of each of an STRTS frame and an STCTS frame includes an OBSS information indication.

The frame control field includes a protocol version field, a type field, a subtype field, a To DS (distribution system) field, a From DS field, a more fragments field, a retry field, a power management field, a more data field, a protected frame field, and an order field.

The protocol version field is 2 bits in length and includes a protocol version of a standard.

The type field and the subtype field indicate frame type and subtype. The type field is 2 bits in length and the subtype field is 4 bits in length. In the STRTS frame, the type and subtype fields may have values for indicating an RTS frame. For example, the type field may be set to a value ("01") for indicating a control frame, and the subtype field may be set to a value ("1011") for indicating an RTS. In the STCTS frame, the type and subtype fields may have values for indicating a CTS frame. For example, the type field may be set to a value ("01") for indicating a control frame, and the subtype field may be set to a value ("1100") for indicating a CTS.

Each of the To DS field and the From DS field is 1 bit in length. The To DS field is set to '1' in data frames destined for a DS and the From DS field is set to '1' in data frames exiting the DS. The more fragments field is 1 bit in length and is set to '1' in data or management frames that have another fragment of a current MSDU (MAC service data unit) or current MMPDU (MAC management data protocol unit) to follow. The retry field is 1 bit in length and is set to '1' in any data or management type frame that is a retransmission of an earlier frame.

The power management field is 1 bit in length and is used to indicate a power management mode of a device. A value of '1' indicates that the device will be in a power-save mode and a value of '0' that the device will be in an active mode.

The more data field is 1 bit in length and is used for an AP to indicate to a station that the AP has one or more buffered MSDUs or MMPDUs for the station. The data field is valid in individually addressed data or management frames and is set to '1' when at least one additional buffered MSDU or MMPDU is present for the STA. The protected frame is 1 bit in length and is set to '1' if a frame body field of a data or management frame contains information that has been processed by a cryptographic encapsulation algorithm. The order field is 1 bit in length and is used for data or management frames.

Since the To DS field, the From DS field, the more fragments field, the retry field, the more data field, the protected frame field, and the order field are used for only the data or management frames, these fields are set to '0' in the control frames. Accordingly, any one of these fields may be assigned to the OBSS information indication. When the field assigned to the OBSS information indication has a value of '1', a corresponding frame may be the STRTS frame or the STCTS frame.

Therefore, a HE device receiving a frame may check the field corresponding to the OBSS information indication when the type and subtype fields of the frame indicate the RTS or the CTS. The HE device may determine that the received frame is the RTS frame or the CTS frame when the OBSS information indication is '0', and may determine that the received frame is the STRTS frame or the STCTS frame when the OBSS information indication is '1'.

Figure 55:
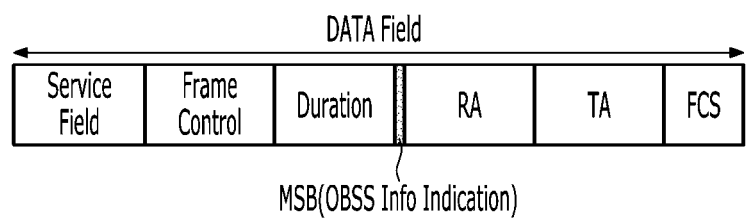

Referring to FIG. 55, in another embodiment, a duration field of each of an STRTS frame and an STCTS frame may include an OBSS information indication.

The duration field may be for example 16 bits in length. The contents of the duration field vary with the frame type and subtype. The duration field may be defined as in Table 3 in the previous version WLAN.

TABLE 3

| Bits 0-13 | Bit 14 | Bit 15 | Usage |
|---|---|---|---|
| 0-32767 | | 0 | Duration value (in microseconds) within all frames other than PS-Poll frames transmitted during the CP, and under HCF (hybrid coordination function) for frames transmitted during the CFP |
| 0 | 0 | 1 | Fixed value under point coordination function (PCF) within frames transmitted during the CFP |
| 1-16383 | 0 | 1 | Reserved |
| 0 | 1 | 1 | Reserved |
| 1-2007 | 1 | 1 | AID in PS-Poll frame |
| 2008-16383 | 1 | 1 | Reserved |

Since the duration fields of the STRTS frame and the STCTS frame are used for indicating a duration value of Table 3, a most significant bit (MSB) (bit 15 in Table 3) is not used. Accordingly, in one embodiment, the MSB may be used for the OBSS information indication.

The HE device receiving a frame may check the MSB of the duration field corresponding to the OBSS information indication when the type and subtype fields of the frame indicate the RTS or the CTS. The HE device may determine that the received frame is the RTS frame or the CTS frame when the OBSS information indication is '0', and may determine that the received frame is the STRTS frame or the STCTS frame when the OBSS information indication is '1'.

In another embodiment, when the duration fields of the STRTS frame and the STCTS frame do not use any of bits 0-14 in Table 3, a part of bits from the MSB to (MSB-n) may be used as the OBSS information indication.

Figure 56:
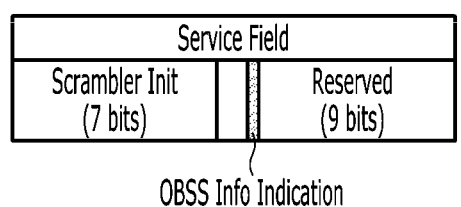
Figure 57:
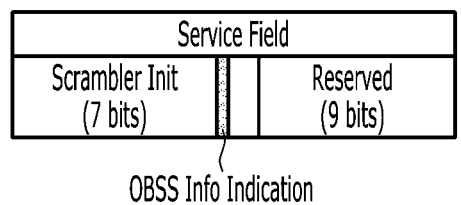

Referring to FIG. 56 and FIG. 57, in yet another embodiment, a service field in a data field of each of an STRTS frame and an STCTS frame may include an OBSS information indication.

The data field includes the service field, data bits, and tail bits, and further includes pad bits if necessary. The service field may correspond to the first 16 bits of the data field. The first 7 bits of the service field may be scrambler initialization bits. The scrambler initialization bits may be used to synchronize a descrambler and may be set to zero to enable estimation of an initial state of a scrambler in a receiver. The remaining 9 bits may be reserved and also set to zero.

A length 127 frame synchronization scrambler that uses a generator polynomial $G(D)=D^7+D^4+1$ may be used. The generator polynomial generates a scrambling sequence by repeatedly generating a 127-bit sequence from a 7-bit scrambler seed. Accordingly, the scrambler seed is one-to-one mapped to the first 7 bits of the scrambling sequence. Since the scrambler initialization bits are set to "0000000," the first 7 bits of data that are outputted by scrambling the data field before being scrambled are equal to the first 7 bits of the scrambling sequence. Therefore, a receiving device can determine the first 7 bits of the data field in the received frame as the scrambler seed and generate the same scrambling sequence as a transmitting device such that it can descramble the data field.

In one embodiment, as shown in FIG. 56, a part of the reserved bits in the service field may be used for the OBSS information indication.

In another embodiment, as shown in FIG. 57, a part of the scrambler initialization bits in the service field may be used for the OBSS information indication.

Therefore, a HE device receiving a frame may check a bit of the service field corresponding to the OBSS information indication when the type and subtype fields of the frame indicate the RTS or the CTS. The HE device may determine that the received frame is the RTS frame or the CTS frame when the OBSS information indication is a predetermined value (for example, '0'), and may determine that the received frame is the STRTS frame or the STCTS frame when the OBSS information indication is another value (for example, '1').

Next, a frame transmitting method in a wireless communication network according to another embodiment is described.

Figure 58:
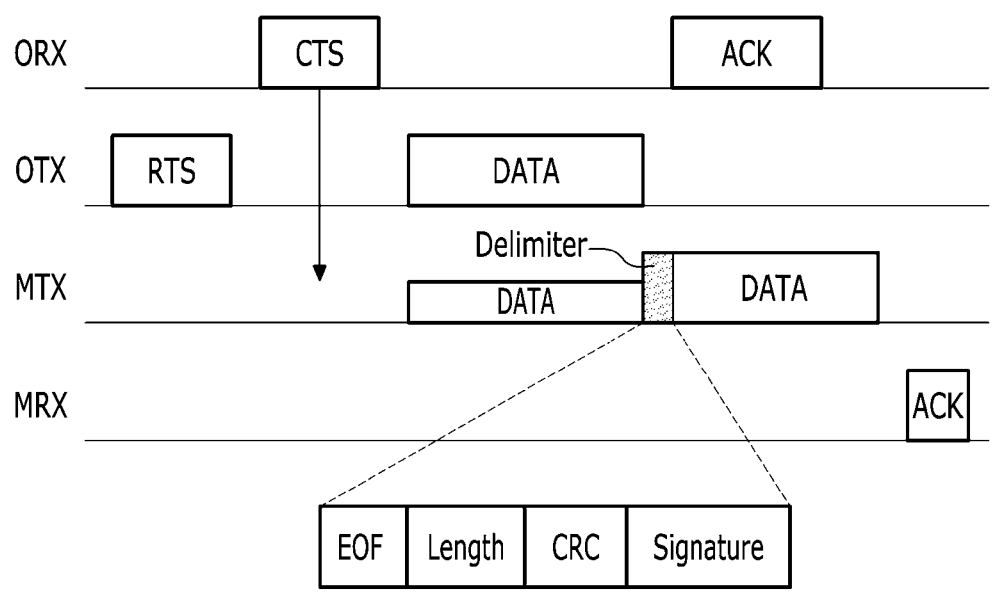
FIG. 58 and FIG. 59 show examples using a delimiter in a frame transmitting method of a wireless communication network according to an embodiment.
Figure 59:
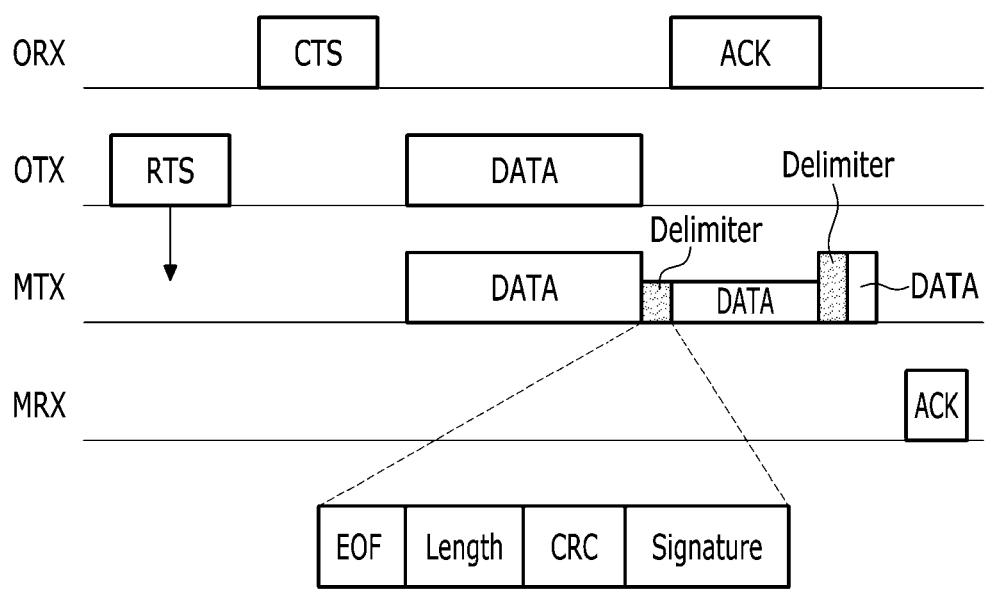
Figure 60:
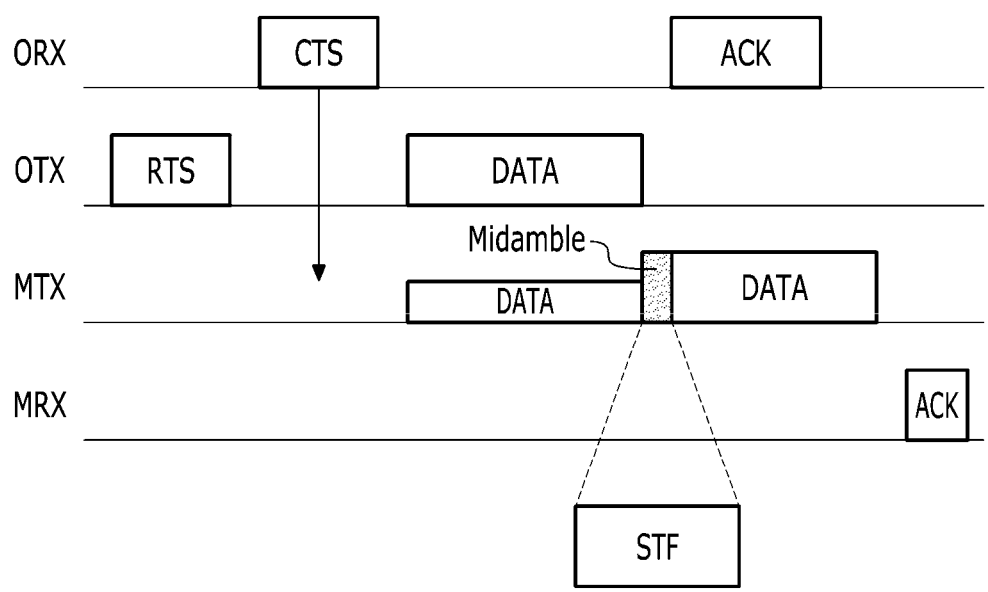
FIG. 60, FIG. 61, and FIG. 62 show examples using a midamble in a frame transmitting method of a wireless communication network according to an embodiment.
Figure 61:
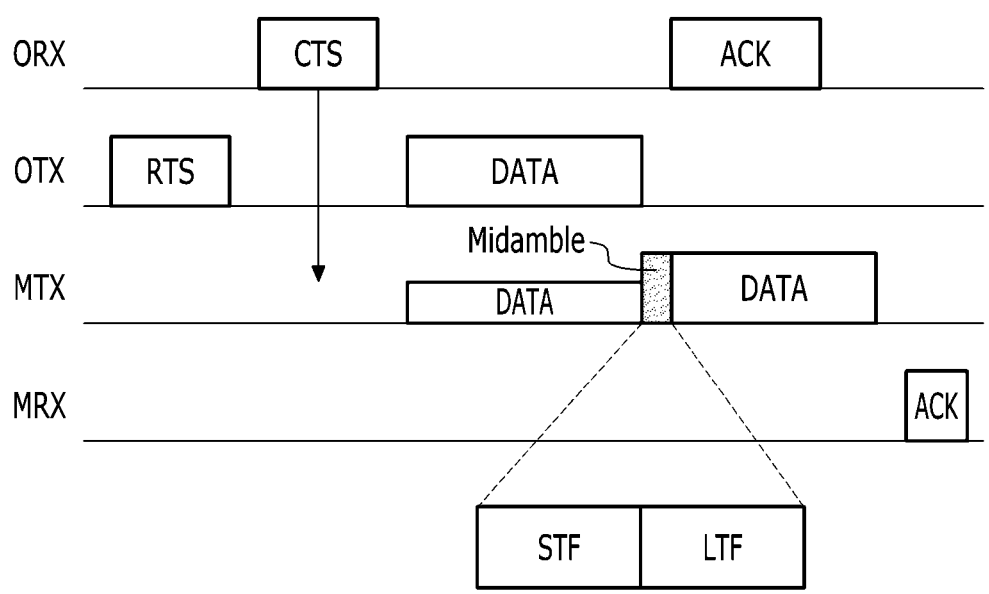
Figure 62:
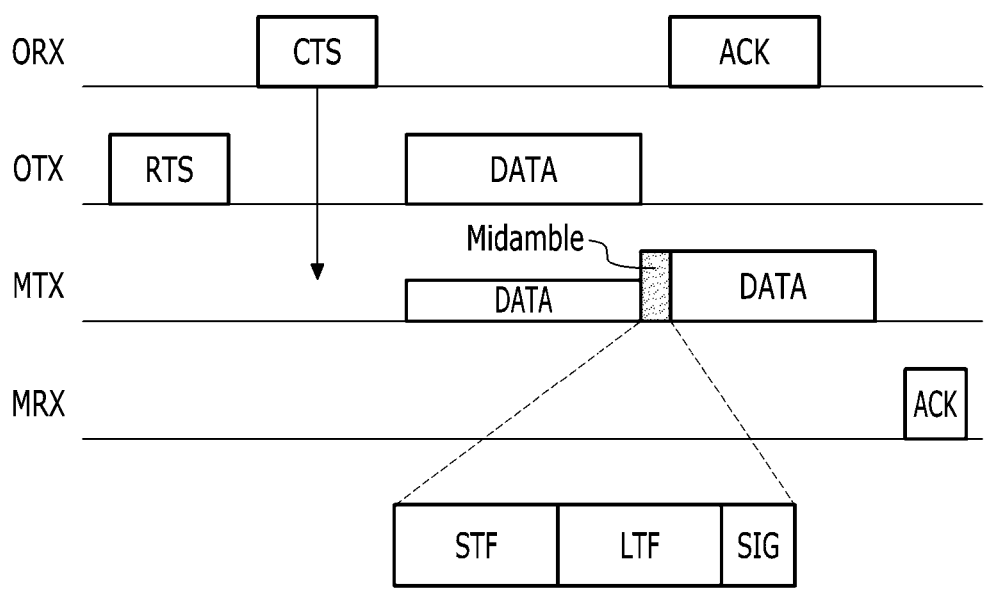

FIG. 58 and FIG. 59 show examples using a delimiter in a frame transmitting method of a wireless communication network according to an embodiment, and FIG. 60, FIG. 61, and FIG. 62 show examples using a midamble in a frame transmitting method of a wireless communication network according to an embodiment.

Figure 63:
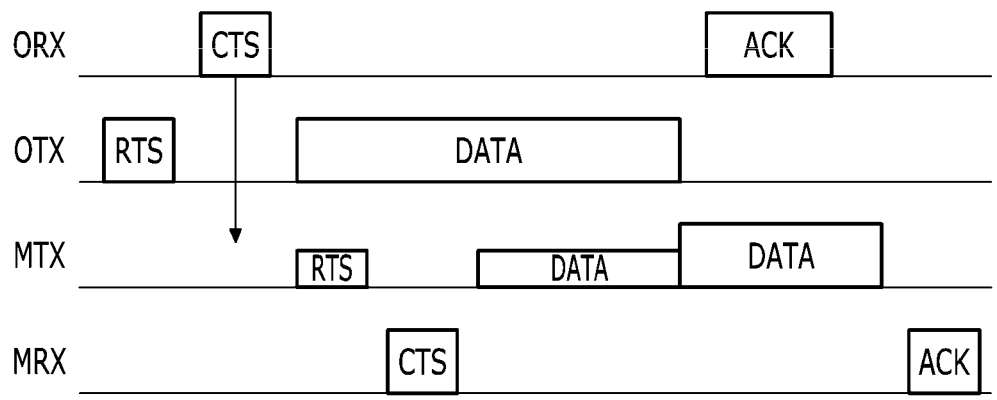
FIG. 63 shows an example adjusting a transmission power of an RTS frame in a frame transmitting method of a wireless communication network according to an embodiment.
Figure 64:
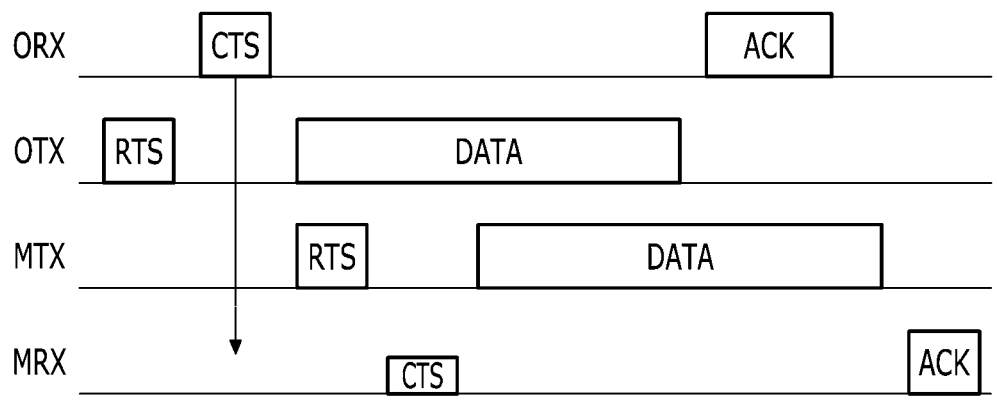
FIG. 64 shows an example adjusting a transmission power of a CTS frame in a frame transmitting method of a wireless communication network according to an embodiment.
Figure 65:
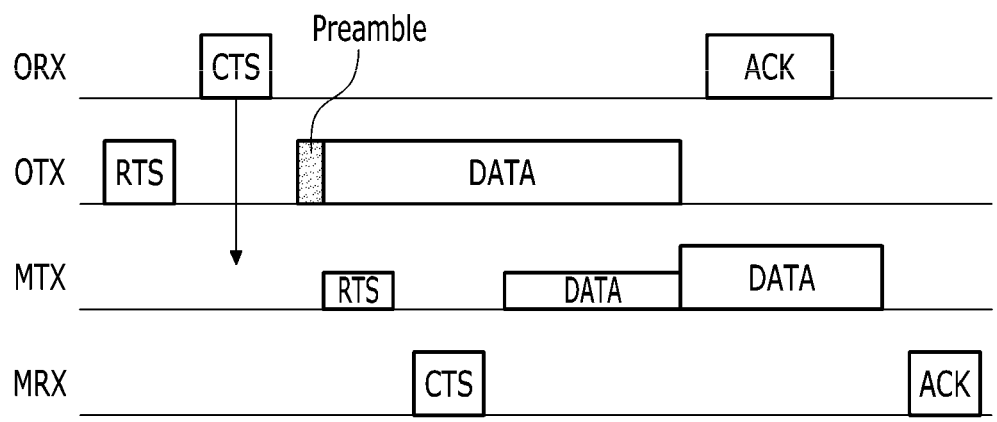
FIG. 65 shows an example of a transmission excluding a preamble period in a frame transmitting method of a wireless communication network according to an embodiment.
Figure 66:
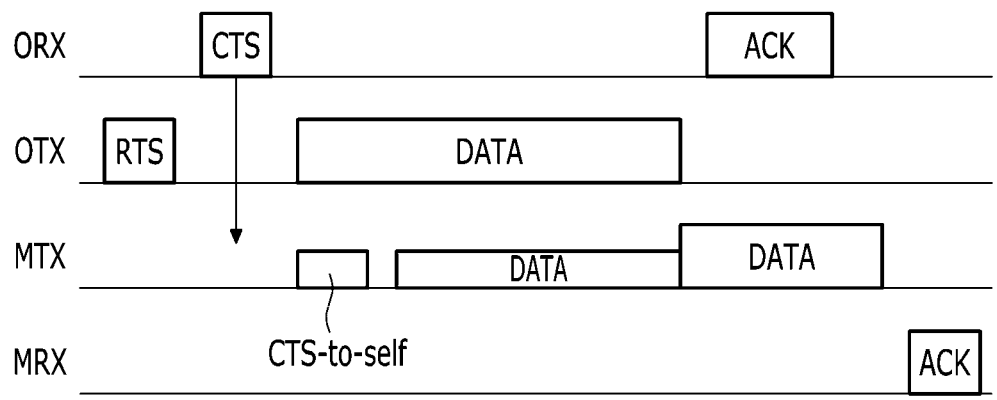
FIG. 66 shows an example using a CTS-to-self frame in a frame transmitting method of a wireless communication network according to an embodiment.
Figure 67:
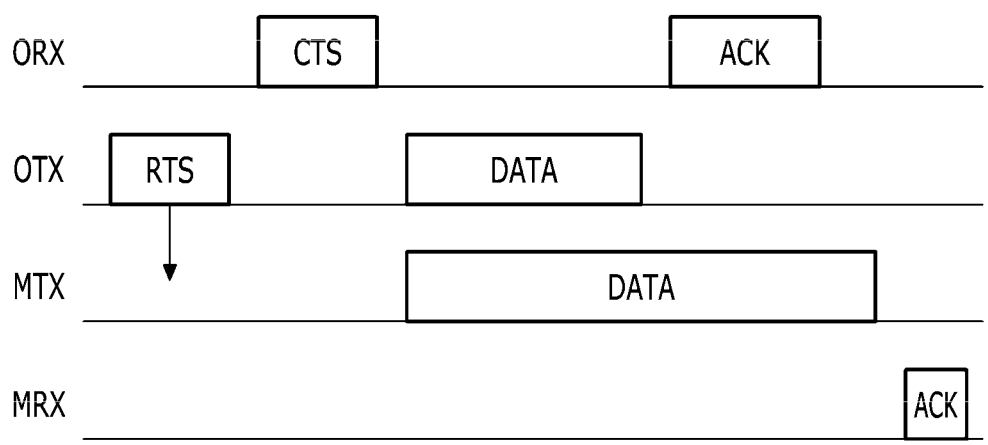
FIG. 67 shows an example a frame transmitting method under a robust ACK condition in a wireless communication network according to an embodiment.

FIG. 63 shows an example adjusting a transmission power of an RTS frame in a frame transmitting method of a wireless communication network according to an embodiment, and FIG. 64 shows an example adjusting a transmission power of a CTS frame in a frame transmitting method of a wireless communication network according to an embodiment. FIG. 65 shows an example of a transmission excluding a preamble period in a frame transmitting method of a wireless communication network according to an embodiment, FIG. 66 shows an example using a CTS-to-self frame in a frame transmitting method of a wireless communication network according to an embodiment, and FIG. 67 shows an example a frame transmitting method under a robust ACK condition in a wireless communication network according to an embodiment.

Referring to FIG. 58 and FIG. 59, in some embodiments, a transmitting device MTX of a MyBSS may additionally transmit a delimiter at a time when a power of a data frame is changed. The data frame includes a preamble and a data field. Since the transmission power may be changed at the data field, the delimiter may be added at the time when the transmission power is changed at the data field.

When a transmitting device MTX of a MyBSS sequentially transmits a TPC ST data frame and an ST data frame, the delimiter notifying that the transmission power of the data frame is changed may be added at a beginning time of the ST data frame (i.e., a time when the transmission power of the data frame is increased) as shown in FIG. 58. The ST data frame shown in FIG. 58 may be a data field extending from a data field of the TPC ST data frame. When transmission of the data frame of the MyBSS is not completed during an ACK frame transmission time of an OBSS, the data frame of the MyBSS may be transmitted with a normal power after the ACK frame transmission time of an OBSS.

Similarly, when the transmitting device MTX of the MyBSS sequentially transmits the ST data frame and the TPC ST data frame, the delimiter may be added at a beginning time of the TPC ST data frame (i.e., a time when the transmission power of the data frame is decreased) as shown in FIG. 59. The TPC ST data frame shown in FIG. 59 may be a data field extending from a data field of the ST data frame. When the transmission of the data frame of the MyBSS is not completed during the ACK frame transmission time of the OBSS, the data frame of the MyBSS may be transmitted with the normal power after the ACK frame transmission time of the OBSS. Accordingly, the delimiter may be added at a time when the transmission power of the data frame is increased as shown in FIG. 59.

FIG. 58 shows as an example the delimiter transmission in a network condition 2c, and FIG. 59 shows as an example the delimiter transmission in a network condition 1c. In other network conditions, when the transmission power of the data frame is changed, a delimiter may be added at the time when that the transmission power is changed.

Accordingly, a receiving device MRX receiving the data frame can identify that the transmission power of the data frame when receiving the delimiter. That is, the receiving device MRX, upon receiving the delimiter, can identify that the transmission power of the data frame is increased (i.e., the TPC ST data frame is changed to the ST data frame), or the transmission power of the data frame is decreased (i.e., the ST data frame is changed to the TPC ST data frame).

The delimiter may, for example, include an end of frame (EOF) field, a length field, a CRC, and a signature field. The EOF field may indicate that a part transmitted with the changed power corresponds to a last part of the data frame, and the length field may indicate a length of the part transmitted with the changed power. The CRC may protect the length field. The signature field may be set for aggregation and disaggregation when the data frame carries an aggregated MPDU (MAC protocol data unit).

Referring to FIG. 60, FIG. 61, and FIG. 62, in another embodiment, a midamble may be transmitted instead of the delimiter. FIG. 60, FIG. 61, and FIG. 62 show as an example a case that a transmission power of a data frame is changed in a network condition 2c, but the midamble may be added in the other network conditions.

As shown in FIG. 60, the midamble may include a short training field (STF). Accordingly, a receiving device MRX may control a gain of a part of the data frame in which the transmission power is changed by using the short training field (STF).

As shown in FIG. 61, the midamble may include a short training field (STF) and a long training field (LTF). Therefore, the receiving device MRX may control the gain of the part of the data frame in which the transmission power is changed by using the short training field (STF), and compensate a channel of the part of the data frame in which the transmission power is changed by using the long training field (LTF).

As shown in FIG. 62, the midamble may include a short training field (STF), long training field (LTF), and a signal field (SIG). Accordingly, the receiving device MRX may control the gain of the part of the data frame in which the transmission power is changed by using the short training field (STF), and compensate a channel of the part of the data frame in which the transmission power is changed by using the long training field (LTF). Further, the receiving device MRX may receive additional information that the transmitting device MTX carries through the signal field (SIG).

In some embodiments, the transmitting device MTX of the MyBSS may transmit both the delimiter and midamble. For example, the transmitting device MTX may transmit the midamble following the delimiter. Then, the receiving device MRX may identify a boundary in which the transmission power is changed based on the delimiter and may control the gain, i.e., the receiving power based on the midamble.

Referring to FIG. 63 and FIG. 64, in some embodiments, a transmitting device MTX and a receiving device MRX of a MyBSS may exchange an RTS frame and a CTS frame. In this case, the transmitting device MTX and the receiving device MRX may adjust a transmission power of the RTS frame or the CTS frame.

In a case (a network condition 2a, a network condition 2b, a network condition 2c, a network condition 2d, a network condition 4a, a network condition 4b, a network condition 4c, or a network condition 4d) that the transmitting device MTX can receive the CTS frame of the OBSS during a data frame transmission time of the OBSS, as shown in FIG. 63, the transmitting device MTX may transmit the RTS frame with a lower power than the data frame of the OBSS in order to prevent the RTS frame from acting an interference when the receiving device ORX of the OBSS receives the data frame. FIG. 63 shows, as an example, the RTS frame transmission in the network condition 2c for convenience.

In a case (a network condition 1b, a network condition 1d, a network condition 2b, a network condition 2d, a network condition 3b, a network condition 3d, a network condition 4b, or a network condition 4d) that the receiving device MRX can receive the RTS frame of the OBSS, as shown in FIG. 64, the receiving device MRX may transmit the CTS frame with a lower power than the data frame of the OBSS in order to prevent the CTS frame from acting an interference when the receiving device ORX of the OBSS receives the data frame. FIG. 64 shows, as an example, the CTS frame transmission in the network condition 3d for convenience.

Referring to FIG. 65, in some embodiments, when a data frame of an OBSS is transmitted, a frame of a MyBSS may be not transmitted during a preamble transmission time of the data frame. In one embodiment, an RTS frame of the MyBSS may be transmitted after the preamble of the data frame of the OBSS is transmitted. FIG. 65 shows, as an example, the STRTS frame transmission in the network condition 2c for convenience.

The preamble may be used for automatic gain control, time and frequency synchronization, or channel estimation. Accordingly, the frame of the MyBSS cannot have an influence on the automatic gain control, the time and frequency synchronization, or the channel estimation by preventing the frame of the MyBSS from overlapping with the preamble of the data frame of the OBSS.

Referring to FIG. 66, in some embodiments, when a MyBSS does not transmit an RTS frame (or an STRTS frame) and a CTS frame (or a STCTS frame), a transmitting device MTX of the MyBSS may transmit a CTS frame ("CTS-to-self frame") having it as a recipient. The CTS-to-self frame has the same format as the CTS frame, and has an RA field equal to an address of the transmitting device MTX. Since the other device receiving the CTS-to-self frame sets a NAV based on the CTS-to-self frame, the data frame transmission of the MyBSS can be protected. FIG. 66 shows, as an example, the STRTS frame transmission in the network condition 2c for convenience.

In one embodiment, in a case (a network condition 2a, a network condition 2b, a network condition 2c, a network condition 2d, a network condition 4a, a network condition 4b, a network condition 4c, or a network condition 4d) that the transmitting device MTX can receive the CTS frame of the OBSS during a data frame transmission time of the OBSS, as shown in FIG. 66, the transmitting device MTX may transmit the CTS-to-self frame with a lower power than the data frame of the OBSS in order to prevent the CTS-to-self frame from acting an interference when the receiving device ORX of the OBSS receives the data frame.

In another embodiment, the transmitting device MTX of the MyBSS may transmit an STCTS frame ("STCTS-to-self frame") having it as a recipient. The STCTS-to-self frame has the same format as the STCTS frame. In the STCTS-to-self frame, a compressed RA of an RA field may be set to a compressed address of the transmitting device MTX.

Referring to FIG. 28 to FIG. 31 again, a transmission power of a data frame transmitted by a transmitting device MTX of a MyBSS decreases during an ACK frame transmission time of an OBSS in a network condition 1a, a network condition 1b, a network condition 1c, and a network condition 1d. When the ACK frame transmitted in the OBSS is robust to an influence of interference, even if the transmitting device MTX of the MyBSS transmits a data frame with a normal power, a receiving device ORX of the OBSS may successfully receive the ACK frame regardless of the data frame. Accordingly, as shown in FIG. 67, the transmitting device MTX may transmit the data frame without changing the transmission power in the network conditions 1a to 1d. FIG. 67 shows, as an example, the data frame transmission in the network condition 1c for convenience.

Next, a method of controlling a transmission power of a frame in a wireless communication network according to yet another embodiment is described.

Figure 68:
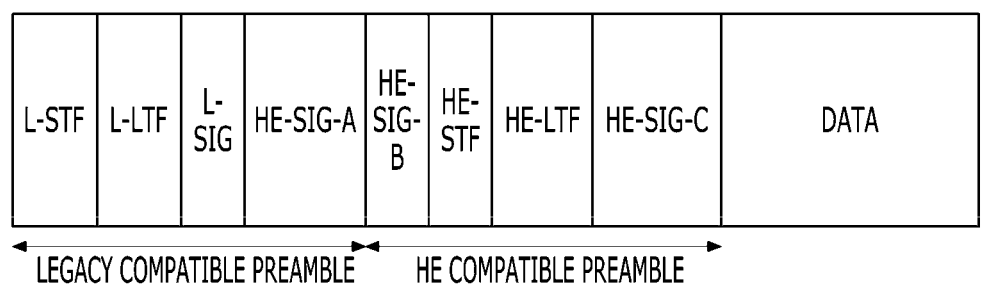
FIG. 68 shows a frame structure of a wireless communication network according to an embodiment.
Figure 71:
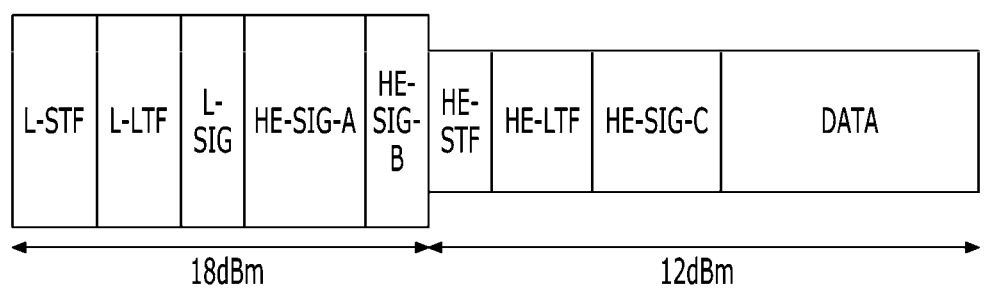
Figure 72:
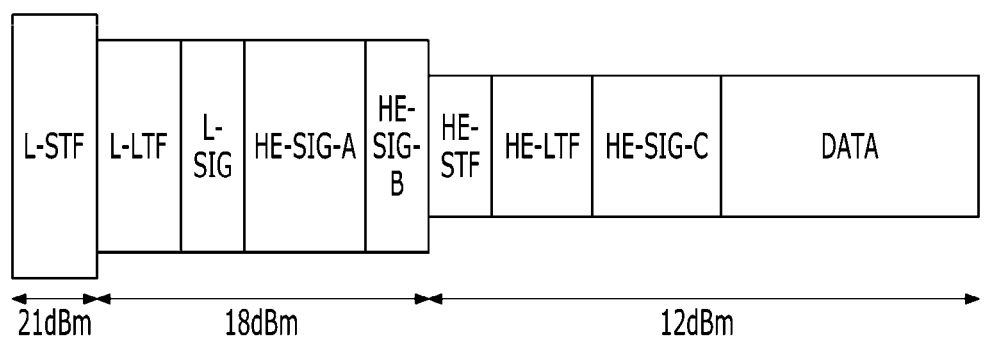
Figure 73:
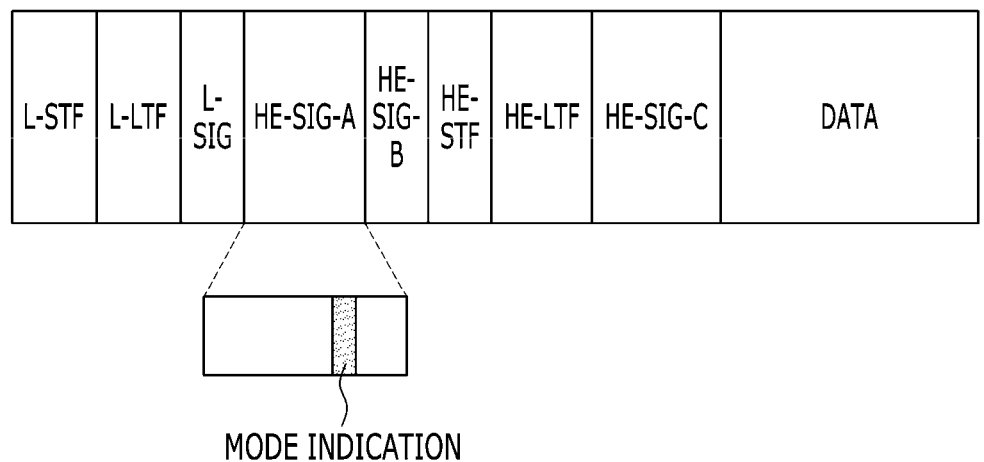
FIG. 73 shows an example of a method for indicating a transmission mode of a frame in a wireless communication network according to an embodiment.
Figure 74:
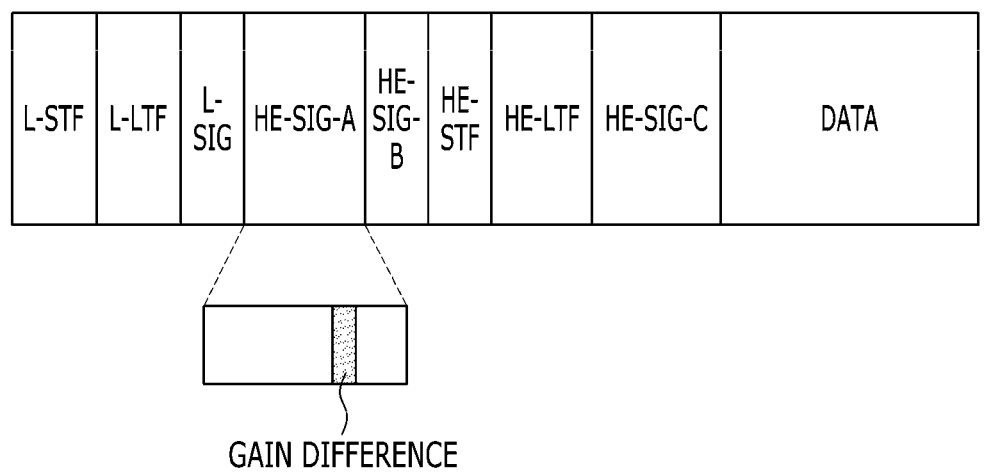
FIG. 74 shows an example of a method for a indicating a gain difference in a wireless communication network according to an embodiment.

FIG. 68 shows a frame structure of a wireless communication network according to an embodiment, FIG. 69, FIG. 70, FIG. 71, and FIG. 72 show various examples of transmission power control in a wireless communication network according to an embodiment, FIG. 73 shows an example of a method for indicating a transmission mode of a frame in a wireless communication network according to an embodiment, and FIG. 74 shows an example of a method for a indicating a gain difference in a wireless communication network according to an embodiment.

Referring to FIG. 68, a frame, for example a data frame or an ACK frame, includes a preamble and a data field, and the preamble includes a legacy compatible preamble and a HE compatible preamble.

The legacy compatible preamble is provided for backward compatibility with devices supporting a legacy WLAN, and includes a legacy short training field (L-STF), a legacy long training field (L-LTF), and a legacy signal field (L-SIG), and a HE signal field (HE-SIG-A).

The L-STF may be used for initial synchronization, signal detection, and automatic gain control. The L-LTF may be used for fine frequency synchronization and channel estimation. The L-SIG may include length information indicating a length of the entire frame. The HE-SIG-A follows the L-SIG and carries signaling information for a HE device. The length information of the L-SIG and the signaling information of the HE-SIG-A may be decoded based on the channel information estimated by the L-LTF.

The HE compatible preamble includes a HE short training field (HE-STF) and a HE long training field (HE-LTF). The HE compatible preamble may further include an additional HE signal field (HE-SIG-C) following the HE-LTF. The HE compatible preamble may further include an additional HE signal field (HE-SIG-B) between the HE-SIG-A and the HE-STF.

The HE-STF may be used for automatic gain control. The HE-LTF follows the HE-STF and may be used for MIMO channel estimation. The number of HE-LTFs may be determined based on the number of antennas used for the MIMO transmission, i.e., the number of space-time streams. The HE-SIG-B and the HE-SIG-C carry additional signaling information.

Figure 69:
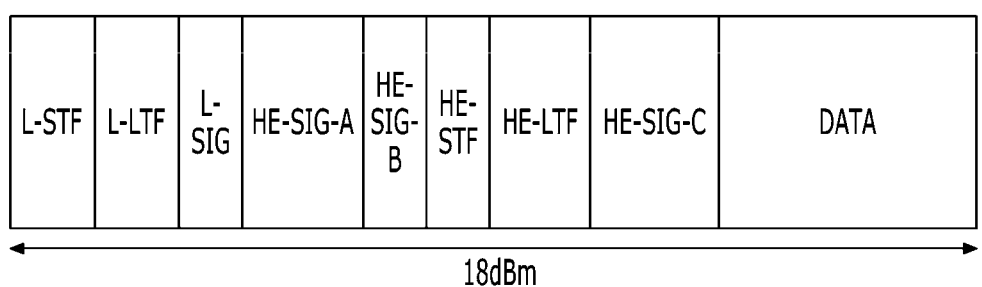
FIG. 69, FIG. 70, FIG. 71, and FIG. 72 show various examples of transmission power control in a wireless communication network according to an embodiment.

Referring to FIG. 69, all fields of the frame may be transmitted with a normal power (for example, 18 dBm). Hereinafter, such a transmission method is referred to as a "normal mode."

Figure 70:
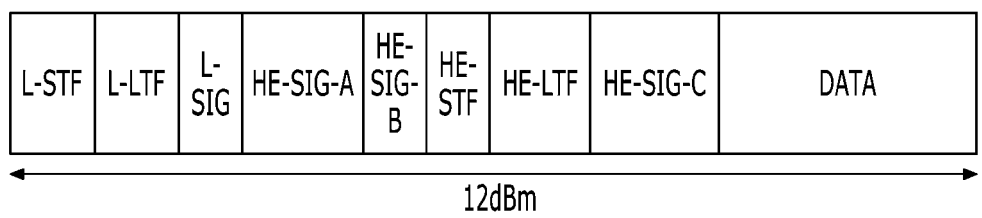

Referring to FIG. 70, all fields of the frame may be transmitted with a lower power (for example, 15 dBm, 12 dBm, or 9 dBm) than the normal power. Hereinafter, such a transmission method is referred to as a "low interference mode 1."

Referring to FIG. 71, the legacy compatible preamble of the frame may be transmitted with the normal power (for example, 18 dBm), and the HE compatible preamble and the data field may be transmitted with the lower power (for example, 15 dBm, 12 dBm, or 9 dBm) than the normal power. In some embodiments, the HE-SIG-B may be transmitted with the same power as the legacy compatible preamble. Hereinafter, such a transmission method is referred to as a "low interference mode 2."

Referring to FIG. 72, the L-STF of the frame may be transmitted with a high power (for example, 21 dBm) than the normal power, the legacy compatible preamble excluding the L-STF may be transmitted with the normal power (for example, 18 dBm), and the HE compatible preamble and the data field may be transmitted with the lower power (for example, 15 dBm, 12 dBm, or 9 dBm) than the normal power. In some embodiments, the HE-SIG-B may be transmitted with the same power as the legacy compatible preamble. Hereinafter, such a transmission method is referred to as a "low interference mode 3."

The transmission modes described with reference to FIG. 69 to FIG. 72 may be arranged as in Table 4.

TABLE 4

| | | Tx power | |
|---|---|---|---|
| Mode | L-STF | Legacy compatible preamble (excluding L-STF) | HE compatible preamble/ Data field |
| Normal | Normal | Normal | Normal |
| Low interference 1 | Low | Low | Low |
| Low interference 2 | Normal | Normal | Low |
| Low interference 3 | High | Normal | Low |

As such, when a transmitting device MTX or a receiving device MRX of a MyBSS transmits a frame in the low interference 1 mode, the low interference 2 mode, or the low interference 3 mode, the frame acts as low interference on devices OTX and ORX of an OBSS because a HE compatible preamble and a data field are transmitted with the low power. Accordingly, a frame transmission in the OBSS cannot be influenced.

In one embodiment, the low interference 1 mode, the low interference 2 mode, or the low interference 3 mode may be used for a TPC ST data frame transmission and a TPC ST ACK frame transmission which are performed with the low power, and the normal mode may be used for an ST data frame transmission and an ST ACK frame transmission which are performed with the normal power.

In another embodiment, the low interference 1 mode, the low interference 2 mode, or the low interference 3 mode may be used for the ST data frame transmission and ST ACK frame transmission. Accordingly, the frame transmission in the MyBSS may act as low interference on the OBSS.

In yet another embodiment, any one mode may be selected from among the normal mode, the low interference 1 mode, the low interference 2 mode, or the low interference 3 mode based in accordance with the interference with the OBSS. For example, the low interference 1 mode may be used in a condition with the highest interference, the low interference 2 mode may be used in a condition with the next highest interference, the low interference 3 mode may be used in a condition with the next lowest interference, and the normal mode may be used in a condition with the lowest interference.

In some embodiments, a frame may include a mode indication for indicating that the frame is transmitted with a transmission power of which mode from among the normal mode, the low interference 1 mode, the low interference 2 mode, or the low interference 3 mode. For example, as shown in FIG. 73, the HE-SIG-A of the frame may include the mode indication.

In some embodiment, the mode indication may have 1 bit and may indicate any one of the normal mode or the low interference mode. For example, the mode indication with a value of '0' may indicate the normal mode and the mode indication with a value of '1' may indicate the low interference mode. The low interference mode may be predefined as any one of the low interference 1 mode, the low interference 2 mode, or the low interference 3 mode.

In another embodiment, the mode indication may have 2 bits and may indicate any one mode of the normal mode, the low interference 1 mode, the low interference 2 mode, or the low interference 3 mode. For example, the mode indication may indicate the normal mode as a value of '00', the low interference 1 mode as a value of '01', the low interference 2 mode as a value of '10', and the low interference 3 mode as a value of '11'.

A receiving device controls a gain of the legacy compatible part by measuring a receiving power of the L-STF and controls a gain of the HE compatible part and the date field by measuring a receiving power of the HE-STF. When the HE compatible preamble is transmitted with the low power, the receiving device may not accurately measure the receiving power of the HE-STF. Accordingly, in some embodiments, the legacy compatible preamble of the frame may carry information on a gain difference. For example, as shown in FIG. 74, the HE-SIG-A of the frame may include the gain difference information.

In one embodiment, the gain difference information may have 2 bits and a gain difference value. For example, the gain difference information may indicate the gain difference of 0 dB as a value of '00', the gain difference of 3 dB as a value of '01', the gain difference of 6 dB as a value of '10', and the gain difference as a value of '11'.

Then, the receiving device can control the gain of the legacy compatible part based on the L-STF, and can control the gain of the HE compatible part and the data field based on a difference between the gain difference value indicated by the gain difference information and the controlled gain.

A frame transmitting method according to above embodiments may be executed by a baseband processor 10 shown in FIG. 1 to FIG. 3. In one embodiment, instructions for executing the frame transmitting method according to above embodiments may be stored in a non-transitory computer-readable recording medium such as a memory 40. In another embodiment, at least some of the instructions may be MAC software. In yet another embodiment, at least some of the instructions may be transmitted from a non-transitory computer-readable recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting a frame by a first device belonging to a first basic service set (BSS) in a wireless communication network, the method comprising:
   determining whether a request to send (RTS) frame or a clear to send (CTS) frame is received from a second BSS that is a neighbor BSS of the first BSS; and
   transmitting to a second device a transmission frame whose transmission power is changed from a normal power during a predetermined time in a data frame transmission time and an ACK frame transmission time of the second BSS when the RTS frame or the CTS frame is received from the second BSS.

2. The method of claim 1, wherein the changed transmission power of the transmission frame is lower than the normal power.

3. The method of claim 1, wherein, when the CTS frame is received and the RTS frame is not received from the second BSS, the predetermined time includes the data frame transmission time.

4. The method of claim 3, further comprising transmitting the transmission frame with the normal power during the ACK frame transmission time.

5. The method of claim 4, wherein the transmission frame includes, at a time when the transmission frame starts to be transmitted with the normal power, a delimiter notifying that the transmission power of the transmission frame is changed.

6. The method of claim 4, wherein the transmission frame includes a midamble at a time when the transmission frame starts to be transmitted with the normal power, and wherein the midamble includes a short training field for gain control.

7. The method of claim 1, wherein, when the RTS frame is received and the CTS frame is not received from the second BSS, the predetermined time includes the ACK frame transmission time.

8. The method of claim 7, further comprising transmitting the transmission frame with the normal power during the data frame transmission time.

9. The method of claim 8, wherein the transmission frame includes, at a time when the transmission frame starts to be transmitted with the changed transmission power, a delimiter indicating that the transmission power of the transmission frame is changed.

10. The method of claim 8, wherein the transmission frame includes a midamble at a time when the transmission frame starts to be transmitted with the changed transmission power, and
wherein the midamble includes a short training field for gain control.

11. The method of claim 1, wherein, when the RTS frame and the CTS frame are received from the second BSS, the predetermined time includes the data frame transmission time and the ACK frame transmission time.

12. The method of claim 1, further comprising exchanging a request frame and a response frame for the request frame with the second device.

13. The method of claim 12, wherein each of the request frame and the response frame includes information on the neighbor BSS, and
wherein the information on the neighbor BSS includes information on the RTS frame and information on the CTS frame.

14. The method of claim 13, wherein the information on the RTS frame includes at least one of identification information of a device transmitting the RTS frame, identification information of the second BSS, information on whether the RTS frame has been received, a received signal strength of the RTS frame, and a transmission power level of the RTS frame, and
wherein the information on the CTS frame includes at least one of identification information of a device transmitting the CTS frame, identification information of the second BSS, information on whether the CTS frame has been received, a received signal strength of the CTS frame, and a transmission power level of the CTS frame.

15. The method of claim 13, wherein the request frame has a same format as the RTS frame and the response frame has a same format as the CTS frame,
wherein a transmitter address field of the request frame includes one of the information on the RTS frame and the information on the CTS frame, and a receiver address field of the request frame includes another one of the information on the RTS frame and the information on the CTS frame, and
wherein a receiver address field of the response frame includes the information on the RTS frame and the information on the CTS frame.

16. The method of claim 15, wherein the transmitter address field of the request frame further includes an address into which an address of a device transmitting the request frame among the first device and the second device is compressed,
wherein the receiver address field of the request frame further includes an address into which an address of a device receiving the request frame among the first device and the second device is compressed, and
wherein the receiver address field of the response frame further includes an address into which an address of a device receiving the response frame among the first device and the second device is compressed.

17. The method of claim 13, wherein each of the request frame and the response frame further includes an indication indicating whether the information on the neighbor BSS is included.

18. The method of claim 1, wherein the transmission frame whose transmission power is changed further includes a first preamble being compatible with a wireless local area network (WLAN) of a previous version, a second preamble supporting the wireless communication network, and a data field, and
wherein a transmission power of the second preamble and the data field is lower than the normal power.

19. The method of claim 18, wherein the first preamble includes a short training field being compatible with the WLAN of the previous version, and
wherein a transmission power of the first preamble or a field excluding the short training field from the first preamble is lower than the normal power.

20. The method of claim 18, wherein the first preamble includes an indication indicating a gain difference between the first preamble and the second preamble.

* * * * *